(12) United States Patent
Baker et al.

(10) Patent No.: US 11,396,076 B2
(45) Date of Patent: Jul. 26, 2022

(54) MODULAR AUTOMATED TABLE-TOP PRODUCTION POD

(71) Applicants: Christopher E. Baker, Chula Vista, CA (US); Carl R. Dorsch, Alpharetta, GA (US)

(72) Inventors: Christopher E. Baker, Chula Vista, CA (US); Carl R. Dorsch, Alpharetta, GA (US)

( * ) Notice: Subject to any disclaimer, the term of this patent is extended or adjusted under 35 U.S.C. 154(b) by 515 days.

(21) Appl. No.: 16/602,497

(22) PCT Filed: Apr. 19, 2018

(86) PCT No.: PCT/US2018/028254
§ 371 (c)(1),
(2) Date: Oct. 18, 2019

(87) PCT Pub. No.: WO2018/195246
PCT Pub. Date: Oct. 25, 2018

(65) Prior Publication Data
US 2021/0237219 A1 Aug. 5, 2021

Related U.S. Application Data

(60) Provisional application No. 62/487,145, filed on Apr. 19, 2017.

(51) Int. Cl.
*B23Q 37/00* (2006.01)
*B23Q 1/01* (2006.01)
(Continued)

(52) U.S. Cl.
CPC .............. *B23Q 37/00* (2013.01); *B23Q 1/015* (2013.01); *B23Q 1/621* (2013.01); *B23Q 5/40* (2013.01)

(58) Field of Classification Search
CPC .......... B23Q 1/262; B23Q 1/267; B23Q 1/38; B23Q 1/385; B23Q 1/4866; B23Q 1/58;
(Continued)

(56) References Cited

U.S. PATENT DOCUMENTS 4,118,844 A * 10/1978 Matsuzaki ............ B23B 31/263
29/26 A
5,678,291 A * 10/1997 Braun .................. B23Q 1/5406
29/27 A
(Continued)

*Primary Examiner* — Tyrone V Hall, Jr.

(57) ABSTRACT

The invention is a modular table-top automation apparatus, or for short, a tac, a word derived from an acronym for a table-top automation center, of which, this is the first. Employing integrated mechanical and electronic systems, a tac is a flexible, programmable apparatus, readily reconfigurable, which can be used as either a stand-alone unit, or as a cell within a configuration of other tacs or machines. The tac can utilize various purchasable application devices, mounted on one or two horizontal carriage rail assemblies, which extend past both sides of a frame containing a central work area, giving it a unique ability to load, position, perform numerous operations and unload a wide variety of small parts or assemblies. By combining with optional rotary magazines positioned on both sides of the frame, the tac can be set-up as a fully automatic "load and walk-away" production center.

16 Claims, 23 Drawing Sheets

(51) Int. Cl.
*B23Q 1/62* (2006.01)
*B23Q 5/40* (2006.01)

(58) Field of Classification Search
CPC .......... B23Q 1/62; B23Q 1/621; B23Q 1/626; B23Q 1/015; B23Q 1/01; B23Q 1/012; B23Q 1/017; B23Q 1/40; B23Q 1/42; B23Q 37/00; B23Q 37/005; B23Q 37/007
See application file for complete search history.

(56) References Cited

U.S. PATENT DOCUMENTS

| | | | | |
|---|---|---|---|---|
| 5,724,893 | A * | 3/1998 | Lee | G01M 7/06 74/490.09 |
| 5,848,458 | A * | 12/1998 | Bullen | B23P 21/004 29/33 K |
| 6,232,736 | B1 * | 5/2001 | Bullen | B23Q 37/00 318/632 |
| 6,337,464 | B1 * | 1/2002 | Takaoka | B23Q 1/012 219/121.73 |
| 6,718,229 | B1 * | 4/2004 | Takebayashi | B25J 9/1687 700/217 |
| 7,264,581 | B1 * | 9/2007 | Lai | B23Q 1/012 483/49 |
| 2006/0097692 | A1 * | 5/2006 | Chen | H02J 7/0042 320/107 |
| 2008/0178447 | A1 * | 7/2008 | Okada | B23Q 5/045 29/27 C |
| 2012/0058872 | A1 * | 3/2012 | Roders | B23Q 1/621 409/235 |
| 2012/0295516 | A1 * | 11/2012 | Guo | B24B 41/02 451/5 |
| 2014/0020525 | A1 * | 1/2014 | Yang | B23Q 1/017 82/122 |
| 2017/0216964 | A1 * | 8/2017 | Vlaev | B23K 37/0235 |

* cited by examiner

MODULAR AUTOMATED TABLE-TOP PRODUCTION POD

CROSS-REFERENCE TO RELATED APPLICATIONS

This application claims benefit of priority to PCT patent application serial no. PCT/US2018/028254 filed Apr. 19, 2018 under 35 USC § 120 and U.S. provisional patent application Ser. No. 62/487,145 filed Apr. 19, 2017 under 35 U.S.C. § 119(e), which are incorporated by reference herein in their entirety.

BACKGROUND OF THE INVENTION

1. Field of the Invention

The present invention relates generally to a modular table-top automation apparatus, or for short, a tac (a word derived from an acronym for a table-top automation center, of which, this is the first). A tac is an apparatus which can be used as either a stand-alone unit, or as a cell within a system of other tacs and/or other types of machines.

2. Background

Currently, there are no commercially available, fully-automatic modular systems operating at the size of scale of a table-top device which are designed to lend themselves to performing different types of processes with small product items or small quantities of liquids or materials.

While there are table-top machines which are automated to a limited extent, they are designed to execute one or two specific and associated tasks, such as to dispense liquids and to cap bottles, or to solder components. But none of them are designed to be adaptive to accommodate a wide range of other process tasks. Moreover, none of them are fully automated; that is, they do not include integrated systems for the loading and unloading of parts or assemblies to and from the work area (also known as the central work area), nor can they readily act as cells in a modular fashion with other units of the same sort.

Previously, if a customer needed a fully automatic system, or required several different tasks to be performed within a process, or desired a system which could be converted to handle different types of applications, then his only option was to resort to the considerable time and expense of designing, procuring, assembling, and integrating the parts of a custom-built system, whether the work was done in-house or through an outside system configurator.

Such a design, comprised of both fabricated and purchased components, would likely have involved a multi-station design based around an intermittently-pausing central conveyor belt or rotary table, perhaps with robotic arms loading product items to or from the belt or table. In addition to the time and high expense for designing and building such a custom, dedicated system, there is also the problem that its production speed would have been dictated by the dwell time required by the slowest station.

Because custom-built machines are typically one-off designs, they often use components that are comparatively slower, more massive, expensive, and energy-consuming than the ones employed by more optimized, off-the-shelf devices. Also, a custom-built machine faces the significant expense of setting up the electronics (also known as electronic controls, control electronics, electronics package, or an electronic circuitry and power supply system; and of which the electronic circuit boards, also known as the main circuit boards or main electronic circuit boards, are a part) so that the utilized components will flawlessly communicate with each other, an effort which requires a great deal of complex programming.

Finally, custom-built machines are often hard to alter. Because of a lack of space along a conveyor or rotary table, a machine designed for producing a particular product can become obsolete overnight if a product revision requires additional or different ingredients or processing tasks—and more so if the company needs to adapt the machine to produce an entirely different product.

It would be desirable to have a self-contained, table-top automation production apparatus (also known as a tac, module or pod) which could be readily reconfigured to perform, in highly reliable and repeatable ways, different types of complex and precise operations involving small parts and/or assemblies and/or small amounts of fluids and/or materials.

It would also be desirable, for reasons of economy and versatility, to have a tac which could accommodate multiple application devices which could operate simultaneously and independently from each other—not only to perform different manufacturing operations on various types of parts, assemblies, or product items (assemble, dispense, fasten, mix, mark, measure, seal, sort, solder, spray, test or verify), but also to horizontally move, position, and reorient these parts or assemblies, especially if the devices could be positioned over a work surface which could move product items back and forth beneath it, as well as rotationally about the Z-axis.

It would likewise be desirable if application devices mounted on the machine could travel along a horizontal carriage rail assembly (also known as an X-axis rail assembly or horizontal rail assembly) that extended considerably past the central work processing area, on both sides of the frame (also known as a frame assembly) of the machine, allowing devices to load parts or assemblies from outside the work area, and further, to be able to reposition or reorient them within the work area, and then, after the parts or assemblies were processed, to transfer them from the work area to either of the two outside areas.

Added to that, it would be desirable if this extension of the horizontal carriage rail assembly allowed the application devices to access parts from two powered and integrated outboard-mounted rotary magazines. With rotary magazines located on both sides of a central work processing area, the tac could operate as a stand-alone, set-up turn-on and walk-away production center, with parts or assemblies loaded from one magazine, processed in the work area, and then unloaded to the other magazine.

Moreover, it would be desirable if the tac could function, not only as a single entity, but also as a cell within systems comprised of other tacs and/or other machines.

Furthermore, it would desirable if the tac could be quickly adapted, with many of its components easily detachable, to allow the tac, when working as a cell with other tacs—and/or machines, to lend itself to many different set-up configurations, especially if its application devices could load parts to or from the magazines of adjacent tacs, or additionally, if the devices could directly access the working areas of adjacent tacs, to load to or from them, or to process parts at them.

In addition, it would desirable if the control software for the tac had a master/slave protocol so when the tac was operating as a cell within a system, it could serve either as a master or a slave to any other tac.

Therefore, there currently exists a need in the industry for a versatile, reconfigurable, table-top automated self-loading and unloading apparatus accommodating multiple application devices with an open architecture, working with a traversing, rotary table which could accurately and repeatedly perform precise and complex tasks, while allowing its operator to employ it either as a stand-alone production platform, or as a cell within many various system configurations with other tacs or machines.

SUMMARY OF THE INVENTION

The present invention advantageously fills the aforementioned deficiencies by providing a versatile modular tabletop automated apparatus (a tac) which can be installed with different purchasable application devices to load, position, or unload, and to perform different operations on small parts and/or assemblies.

The most basic embodiment (also known as a version) of this invention (FIG. 1) comprises a frame assembly (Item 1), an electronics enclosure assembly (item 3) (also known as a housing, electronics enclosure, controls enclosure, or enclosure assembly), which has attachment interfaces on one or more of its sides to provide hookups to the electronics for application devices working with the tac, a monitor mounting bracket (Item 4), an electronics control monitor (also known as a monitor, electronics monitor, or graphical user interface) (Item 5), an extended X-axis (horizontal) rail assembly (Item 6) and a horizontal carriage assembly (Item 7) (also known as an X-axis carriage assembly, a horizontal carriage or, in the most basic embodiment of a tac, where there is no vertical carriage assembly, a carriage assembly), and, unless the invention merely uses the surface of the table upon which it is mounted as a work area, a work plate (Item 2) (also known as a work table). The work plate, the electronics enclosure assembly, the monitor mounting bracket, and the X-axis rail assembly are all supported by and secured to the frame assembly. The electronics monitor is supported by the monitor mounting bracket (also known as a support arm), and the carriage assembly is attached to, and moves along the X-axis rail assembly.

The frame assembly comprises (FIG. 2) two side plates (Item 8) which are separated by a back plate (Item 9) and a front plate (Item 10). The four plates are secured together by fasteners. The side plates provide a horizontal surface to support, if one is used, a work plate (Item 2, FIG. 1), and above it, a vertical face on which the X-axis rail assembly (Item 6, FIG. 1) is centered and secured.

The X-axis rail assembly comprises (FIG. 3) a main plate (Item 11) (also known as a horizontal carriage rail assembly main plate or a horizontal carriage rail plate), to which are attached two parallel guide rails (Item 12) (also known as horizontal carriage guide rails), one mounted above the other; at the far end of the main plate, a flanged bearing block (Item 17) (also known as a bearing block mount) is fastened to it between the two rails; this flanged bearing block, with its bearing (Item 32), supports one end of a lead screw (Item 13) (also known as a drive screw; in this instance, the horizontal carriage lead screw); the lead screw is capped with an end piece (Item 14), which presses a wave thrust washer (Item 15) against a flat washer (Item 16) against the bearing and its bearing block; threaded farther up the lead screw is a drive nut (Item 18) (also known as a horizontal carriage drive nut), which is captured by a mounting block (Item 19); with the turning of the lead screw, the mounting block traverses horizontally along the length of the rail assembly; at the near end of the lead screw is another end piece (Item 21), which connects to a second bearing (Item 32) and its flanged bearing block (Item 20), with the block fastening to the main plate (Item 11); the end piece connects to a flexible coupler (Item 22) which connects to the drive shaft of a motor (Item 24) (also known as a horizontal carriage motor); the motor is fastened to a mounting plate (Item 23) (also known as a horizontal carriage motor mount), which is secured to the main plate.

The carriage assembly comprises (FIGS. 4, 5, 6 and 7) a main plate (Item 46) (also known as a horizontal carriage plate), on the back of which are attached four bearing blocks (Item 33) (also known as linear slide horizontal carriage bearing blocks), each of which hold a linear slide bearing (Item 34); on the front of the main plate is fastened at least one slide track mounting plate (Item 35, more typically two or more, and to each slide track mounting plate is attached a pair of vertical slide tracks (Item 36) (also known as vertical device plate slide tracks); pairs of slides (Item 37) (also known as device plate slide bearings) move up and down within each slide track to guide and support the sliding application device plate (a movable type of head, also known as a device plate, mounting plate or application head) (Item 38) to which they are fastened; each of the application device plates are attached to four slides; to the top of each application device plate is attached a device plate bracket (Item 39) which holds immobile a drive nut (Item 40) (also known as a device plate drive nut), thru which is threaded a drive screw (Item 41) (also known as a lead screw; in this instance, the device plate lead screw); the upper end of each of the drive screws is threaded into an adaptor (Item 42), which then connects to a small actuator motor (Item 45) (also known as a device plate motor or gear motor); each of the motors is held in position and supported by a mounting bracket (Item 44) (also known as a device plate lead screw mounting bracket), which connects to the main plate (Item 46), while a second mounting bracket (Item 43), fastened to the main plate supports and positions the adaptors (Item 43). The application heads (Item 38) (also known as application device mounting surfaces) are used to support any application devices which are mounted to the carriage assembly of the tac.

The controls enclosure (Item 3, FIG. 1) is box-shaped, containing the main electronic circuit boards, and is fastened between the side plates, behind the X-axis rail assembly. Wiring connects the electronics to the monitor (Item 5, FIG. 5) to control or communicate with all the motors, actuators, sensors and devices placed on the tac, and to any other tac or device the tac is working within a system. Such other tacs or devices working with the tac can be connected to the electronics by utilizing the attachment interfaces (Item 213 of FIGS. 10, 36, 41 and 44) mounted on one or more sides of the controls enclosure.

When the sub-assemblies (also known as assemblies) of this most basic embodiment of a tac are put together, the four slide bearings (Item 34, FIG. 5) of the carriage assembly (Item 7, FIG. 1) ride on the two rails (Item 12, FIG. 3) of the X-axis rail assembly (Item 6, FIG. 1), while the mounting block (item 19, FIG. 3) which captures the drive nut (Item 18), is fastened to the back of the main plate of the carriage assembly (Item 46, FIG. 4). By controlling the motors connected to the drive screws (Items 13 and 41, FIGS. 3 and 4), the electronics package contained in the enclosure assembly (Item 3, FIG. 1), as programmed by the monitor (Item 5, FIG. 1), can then position application devices attached to application heads (Items 38, FIG. 4) mounted on the carriage, horizontally, anywhere along the width of the tac, and raise or lower them, separately or simultaneously, to perform different processes on the work plate (Item 2, FIG. 1), or to load, reposition, reorient or unload product items to, on, or from the work plate or to either side of the frame (Item 1, FIG. 1), including to other machines.

While a tac can be operated as a stand-alone automated unit (FIG. 1), it can also be used in a modular fashion as a cell within a larger system using multiple tacs and/or other machines.

As an example (FIGS. 36 and 37), three tacs could be used in a system where the second tac (Item 153) is positioned perpendicular to the first tac (Item 152), with one end of an X-axis rail assembly extending over the work plate of the first tac; a third tac (Item 154) could be positioned to the side and parallel to the first tac, but facing in the opposite direction; a series of discrete movements by the carriage assemblies and application heads of the tacs could be used to automatically fill empty bottles with a product item and two different liquids, and to cap them; to accomplish this, a gripping device (Item 155) mounted on the first tac (Item 152) could pick up an empty, uncapped bottle from a conveyor or magazine located (Item 156) on one side of the frame of the first tac; the bottle could be placed on the work plate and partially filled with a fluid from a mounted dispensing device (Item 157); the gripping device could move the bottle on the work plate to a different location (Item 158), one accessible by a gripping device (Item 159) mounted on the second tac (Item 153); the bottle could be picked up and relocated to the work plate (Item 160) of the second tac; the second gripping device (Item 159) could then leave the bottle and move to pick up a product item (Item 161) from a conveyor or magazine on the side opposite to the first tac, and then place the product item in the partially filled bottle (Item 160); a device mounted on the second tac (Item 162) could then dispense a second fluid to the bottle; the gripper (Item 159) of the second tac could then pick up the bottle and return it to the work plate of the first tac (Item 158); the gripper of the first tac (Item 155) could then place the bottle on a platform on the output side of the tac (Item 163); a gripping device (Item 164) on the third tac (Item 154) could pick up the filled bottle from the platform on its input side, and place it on its work place (Item 165); an auxiliary device (Item 166) adjacent to the third tac could then spray the upper surface of the bottle; a capping device (Item 167) mounted on the third tac could then cap the bottle; the gripping device (Item 164) could then move the capped bottle to the input side of the tac (Item 166), holding it above a second auxiliary device (Item 169) which could read the bar code on the label of the bottle while the bottom of the bottle could be marked with an inkjet printer; the gripper could then move the finished product to the output side of the third tac, placing the capped bottle (Item 170) on a conveyor. Note, in this example, neither the product items, the mounted application devices, nor the various auxiliary equipment (conveyors and extraneous devices) are a part of the invention, and are described merely to illustrate how the invention might be employed.

The basic, most minimal embodiment of a tac can be added to with numerous optional features, as described below:

1. The simplest option would be a longer and taller frame to accommodate all the optional equipment, in particular the travel of a vertical carriage and a traversing Y-axis table (see FIGS. 2 and 13).
2. While the most essential concept of a tac is to use application devices mounted on a horizontally extended X-axis rail assembly to both transport and process product items, the number of devices and the heads to which they are mounted is variable. As a minimum, a single combination device, mounted on a single moving device plate, could serve to both move and process product items. For instance, such a device could be a gripper mechanism with a dispensing tube centered between the gripping parts. But more typically, tacs would have different devices, mounted on multiple application heads (FIGS. 11 and 43). While the number of application heads is routinely three, the design of a tac could accommodate additional heads. Similarly, any or all of the heads could be mounted with a linear or rotary mechanism, which itself could mount multiple application devices, which might be utilized simultaneously, or one at a time.
3. Next, while the most basic tac would have a limited way to lift and lower the application heads that are mounted on the X-axis rail assembly (FIGS. 1 and 7), such as with mounting plates moved vertically by gear motors, a primary option would be to extend that distance (FIG. 11) with a vertical or Z-axis carriage assembly (FIG. 18), which would be mounted on the horizontal, or X-axis carriage assembly (FIG. 22). Such a vertical carriage, moving in the Z-axis by a motorized actuator, would enlarge the positioning and processing capabilities of any mounted application devices, as well as providing greater clearance space below them for when they are moved. Placing the motor-driven mounting plates together on a vertical carriage assembly, gives all the application heads the advantages of greater travel, while still permitting them to separately move vertically relative to each other.
4. In the Y-axis, a motorized traversing table (FIGS. 8 and 26) can be used in place of a fixed (FIG. 1) or no table, to move product items forwards and backwards. It would enable application devices mounted on the horizontal rail assembly to reach any location on the work table. Moreover, a traversing table greatly increases the ability of a tac to combine with auxiliary application equipment. By enabling product items to be delivered to them, such equipment can be positioned above the work plate, or on any or all sides of the tac, including being mounted to its frame. Because the front surface of a traversing table can be made to extend past the front of the frame, with product items held cantilevered outward, application devices can also then work on the bottom surfaces of the items (FIG. 43), or simultaneously, from both above and below. This would be especially useful for such items as circuit boards.
5. One of the more subtle options is for a tac to include a motorized rotary head (FIG. 50, shown with attached grippers) (also known as rotary device mount) which could be placed on the horizontal/vertical carriages (also known as combined carriages). Working with a traversing table, such a rotary head would allow application devices mounted on it to dispense gases, liquids, powders or gels along any path on, within, about, or even underneath an overhung perimeter of a product item—whether about the whole or any part of it, such as with components attached to a circuit board. A key feature of a rotary head is its ability to maintain the directional orientation of an applicating nozzle perpendicular to its path as it moves along the perimeter of a part: That is, the nozzle, moving along a perimeter, can always be turned inwards to dispense towards the center of the part, even while the nozzle is extending underneath an over-hanging part or lip. Even for situations where a device is not moving along the path of a perimeter of a part, a rotary head gives designers more options in handling processes. For instance, a gripping device mounted on the rotary head might would work best turned one way to pick up, a flat circuit board, but turned another, such as 90°, to pick up a different shaped component. Or the rotary head could allow a device to pick up a product item in one orientation, then rotate it to another before delivering the item to the work area. Moreover, two or more application devices could be mounted on the rotary head. For example, it could be useful to have different sized grippers to facilitate moving dissimilar items; or there could be two identical devices for simultaneously grabbing a product item at two locations; or a rotary head might mount both a gripping device and a processing one, such as for dispensing sprays or liquids, or two processing devices. Additionally, the devices could be mounted on motorized sliding tracks within the rotary head, so the devices could have limited vertical travel relative to each other.

6. Next, a rotary table (also known as a rotary work table) could be mounted in the work area (FIGS. 8 and 25), either operating by itself, or placed on top of a traversing Y-axis table (also known as a traversing table or table base). Combined with a traversing table (FIG. 24), a rotary table could deliver product items at any angle about the Z-axis to application devices, whether they are mounted on the horizontal carriage rail assembly, or on auxiliary mechanisms placed above or about the tac.

7. Besides the addition of a rotary table, the ability of a tac to work on product items at different angles can be obtained in several ways:
   a. Tilt mechanisms (also known as device tilt assemblies or device tilt mechanisms) (FIG. 57) could be attached to the application device plates mounted on the horizontal/vertical carriages. Application devices can be mounted on these tilt mechanisms so devices could move out and back at angles.
   b. Auxiliary machines above or about the tac could be set up to work at angles.
   c. Transport or processing devices mounted on a rotary head (FIG. 50) can be rotated to reorient the devices or the product items transported by them.
   d. A motorized rotary, angular positioning clamp (also known as a rotary clamp or rotary clamp assembly) (FIG. 57) could be mounted to the top of a rotary table to change the orientation of product items brought to the work table (FIG. 43).
   e. Or any of the above options could be combined (FIG. 43 shows angular positioning clamp mounted on a rotary table above a soldering device that could easily be tilted to a specific angle).

8. A key option is the addition of a motorized rotary magazine on either or both sides of the tac (FIGS. 8 and 32). Such a magazine rotates to allow product items to be delivered to or from the work area of a tac by application devices mounted on the horizontal carriage rail assembly.
   a. Identical magazines can be installed on both sides a tac, but can be run at different speeds and directions, clockwise or counter-clockwise. As opposed to the standard method of using indexing drives to move rotary tables, a rotary magazine uses continuous motion, that is, it can be rotated by any amount of angle at any time in either direction.
   b. Magazines are easily removable and reusable with other tacs.
   c. The magazines attach to the sides of a tac (FIG. 32), and are also supported by center shafts (also known as support rods), which can be easily adjusted to rest on most any surface below it.
   d. For a stand-alone tac, either magazine can serve as the input provider of product parts, while the other magazine is utilized to receive processed items. Or, since parts can enter or exit the work area of a tac from other sources, both magazines can serve for input or output.
   e. With configurations of multiple tacs, any rotary magazine can work to serve two or more tacs (FIGS. 38, 39, 40, and 41).
      The magazine can simultaneously act as the output for one or more tacs, and the input for another.
      A single magazine might serve as both the input and output for a particular tac.
   f. The tacs could be set up about a magazine side-by-side to each other and facing in the same direction, or facing in opposite directions, or perpendicular to each other, or positioned at a variety of angles about a commonly accessed rotary magazine.
   g. Magazines can be single level (FIG. 32) or multi-level (FIGS. 51 and 52), which would allow a magazine to deliver or receive more product items, whether of the same, or of different type items.
      The vertical range of a Z-axis carriage could be increased to allow a tac to use a rotary magazine having more than two levels.
      A tac might load some products to the lower disc, and others to an upper disc depending on a programmed logic.
         For instance a tac utilizing a bi-level magazine, set up to automatically test products, might place positive-testing products on one level, and negative-testing ones on the other.
         Even though the tac might have an ink-jet device definitively marking each product as accepted or rejected, separating them would make it more convenient and foolproof for operators to box them up separately without mixing the items together.
         In a multi-tac configuration, two or more magazines might be used to input product items into a system. If a single-level magazine is positioned at the end of the system, serving as the final output, it might become filled too quickly. Placing a multi-level magazine at the end location can multiply the amount of time a system can run without interruption for emptying.

9. Link parts (FIGS. 40 and 41), which can connect to the center shaft of a rotary magazine, and mount to the side of tacs, enable two or three tacs to be easily linked together, to help maintain their relative positioning and stability.

10. Customizable nests (Item 188, FIGS. 42, 43, and 47), which are easily removable plastic holding containers, can be placed along the outer perimeters of rotary magazines. The purpose of the nests is to isolate, position, and orientate product items for delivery or reception, to or from tacs.
    a. The same magazine might be equipped with different and perhaps alternating types of nests, or different sized nests on different levels of a magazine.
    b. Different tacs might output product items to the same nests, each placing parts in different locations on each nest. Or separate tacs might output to alternating nests.
    c. The nests can be sized to fill different angular sections of the outer top of the magazines, in order to accommodate different operations and product items. For instance, a single-level rotary magazine could be equipped with 24 nests 15° wide, or 36 nests 10° wide, or 18 alternating pairs of 8° and 12° nests, or various other options.
   d. The upper surfaces of nests can shaped to position and support any number of part geometries.
11. Customizable pallets (FIGS. 53-55), which are removable positioning and support structures for holding product items, can be used with a tac.
   a. Free-standing pallets can be placed on either or both sides of the main frame of the tac, or on a support structure, or on a positioning mechanism, such as a powered X-Y table.
   b. Pallets can be placed on any disc of a rotary magazine, and can be of numerous shapes to accommodate different products and processes. A bi-level rotary magazine might operate with two or more pallets, which can be different-shaped, on one or more discs, as well as with nests on the same or different discs.
   c. Pallets can be mounted in the central working area of the tac:
      whether free-standing or on a stationary work table of the tac.
      on a positioning mechanism, such as a powered X-Y or rotary work table, which itself could be free-standing or on a stationary work table of the tac.
      or on a traversing Y-axis table of the tac.
      or on a rotary table mounted on top of traversing Y-axis table of the tac.
      More than one pallet could be utilized, and pallets can have multiple shapes.
12. Typically, the X, Y, and Z-axis carriages are set up to use two parallel rails (FIGS. 3, 17 and 31). But the number of rails could be one, two or more.
13. To facilitate the monitoring and control of tacs operating in multi-tac configurations (FIGS. 38 and 39), an important option is to set up their programming software so any tac can act as the master or the slave to any other tac.
14. While there are different available ways to sense, zero out, and monitor the positioning of the moving components of the tac, a convenient option is to set up the horizontal and vertical carriage assemblies, as well as the Y-axis traverse table, to use spring-loaded bumper shafts working with sensing pads (FIGS. 3, 12 and 22).
15. The X, Y & Z axis moving components could be made to employ any of the different types of linear slide actuators: mechanical, electrical, pneumatic, or hydraulic, whether using a screw, belt, or rod type of design, and to be driven by different types of motors. However, for design simplicity, the best option for many parts of the tac appears to be the use of drive screws working with stepper motors (FIGS. 3, 12 and 22).
16. As relatively routine but practical options, tacs can be equipped with flexible cable carriers, placed above the horizontal and vertical carriage assemblies (FIGS. 12 and 23), and below the Y-axis traversing table, in order to keep the wiring attached to the moving equipment from getting tangled or snagged. Similarly an articulated positioning arm mechanism (Item 33, FIGS. 8 and 9) can be used to mount the control monitor. Such a device allows operators greater ease in positioning the monitor for use, or for moving it more out of the way.
17. A second and wider horizontal carriage rail assembly, facing in the opposite direction as the first, can be attached to the front of the frame (FIGS. 54 and 55). This allows the invention to access a second point on adjacent rotary magazines, 90° from the first (the point nearest to the main assembly). By having two horizontal carriages, each with their own vertical assemblies carrying multiple application devices, the invention can as much as double its production speed.
18. The one or more advanced horizontal carriage assemblies can be added to, or replaced by more basic and stripped-down horizontal carriages or actuator mechanisms. These mechanisms, while they might have no or only limited ability to move application devices vertically, they could move one or more device plates application devices horizontally to bring them in and out of desired positions. These more basic assemblies can be attached to the side plates of the frame of the invention to extend over the central work area, or to the front or back plates of the frame, which could allow devices to work on either the top or bottom side of parts. To work on the bottom of parts, the product items would need to be extended out from the central work area (FIGS. 43 and 45).
19. A primary intent of this invention, is to accommodate the linking up of tacs in multi-cell configurations (FIGS. 36-41), providing a modular alternative approach to using dedicated, custom-built systems which function by intermittently pausing product items at work stations placed along conveyor lines or about rotary tables.
   a. Because of their modular nature, linked tacs can be employed in an unnumbered variety of configurations, working with other tacs and/or other machines.
      i. Tacs can access product items located on the magazines of adjacent tacs, or on their work tables.
      ii. Tacs can be positioned parallel, perpendicular, or at various angles to each other, with the separate tacs facing in either direction.
      iii. By their flexible nature, configurations can often be readily constructed to fit the process requirements and the geometry of the available floor space.
      iv. Configurations can be easily taken apart, and the tacs reused in other applications and configurations—offering savings in equipment costs, floor space, and maintenance time.
   b. Unlike intermittently-pausing rotary tables or conveyor-based machinery, configurations of tacs can be non-linear in their functioning.
      i. With a conveyor or rotary table-based system, the production speed of a line is typically determined by the time required by its slowest work station.
      ii. However, two or more tacs can be set-up in parallel to duplicate a particularly time-consuming process. Merely by adding one tac to work in parallel with another, a system can as much as double the production speed of a line.
      iii. Likewise, tacs can be used to partially process a product, to then stage it on a slowly turning rotary magazine to provide it with a required duration of curing time. After the curing, the parts can be retrieved from the rotary magazine, and placed back into a system for further processing.
      iv. Dedicated manufacturing systems, custom-built about a conveyor or a rotary table, can be made obsolete overnight by product changes. Revisions calling for new processes or ingredients can require adding work stations to lines for which there is insufficient space. However, such lines can often be salvaged by adding one or more tacs. The tac or tacs, can take unfinished products off an existing conveyor or rotary table, process them, and then return them near or at the point from where they exited.
20. Finally, as an option, the materials of the components of tacs can be chosen so as to require no lubrication, and to satisfy requirements stipulated by the U.S. Food and Drug Administration, able to withstand daily acid washes.

Due to its design as a readily configurable, fully automated, integrated machine, coupled with the economy of a single electronics package; the functioning of the tac is unique when compared with previous custom-built devices and solutions, as described below:
1. It is able, by utilizing available commercial application devices, to perform, in highly repeatable and precise ways, many different intricate production operations; such as to assemble, dispense, fasten, mix, mark, measure, seal, sort, solder, spray or verify them.
2. It provides an integrated system for automatically presenting parts or assemblies for loading, or for receiving unloaded items, by way of two powered rotary magazines, which are available in different sizes, especially to accommodate operations where the inflowing parts require more space than the outflowing assembled product.
3. It optimizes the positioning of the parts or assemblies for their delivery or in their reception, by using customized, replaceable, molded nests or pallets fitted for the magazines.
4. It allows for a simpler and economical way to load, process and unload parts and assemblies by employing multiple application heads mounted on a single vertical carriage assembly mounted on a horizontal carriage functioning on an extended horizontal carriage rail assembly; with the application heads using an open architecture (making them adaptable to a multiplicity of tooling), so they can be differently configured and individually raised or lowered to perform distinct tasks, separately or simultaneously, on the same or different product items, or to move product items about the central work area, or to and from the rotary magazines of the tac.
5. It is also able to move parts and assemblies to and from other types of machines, and the central work areas or magazines of adjacent tacs.
6. It can be easily converted to function as either a stand-alone, set-up, turn-on and walk-away production unit, or as a cell within a manufacturing system made up of other tacs and/or machines;
7. It is able, when operating as a cell within a system, to serve as a master or a slave to any other tac, because each tac is equipped with an electronics package controlled by a master/slave protocol.
8. It is able to process parts, not only at its central work area or rotary magazines, but also, without moving them elsewhere, on another kind of machine, or at the work areas or magazines of adjacent tacs.
9. It consolidates all the automated parts of the tac into one electronics package, so that anyone using one or many tacs to build a production system will be spared hours of programming time which otherwise would have to spent in connecting components so they could properly communicate with the software of each other.
10. By utilizing dispensing devices on a new type of rotary head, it provides a new and simplified way to intricately dispense coatings around the perimeters of variously shaped geometrical items within parts, such as components on circuit boards, and allowing the dispensing or to come from either above or below the part.
11. It enables its optional Y-axis traversing table to permit work items to extend past the front of the frame, allowing outside operations to access both the tops and bottoms of items at the same time, which can be of significant benefit since connectors are typically attached (pinned, soldered, etc.,) along one edge of a printed circuit board.
12. It is designed to work with other tacs and machines in non-linear configurations—for example, by using multiple tacs set-up to work in parallel to simultaneously perform a particularly time-consuming process, or to temporarily stage processed parts on rotary magazines to provide them with required curing times, the cycle time of a system is no longer dictated by its slowest processes.
13. It can as much as double its production speed by using two horizontal X-axis rail assemblies, facing each other from opposite ends of the frame, to load and unload parts, not only from the nearest point of an adjacent rotary magazine, but also from a point 90° from that nearest point.
14. It can eliminate the need for companies to maintain machines dedicated solely to infrequently-performed production operations; this is due to the facility of the tac to be reconfigured for short-term runs and to be combined with other tacs; accordingly, companies can free up valuable production space.
15. It allows companies to restore the value of machines seemingly made obsolete by product revisions, by patching into them with one or more tacs, which can then take items off their conveyor belts, rotary tables or staging areas, perform the necessary new processes, and then return the items back on-line.
16. It can be daily acid-washed, per the requirements of the United States Food and Drug Administration and not be damaged by it, especially due to the materials used in its design.

The present invention is unique in that it is structurally different from previous devices or solutions. Specifically, the present invention is unique due to the ways its structure can combine the presence of several specific components as a system. These components are:
1. a central work area, which, in its most basic form, is a fixed stationary plate or simply the table surface upon the invention is mounted, but more typically is an automated rotary table mounted on an automated back-and-forth traversing table;
2. powered, yet detachable, rotary magazines, outboard-mounted on either side of the frame of the tac, available in different size diameters to accommodate the process, and not necessarily using the same size magazine on both sides of the tac;
3. replaceable, customized, molded part nests and pallets designed to fit within the magazines for positioning parts;
4. multiple application heads, typically three, separately mounted on a vertical carriage assembly, which employ an open architecture (making them adaptable to a multiplicity of tooling), so they can be differently configured and individually raised or lowered to perform distinct tasks, separately or simultaneously, or to move product items;
5. an especially wide horizontal carriage rail assembly which extends well past both sides of the frame of the tac frame and over the near sides of the rotary magazines, upon which a horizontal carriage travels, which itself supports a vertical carriage, allowing the application heads to move parts and assemblies to and from the magazines to the central work area;

6. an optional second, and even wider horizontal carriage rail assembly, facing the first, enabling the invention to access a second point on adjacent rotary magazines, 90° from the first access point, which would be the point nearest on a rotary magazine;
7. the geometries of the frame and the rotary and traversing tables, coupled with the detachability of the rotary magazines, allowing the application heads of one tac to access the magazines and the entire work tables of adjacent tacs;
8. the geometries of the frame and the rotary and traversing tables, allowing part of the rotary table to extend inches past the front of the frame of the tac, allowing outside operations to simultaneously access the tops and bottoms of the front ends of work items;
9. a rotary head mechanism upon which one or more application devices can be mounted to perform production operations within or about the perimeters of small items, whether from above or below, including under projecting lips or product surfaces;
10. link parts to enable the easy attachment and proper spacing of two or three tacs about a single rotary magazine;
11. the use of component materials to allow the entire tac to be daily acid-washed without damage, per the requirements of the United States Food and Drug Administration;
12. a single electronics package controlling all the automated components which enable the tac to function as a stand-alone, self-loading and unloading, fully automated production module;
13. a master/slave protocol which controls the electronics package, so any tac operating as a cell within a larger system, can serve as a master or a slave to any other tac:

Among other things, it is an object of the present invention to provide a modular automated table-top production tac which can be used either as a stand-alone unit, or as a cell within a system of other tacs or machines, that does not suffer from any of the problems or deficiencies associated with prior solutions.

It is still further an object of the present invention to provide a simple, yet robust design which is readily reconfigurable to accommodate the handling of multiple types of precise and complex production processes in in highly reliable and repeatable ways.

Further still, it is an object of the present invention to provide a production machine which can be daily acid-washed without damage, per the requirements of the United States Food and Drug Administration.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

1. A table-top automation apparatus comprising:
   a) a frame having two side plates, a front plate and a back plate, wherein said two side plates form one or two pairs of upper vertical mounting supports, wherein said second pair of upper vertical mounting supports face the first pair, from front to rear of said frame;
   b) at least one horizontal carriage rail plate, each having a left side, a right side, a top and a base and a rear and a front face, at least two horizontal carriage guide rails on said front face, a horizontal carriage motor mount on said left side of said front face, a left side horizontal carriage bearing block mount and a right side horizontal carriage bearing block mount positioned in horizontal alignment to each other and attached to said front face of said horizontal rail plate, wherein said rear face of each said horizontal carriage rail plate is affixed to one pair of said one or two pairs of upper vertical mounting supports, wherein each said horizontal rail plate extends beyond said two side plates of said frame;
   c) one horizontal carriage lead screw rotatably mounted on each said left side horizontal carriage bearing block mount and each said right side horizontal carriage bearing block mount;
   d) one horizontal carriage drive nut mounted to each said horizontal carriage lead screw;
   e) a horizontal carriage motor affixed to each said horizontal carriage motor mount and connected to each said horizontal carriage lead screw;
   f) a horizontal carriage plate having a back side and a front side, wherein said backside of said horizontal carriage plate having a left back side and a right back side, wherein said left back side and said right back side each having at least two linear slide horizontal carriage bearing blocks which engage said at least two horizontal carriage guide rails on each said horizontal carriage rail plate;
   g) one or more pairs of vertical device plate slide tracks attached to said front side of said horizontal carriage plate;
   h) a device plate lead screw mounting bracket attached to said horizontal carriage plate above each said pair of vertical device plate slide tracks;
   i) a device plate lead screw mounted on each said device plate lead screw mounting bracket;
   j) a device plate drive nut mounted on each said device plate lead screw;
   k) a device plate motor affixed to each said device plate lead screw mounting bracket and connected to each said device plate lead screw;
   l) a device plate mounted to each said device plate drive nut, wherein each device plate having a forward side and a rear side wherein said rear side having two or more device plate slide bearings, wherein said device plate slide bearings are affixed to each said pair of vertical device plate slide tracks of said horizontal carriage plate, and wherein said forward side of said device plate having a space to mount at least one device or apparatus;
   m) an electronic circuitry and power supply system contained within one or more housing, each said housing having a top side, a left and right side, and being mounted within said frame, wherein said electronic circuitry and power supply system connects to each said each horizontal carriage motor and to each said device plate motor; and
   n) one or more attachment interfaces mounted on one or more sides of said one or more said housings of said electronic circuitry and power supply system, wherein said attachment interfaces are connected to said electronic circuitry and power supply system to provide hookups to power, control or track said devices or apparatus operating in conjunction with said table-top automation apparatus, including with other units of said table automation apparatus.

2. A table-top automation apparatus according to claim 1, wherein said two side plates further comprise:
   a) two horizontal mounting supports on a lower portion of said frame; and
   b) a horizontal work plate supported by said two horizontal mounting supports of said two side plates.

3. A table-top automation apparatus according to claim 1, wherein said two side plates of said frame further comprise:
   c) two horizontal mounting supports on a lower portion of said frame;
   d) two table base guide rails mounted within said frame between said front plate and said back plate on said frame, one mounted on each said side plate, wherein said two table base guide rails are oriented horizontally and aligned to each other;
   e) two table base drive bearing mounts, each affixed to and within said frame and positioned about the center between said two side plates, one table base drive bearing mount affixed about the front of said frame, and one affixed about the rear of said frame;
   f) a table base drive lead screw rotatably mounted on said two table base drive bearing mounts;
   g) a table base drive nut mounted to said table base drive lead screw;
   h) a table base drive motor affixed to said frame on said back plate positioned about the center between said two side plates, and connected to said table base drive lead screw, wherein said table base drive motor is connected to said electronic circuitry and power supply system;
   i) a left side pair of table base slide bearing blocks affixed to said two table base guide rails and a right side pair of table base slide bearing blocks positioned in alignment to each other and affixed to said two table base guide rails; and
   j) a table base having an upper surface and a bottom surface, wherein said bottom surface attached to said table base drive nut and to said left side pair of table base slide bearing blocks and said right side pair of table base slide bearing blocks.

4. A table-top automation apparatus according to claim 3, further comprising:
   a) two worm drive bearing mounts attached to said bottom surface of said table base;
   b) a worm drive rod attached to said two worm drive bearing mounts;
   c) a worm drive motor attached to said bottom surface of said table base, and connected to said worm drive rod, wherein said worm drive motor is connected to said electronic circuitry and power supply system;
   d) a rotary work table having an upper surface and a lower surface, having a bearing ring attached to said lower surface of said rotary work table, wherein said bearing ring positioned upon said upper surface of said table base and said bearing ring centered on a cylindrical feature of said table base;
   e) a gear mount having a upper side and a lower side, wherein said upper side attached on said lower surface of said rotary work table and centered within said bearing ring, wherein said bottom side of said gear mount extends below said lower side of said table base; and
   f) a worm gear affixed on said gear mount wherein said worm gear is engaged to said worm drive rod.

5. A table-top automation apparatus according to claim 1, further comprising:
   a) a horizontal carriage plate having a back side and a front side, wherein said back side of each said horizontal carriage plate is attached to said horizontal carriage drive nut, wherein said back side having a left back side and a right back side, wherein said left back side and said right back side each having two linear slide horizontal carriage bearing blocks which engage said at least two horizontal guide rails on each said horizontal carriage rail plate, wherein said front side of said horizontal carriage plate having a right side, a left side, a vertical carriage motor mount, two or more pairs of vertical carriage slide bearing blocks, and two vertical carriage drive bearing mounts, wherein said one or more pairs of vertical carriage slide bearing blocks are vertically aligned on said left side of said horizontal carriage plate, and said one or more pairs of vertical carriage slide bearing blocks are vertically aligned on said right side of said horizontal carriage plate, wherein said vertical carriage motor mount is attached perpendicular to, and horizontally positioned about the center on said front side of said horizontal carriage plate, wherein two vertical carriage drive bearing mounts are horizontally positioned about the center on said front side of said horizontal carriage plate, one above the other, one on an upper portion of said front side, and one on a lower portion;
   b) a vertical carriage lead screw rotatably mounted on said two vertical carriage drive bearing mounts;
   c) a vertical carriage drive nut mounted to said vertical carriage lead screw;
   d) a vertical carriage motor affixed to said upper side of said vertical carriage motor mount and connected to said vertical carriage lead screw, wherein said vertical carriage motor is connected to said electronic circuitry and power supply system;
   e) a vertical carriage plate having a front side and back side, wherein said back side of said vertical carriage plate is attached to said vertical carriage drive nut, wherein said back side having a left back side and a right back side, wherein said left back side and said right back side each having two vertical guide rails, wherein said left back side vertical guide rail is engaged to said pair of vertical carriage slide bearing blocks attached to said right front side of said horizontal carriage plate and said right back side vertical guide rail is engaged to said pair of vertically aligned linear slide vertical carriage slide bearing blocks attached to said left front side of said horizontal carriage plate, wherein said front side of said vertical carriage plate having at least one pair of vertical device plate slide tracks and a device plate lead screw mounting bracket above each said pair of vertical slide tracks, wherein said front side of said vertical carriage plate having at least one space to mount a device or apparatus, wherein said space can be on the left or right of said at least one pair of vertical device plate slide tracks, or located between a pair of said vertical device plate slide tracks;
   f) a device plate lead screw mounted on each said device plate lead screw mounting bracket;
   g) a device plate drive nut mounted on each said device plate lead screw;
   h) a device plate motor affixed to each said device plate lead screw mounting bracket and connected to each said device plate lead screw, wherein each said drive plate motor is connected to said electronic circuitry and power supply system; and i) a device plate mounted to each said device plate drive nut, wherein each device plate having a forward side and a rear side, wherein said rear side having a pair of device plate slide bearings, wherein said pair of device plate slide bearings affix to said pair of vertical device plate slide tracks of said horizontal carriage plate, and wherein said forward side having a space to mount at least one device or apparatus.

6. A table-top automation apparatus according to claim 1, further comprising:
   a) one or two rotary magazine base plates, wherein each said rotary magazine base plate having a top surface and a side surface, wherein said rotary magazine base plate is horizontally oriented and symmetrical about a centerline located along said top surface and perpendicular to said side surface, wherein said side surface is mounted to an outer surface of one said side plate of said frame, wherein said rotary magazine base plate extends perpendicular outward from said frame, wherein if said table-top automation apparatus comprises two said rotary magazine base plates, one said rotary magazine base plate would be mounted to an outer surface of each said side plate of said frame, wherein said rotary magazine base plates are positioned so any devices supported from the horizontal carriage rail plate can be moved to be located above said rotary magazine base plates;
   b) a support rod connected to said rotary magazine base plate, wherein said support rod is vertically perpendicular to said top surface of said rotary magazine base plate, wherein said support rod having a bottom surface, wherein said bottom surface can rest upon same supporting surface as upon which rests said frame of said table-top automation apparatus;
   c) one or more sets of three or more disc bearing blocks, wherein each said set of three or more disc bearing blocks attach to said top surface of said rotary magazine base plate, wherein said three or more disc bearing blocks of each said set are radially aligned and equally spaced about said support rod, wherein each said set of disc bearing blocks, if there are more than one said set, establish different bearing support heights above said rotary magazine base plate;
   d) one or more sets of disc bearings, wherein one set of disc bearings mount on each said one or more sets of three or more disc bearing blocks, wherein each said set of disc bearings can support a vertical load from above, and bear a radial load centered about said support rod;
   e) one or more discs of a first type, each said disc of a first type having a top and bottom surface, wherein each said disc of a first type is orientated horizontally, wherein each said disc of a first type is supported and centered by one said set of disc bearings, wherein said discs of a first type, if there are more than one, are positioned concentrically one above another, and each said disc of a first type which is located above another has one or more cut out slots projected inwards from its outer perimeter;
   f) one or more gear mounting rings, wherein each said gear mounting rings having a top, a bottom and an inner surface, wherein said bottom surface of each said gear mounting ring affixes to said top surface of each said disc;
   g) one or more internal gears, wherein each said internal gear attaches to said inner surface of one said gear mounting ring;
   h) one or more disc motor mounts, each said disc motor mount having a top surface, wherein each said disc motor mount attaches to either said top surface of said rotary magazine base plate or to one or more said disc bearing blocks, wherein said top surface of each said disc motor mount is located above said top surface of every said gear mounting ring;
   i) one or more disc motors, each said disc motor having a drive shaft, wherein each said motor attaches to said top surface of each said or more disc motor mounts, wherein each said disc motor is connected to said electronic circuitry and power supply system;
   j) one or more disc spur gears, each said disc spur gear attached, either directly or by a connecting shaft, to said drive shaft of each said one or more disc motors; and
   k) one or more link pieces, each link piece having a horizontal orientation and two ends, wherein one said end of each said link piece connects to one said support rod, and said other end of each said link piece mounts to a said side plate of a said table-top automation apparatus which is not the same said table-top automation apparatus which comprises one said support rod, wherein one or more link pieces connect an equal number of said table-top automation apparatuses to one said support rod in addition to said table-top automation apparatus which comprises said support rod, wherein each said link plate extends perpendicular outward from each said frame of each said table-top automation apparatus.

7. A table-top automation apparatus according to claim 5, further comprising:
   a) a set of three or more spacer blocks, each said spacer block having a top and bottom surface, wherein each said bottom surface of said spacer blocks is attached to, and equally placed radially about said top surface of topmost said gear mounting ring; and
   b) a disc of a second type, having a smaller diameter than said discs of said first type, wherein said disc of said second type having a top and bottom surface, wherein said bottom surface attaches to said top surfaces of said set of three or more spacer blocks, wherein the turning of upper-most said disc of a first type will simultaneously turn said gear mounting ring affixed to said disc of a first type, said set of three or more spacer blocks and said attached disc of a second type.

8. A table-top automation apparatus according to claim 4, further comprising:
   a) a rotary device bracket having a front side and rear side, wherein said rear side of said rotary device bracket is mounted to said front side of said vertical carriage plate;
   b) a rotary housing base having a modified toroidal shape having an inner, outer and bottom wall, a center core through opening, an open top exposing a circular inner cavity contained between said inner, outer and bottom walls, and a rear opening in said outer wall, wherein said outer wall is attached to said front side of said rotary device bracket; wherein said inner and outer wall each have a top surface, wherein said top surface of said outer wall extends above said top surface of said inner wall;
   c) a gear ring having external teeth, wherein said gear ring is seated on said bottom wall within said circular inner cavity of said rotary housing base;
   d) a gear belt having inner teeth, wherein said inner teeth engage said external teeth of said gear ring within said circular inner cavity of said rotary housing base, wherein a portion of said gear belt is extended out said rear opening in said outer wall of said rotary housing base;

e) a turntable having a ring shape and a top, bottom and inner side, wherein said bottom side of said turntable is seated upon said top surface of said inner wall of said rotary housing base, wherein said bottom side of said turntable is attached to said gear ring, wherein when said gear ring is turned by said gear belt, said turntable is turned as well, wherein said turntable having one or more mounting protrusions which extend inward from said inner side of said turntable over and above said center core through opening of said rotary housing base;

f) a cover plate having a top and bottom surface and a circular opening to expose said center core through opening of said rotary housing base; wherein said bottom surface of said cover plate attaches to said top surface of said outer wall of said rotary housing base, wherein said bottom surface of said cover plate serves to center and captivate said top side of said turntable, wherein said circular opening of said cover plate enables devices mounted to said mounting protrusions of said turntable to rotate within said center core through opening of said rotary housing base without obstruction from said cover plate;

g) a rotary device motor attaches to said top surface of said cover plate, wherein said rotary device motor is connected to said electronic circuitry and power supply system; and h) a rotary device gear spur attaches to drive shaft of said rotary device motor attached to said cover plate, wherein said rotary device gear spur engages said inner teeth of said gear belt.

9. A table-top automation apparatus according to claim 4, further comprising:

a) a cable carrier support plate having an upper, base and rear surfaces, wherein said cable carrier support is affixed to said upper surface of said horizontal carriage plate, wherein said cable carrier support plate extends perpendicular out from said back side of said horizontal carriage main plate, wherein said cable carrier support plate can be an extended portion of said rear side of said vertical carriage motor mount;

b) a cable carrier back plate having a front side, wherein said front side of cable carrier back plate is attached to said rear surface of said cable carrier support plate;

c) a horizontal cable carrier, wherein said horizontal cable carrier being a single, continuous, flexible, segmented, commercially available product for purchase having two ends and an inner channel running the length of said horizontal cable carrier, through which said inner channel is routed electrical power and control lines connecting said vertical carriage motor, said device plate motors, and said devices attached to said device plates to said electronic circuitry and power supply system or to said one or more attachment interfaces mounted on one or more said sides of said one or more said housings of said electronic circuitry and power supply system, wherein one end of said horizontal cable carrier is attached to said top left or right side of said one of more housing of said electronic circuitry and power supply system, wherein said one end of said horizontal cable carrier laying horizontally across said top side of said one of more housing of said electronic circuitry and power supply system, forming a lower portion, wherein said horizontal cable carrier is bended upwards and horizontally back over said lower portion of said cable carrier, and is attached at its upper end to said upper surface of said cable carrier support plate, wherein said horizontal cable carrier flexes back and forth in serpentine fashion as said horizontal carriage plate travels left and right on said horizontal carriage guide rails; and d) two or more vertical cable carriers, each being a single, continuous, flexible, segmented, commercially available product for purchase having two ends and an inner channel running the length of said vertical cable carrier, through which said inner channel is routed electrical power and control lines connecting said vertical carriage motor, said device plate motors, and said devices attached to said device plates to said electronic circuitry and power supply system or to said one or more attachment interfaces mounted on one or more said sides of said one or more said housings of said electronic circuitry and power supply system, wherein one end of each said vertical cable carrier is attached to said front side of said cable carrier back plate, forming a rearward portion of each said vertical cable carrier, wherein said rearward portion of each said vertical cable carrier is extended upwards and is bended forward and downwards in front of said rearward portion of said vertical cable carrier, and is attached at its lower end to the upper portion of said forward side of one said device plate, or to said top of said front side of said vertical carriage assembly above said space provided to mount a device, wherein each said vertical cable carrier separately flexes up and down in serpentine fashion as said device plates or said vertical carriage assembly move up and down.

10. A table-top automation apparatus according to claim 1, further comprising:

a) a support arm with two ends, one end being a bracket which attaches to an outer, upper surface of one said side plate, and said other end being a device mounting plate, wherein said support arm assembly can be a commercially available product for purchase, wherein said support arm assembly can pivot on said bracket forwards and rearward relative to said frame; and b) a monitor attaches to said mounting plate of said support arm, wherein said monitor being an electronic graphical user interface, a commercially available product for purchase, wherein said monitor is connected by power and control lines to said electronic circuitry and power supply system.

11. A table-top automation apparatus according to claim 6, further comprising:

a) one or more nests having wedge shapes, wherein said nests are attached to said top surfaces of said one or more discs of said first type, wherein said nests are fabricated to custom shapes and sizes to hold, position and orient one or more work items for pick-up, receiving, or processing by devices operating in conjunction with said table-top automation apparatus, wherein said nests are easily removed or replaced, wherein said nests, whether identical or of different sizes, can be fitted together in angular arrays on said top surfaces of said one or more discs of said first type; and b) one or more ring-shaped pallets, wherein said ring-shaped pallets can be attached to said top surfaces of said one or more discs of said first type, wherein said one or more pallets are fabricated to custom shapes and sizes to hold, position and orient one or more work items for pick-up, receiving, or processing by devices operating in conjunction with said table-top automation apparatus, wherein said one or more pallets can be easily removed or replaced.

12. A table-top automation apparatus according to claim 7, further comprising:
   a) one or more nests having wedge shapes, wherein said nests are attached to said top surfaces of said discs of said second type, wherein said nests are fabricated to custom shapes and sizes to hold, position and orient one or more work items for pick-up, receiving, or processing by devices operating in conjunction with said table-top automation apparatus, wherein said nests are easily removed or replaced, wherein said nests, whether identical or of different sizes, can be fitted together in angular arrays on said top surfaces of said one or more discs of said second type; and
   b) one or more ring-shaped pallets, wherein said ring-shaped pallets can be attached to said top surfaces of said one or more discs of said second type, wherein said one or more pallets are fabricated to custom shapes and sizes to hold, position and orient one or more work items for pick-up, receiving, or processing by devices operating in conjunction with said table-top automation apparatus, wherein said one or more pallets can be easily removed or replaced.

13. A table-top automation apparatus according to claim 3, further comprising:
   a) one or more pallets, wherein said pallets are attached to said upper surface of said table base, wherein said one or more pallets would be fabricated to custom shapes and sizes to hold, position and orient one or more work items for pick-up, receiving, or processing by devices operating in conjunction with said table-top automation apparatus, wherein said one or more pallets can be easily removed or replaced by different said one or more pallets, wherein said one or more pallets can simultaneously hold, position and orient similar work items in different ways.

14. A table-top automation apparatus according to claim 4, further comprising:
   a) one or more pallets, wherein said pallets are attached to said upper surface of said rotary work table, wherein said one or more pallets would be fabricated to custom shapes and sizes to hold, position and orient one or more work items for pick-up, receiving, or processing by devices operating in conjunction with said table-top automation apparatus, wherein said one or more pallets can be easily removed or replaced by different said one or more pallets, wherein said one or more pallets can simultaneously hold, position and orient similar work items in different ways.

15. A table-top automation apparatus according to claim 4, further comprising:
   a) a rotary clamp frame having a single rigid body having a left and right side, an inside and an outside, a front and rear side, a base plate, two outer mounting projections, two inner mounting projections, wherein said base plate of said rotary clamp frame is attached to said top surface of said rotary table, wherein said two outer mounting protrusions project upwards from said base plate, one on said outside of said left side and one on said outside of said right side, wherein said two inner mounting projections project upwards from said base plate, one on said inside of said left side and one said inside of said right side;
   b) an outer clamp motor mounted to said rotary clamp frame on said outside of said left side of said two outer mounting projections, wherein said outer clamp motor is connected to said electronic circuitry and power supply system;
   c) an inner clamp motor mounted to said rotary clamp frame on said outside outer said right side of said two outer mounting projections, wherein said inner clamp motor is aligned with said outer clamp motor, wherein said inner clamp motor is connected to said electronic circuitry and power supply system;
   d) an outer clamp, a rotatably single rigid body having a left and right side, an inside and an outside, two vertical side pieces and a cross piece, wherein said left vertical side piece is positioned between said left outer and inner mounting projections of said rotary clamp frame, wherein said left vertical side piece attaches to drive shaft of said outer clamp motor, wherein said right vertical side piece is positioned between said right outer and inner mounting projections of said rotary clamp frame, wherein said cross piece of said outer clamp connects said inner sides of said two vertical side pieces, wherein said cross piece having a mounting surface on one side which, when said outer clamp is rotated to face said mounting surface downwards and horizontal, said mounting surface stands set back and above said horizontal plane of alignment of said inner and outer clamp motors;
   e) two or more clamp bearings of a first type mount to said rotary clamp frame to center and support said vertical side pieces of said outer clamp about the shared axis of rotation of said outer clamp motor and said inner clamp motor;
   f) an inner clamp, a rotatably single rigid body having a left and right side, an inside and an outside, two vertical side pieces and a cross piece, wherein said left vertical side piece is positioned inside of said left inner mounting projection of said rotary clamp frame, wherein said right vertical side piece is positioned inside of said right inner mounting projection of said rotary clamp frame, wherein said right vertical side piece attaches to drive shaft of said inner clamp motor, wherein said cross piece connects said inner sides of said two vertical side pieces, wherein said cross piece having a mounting surface on one side which, when said inner clamp is rotated to face said mounting surface upwards and horizontal, said mounting surface stands set back and below said horizontal plane of alignment of said inner and outer clamp motors;
   g) two or more clamp bearings of a second type mount to said rotary clamp frame to center and support said vertical side pieces of said inner clamp about the shared axis of rotation of said outer clamp motor and said inner clamp motor;
   h) two clamp extensions, being identical, each having an inner, outer, and front surface, wherein said inner and outer surfaces are parallel to each other, and said front surface is perpendicular to said inner and outer surfaces, wherein said outer surface of one clamp extension attaches to said mounting surface of said outer clamp, and said outer surface of said other clamp extension attaches to said mounting surface of said inner clamp, wherein, when said outer and inner clamps are separately rotated to place said mounting surfaces of said outer and inner clamps horizontal and parallel to each other, said inner surfaces of two said clamp extensions meet together at said horizontal plane of alignment of said inner and outer clamp motors, and said front surfaces of said clamp extensions are placed into alignment and extend out beyond said front side of said rotary clamp frame, wherein said inner and front surfaces of said two clamp extensions can be custom machined or equipped with additional parts to clamp and unclamp different types of work items, and to rotate and position said work items vertically or horizontally or at any angular position between vertical and horizontal.

16. A table-top automation apparatus according to claim 5, further comprising:
    a) a device tilt base plate, wherein said device tilt base plate having a front and rear surface, wherein said rear surface of said tilt base plate can attach to said forward side of one said device plate or to said front side of said vertical carriage plate in said space available to mount a device or apparatus;
    b) two or more stand-off parts, wherein said stand-off part having a forward and rear surface, wherein said rear surfaces of said stand-off parts attach to said front surface of said tilt base plate;
    c) a tilt motor plate having a forward and rear side, wherein said rear side attaches to said front surfaces of said two or more stand-off parts;
    d) a device tilt motor, having a drive shaft, attaches perpendicularly to said rear surface of said tilt motor plate, wherein said drive shaft extends through to said forward side of said tilt motor plate, wherein said device tilt motor is connected to said electronic circuitry and power supply system;
    e) a device tilt forward bracket having a front and rear side, left and right side, an arm projecting rearward from each of the left and right sides, and a shaft positioned about the center of said front side and protruding forward, wherein said front side is facing said rear side of said tilt motor plate, wherein said shaft extends rotatably through said tilt motor plate to said forward side of said tilt motor plate, wherein said rear side of said device tilt forward bracket can be adapted to attach to different devices;
    f) a device tilt rear bracket having a front and rear side, a left and right side, an arm projecting forward from each of the left and right sides and a shaft stub positioned about the center of said rear side and projecting rearwards, wherein said front side faces said rear side of said device tilt forward bracket, wherein said arms projecting from said left and right sides of said device tilt forward and rear brackets attach to each other, wherein said shaft stub of said device tilt rear bracket is aligned with said shaft of said device tilt forward bracket, wherein said shaft stub of said device tilt rear bracket rotatably mounts to said tilt base plate, wherein said device tilt inner bracket can be adapted to enable it and said device tilt forward bracket to secure and support different devices between them;
    g) a tilt device drive spur gear attaches to said drive shaft of said device tilt motor on said forward side of said tilt motor plate;
    h) a tilt device driven spur gear attaches to said shaft of said device tilt forward bracket on said forward side of said tilt motor plate; and
    i) a tilt device gear belt connects said tilt device drive spur gear and said tilt device driven spur gear.

DETAILED DESCRIPTION OF THE INVENTION

The present invention is directed to providing a versatile, modular table-top automated apparatus, a tac, which can be installed with different purchasable application devices to load, position, or unload, and to perform different operations on small parts and/or assemblies.

Figure 8:
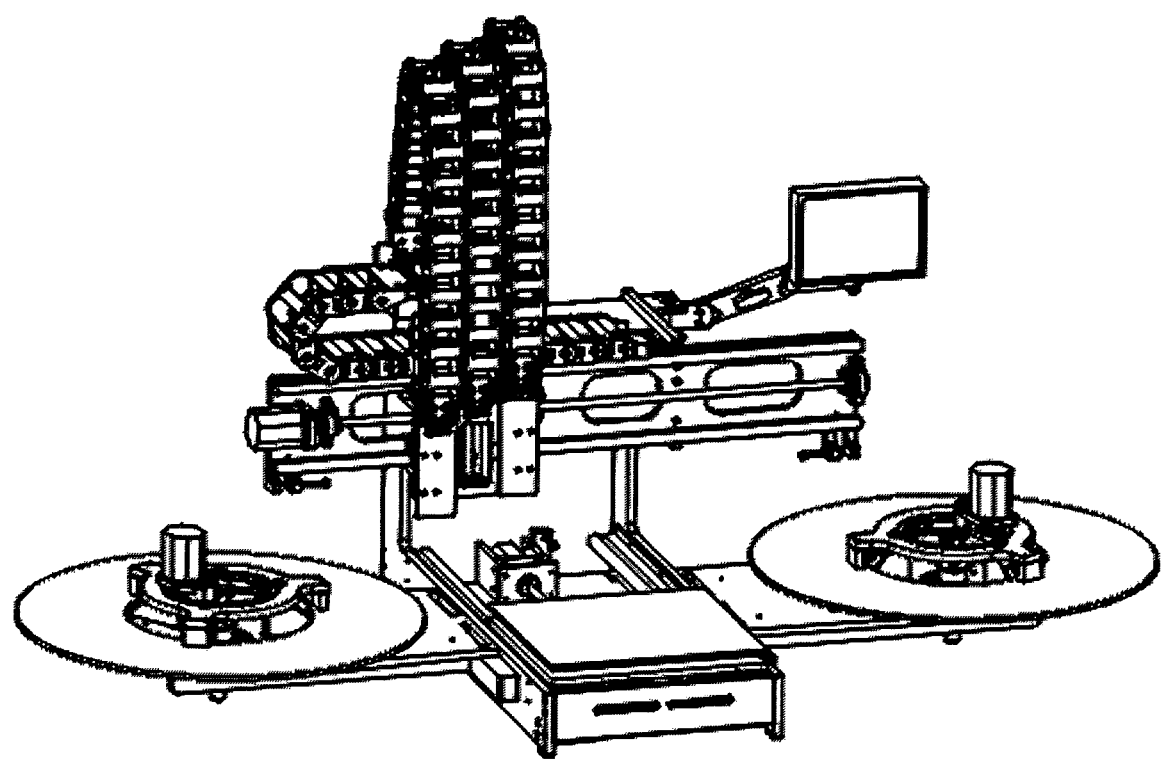
FIG. 8 shows an iso view of an advanced embodiment of the invention.

A more advanced embodiment of this invention (FIGS. 8 & 9) comprises a main assembly (Item 47), an X-axis rail assembly (Item 6), a combined carriage assembly (Item 48), a rotary work table (Item 52), two rotary magazine assemblies (Item 51), an electronics control monitor (or graphical user interface) (Item 5), a commercial positioning arm mechanism (Item 53), a pair of mounting bars (Item 49), four gussets (Item 50), and a collection of cable carriers (Item 54). The X-axis rail assembly, the rotary work table, the positioning arm mechanism, and the two mounting bars are all supported by and secured to the main assembly (Item 47). The monitor (Item 5) is supported by the positioning arm mechanism (Item 53); the combined carriage assembly (Item 48) is attached to the X-axis rail assembly (Item 6), and travels along it carrying a collection of cable carriers (Item 54). A rotary magazine assembly (Item 51) is located on each side of the main assembly, connected to the two mounting bars (Item 49), while a pair of gussets (Item 50) butts up against each mounting bar, providing rigidity and support to the rotary magazines. The materials of the components are chosen so that the invention requires no lubrication, and is able to withstand daily acid washes.

Figure 13:
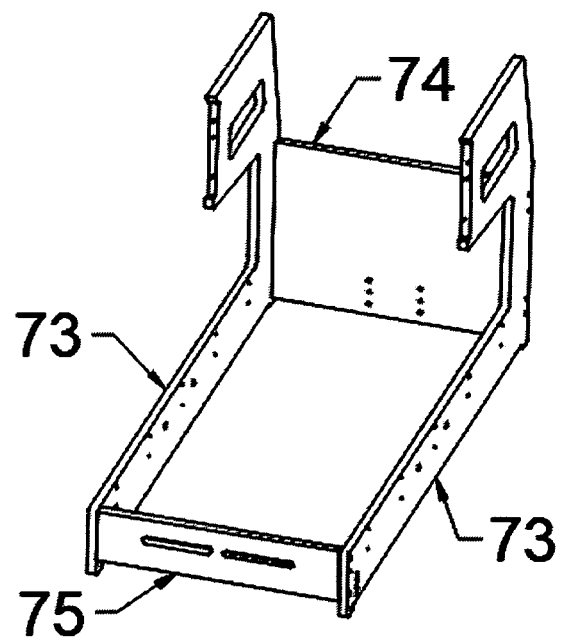
FIG. 13 shows view of the frame for an advanced embodiment of the invention.
Figure 14:
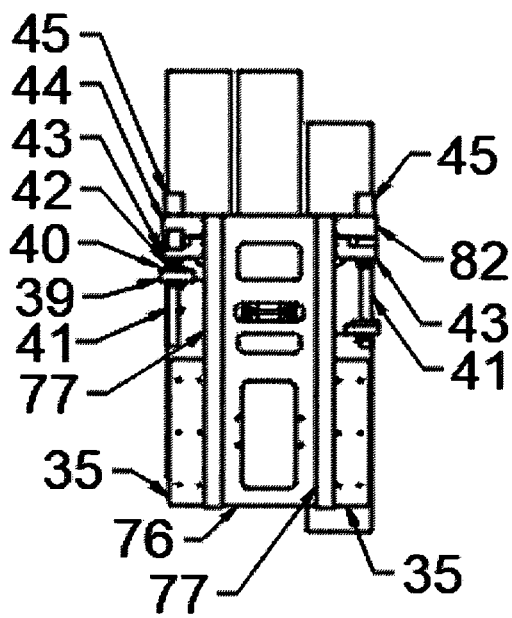
FIG. 14 shows a rear view of the Z-axis carriage assembly of an advanced embodiment of the invention.
Figure 15:
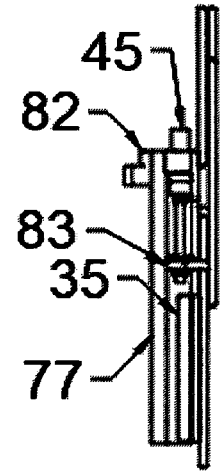
FIG. 15 shows a side view of the Z-axis carriage assembly of an advanced embodiment of the invention.
Figure 16:
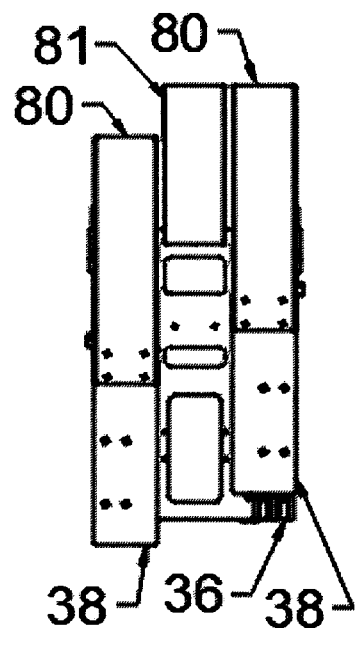
FIG. 16 shows a front view of the Z-axis carriage assembly of an advanced embodiment of the invention.
Figure 18:
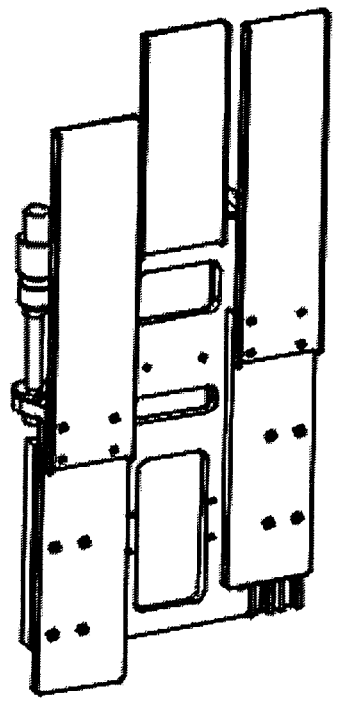
FIG. 18 shows an iso view of the Z-axis carriage assembly of an advanced embodiment of the invention.
Figure 17:
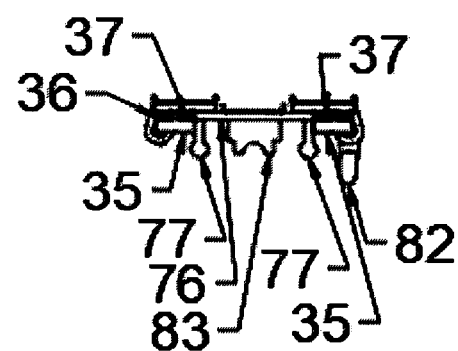
FIG. 17 shows a plan view of the Z-axis carriage assembly of an advanced embodiment of the invention.

The main assembly comprises (FIG. 10) the frame (Item 56), an electronics enclosure assembly (Item 3), one or more electronic attachment interfaces (Item 213), the Y-axis rail assembly (Item 57) and the Y-axis drive assembly (Item 58). A frame (FIG. 13) for an advanced embodiment of the invention is taller and longer than one for a more basic embodiment, but is also comprised of two side plates (Item 73), a back plate (Item 74) and a front plate (Item 75). The four plates are secured together by fasteners. The electronics enclosure is secured between the upper inner surfaces of the two side plates, while the two sides of the Y-axis rail assembly and the front of the Y-axis drive assembly are fastened to the lower inner sides of the side plates. The lower inner surface of the back plate (Item 74) supports the rear of the Y-axis drive assembly, and the upper front surfaces of the two sides plates provide a face upon which the X-axis rail assembly (Item 6, FIG. 9) is centered and secured.

Figure 9:
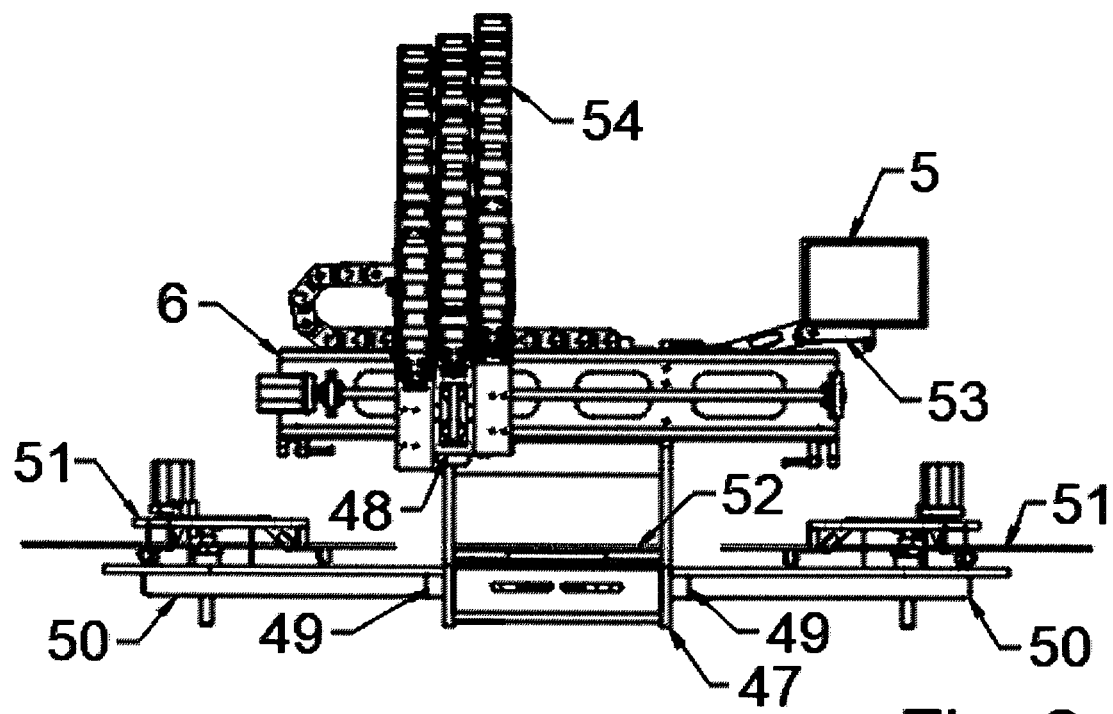
FIG. 9 shows a front view of an advanced embodiment of the invention.
Figure 10:
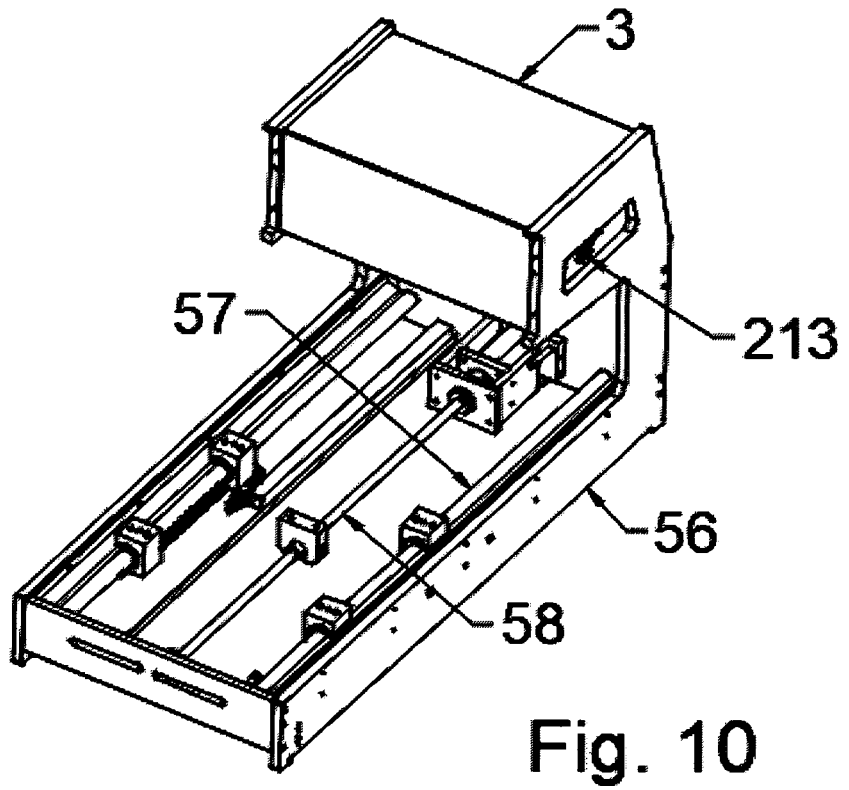
FIG. 10 shows a view of the main assembly of an advanced embodiment of the invention.

The controls enclosure (Item 3 of FIG. 10) is box-shaped, containing the main electronic circuit boards and their associated control components, and is fastened between the side plates of the frame, behind the X-axis rail assembly (Item 6 of FIG. 9). Wiring connects the electronics to the monitor (Item 5 of FIG. 9) to control or communicate or with all of the motors, actuators, sensors, and devices mounted to the tac, and to any other tac or device the tac is working with in a system.

Figure 1:
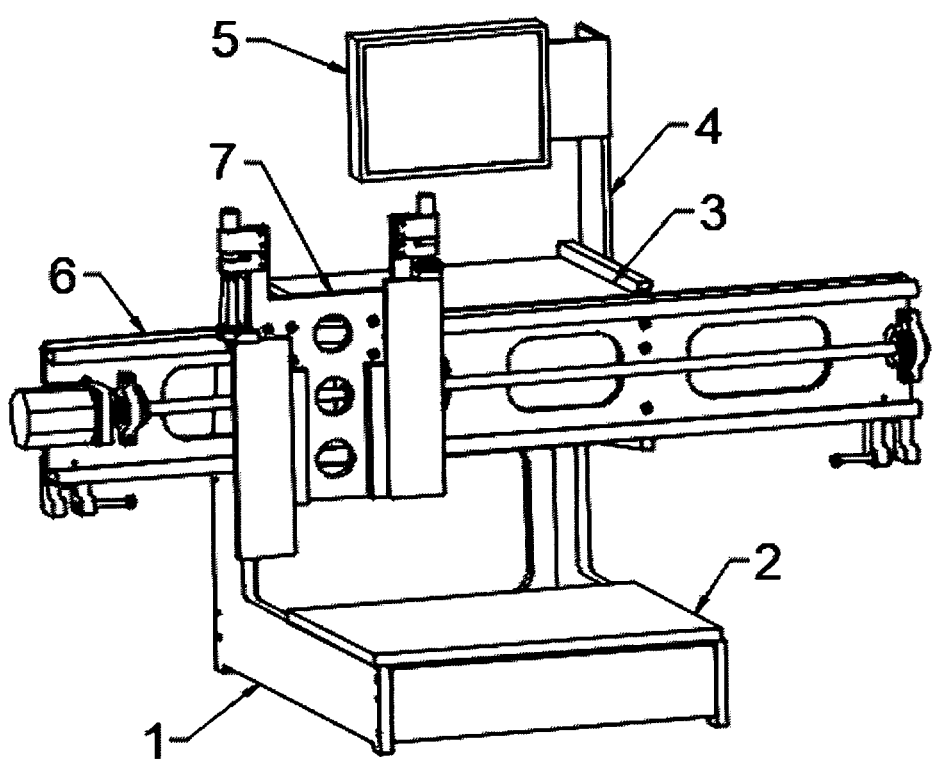
FIG. 1 shows an iso view of a simplified embodiment of the invention.
Figure 2:
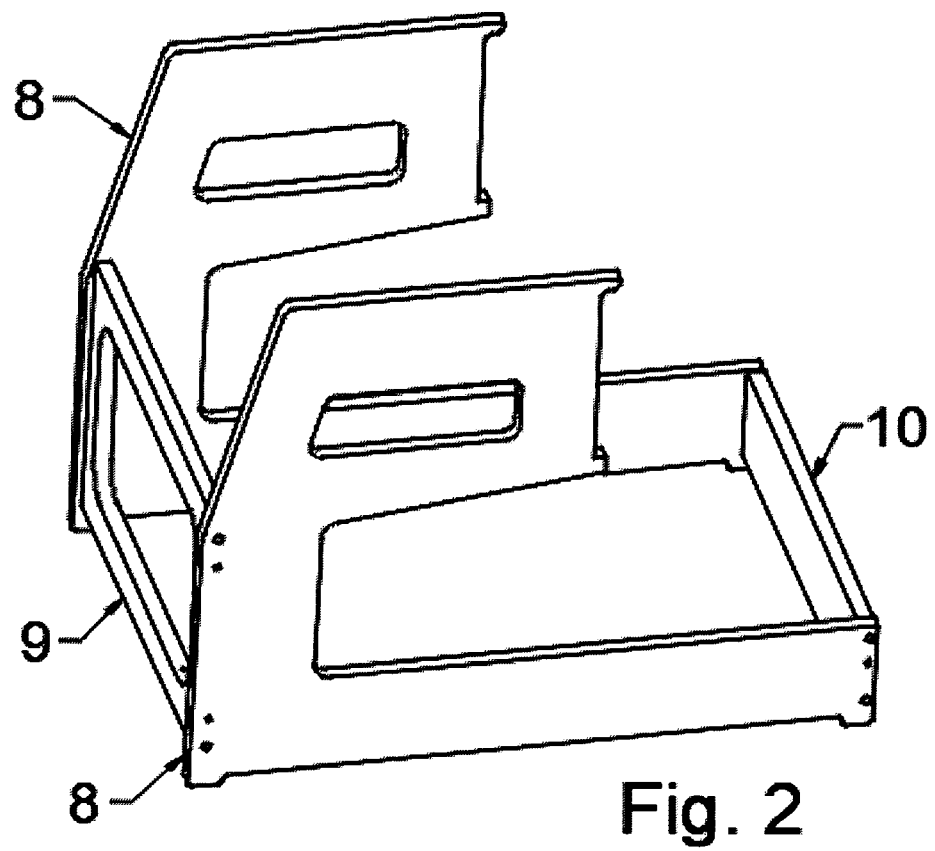
FIG. 2 shows view of the frame for a simplified embodiment of the invention.
Figure 3:
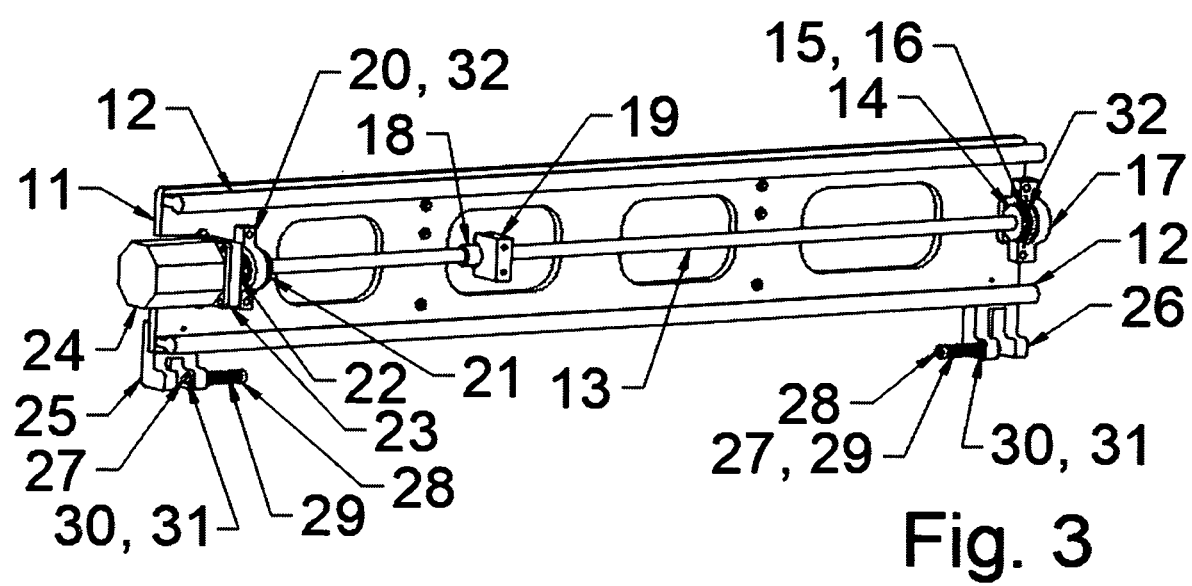
FIG. 3 shows a view of the X-axis rail assembly of the invention.
Figures 4, 5:
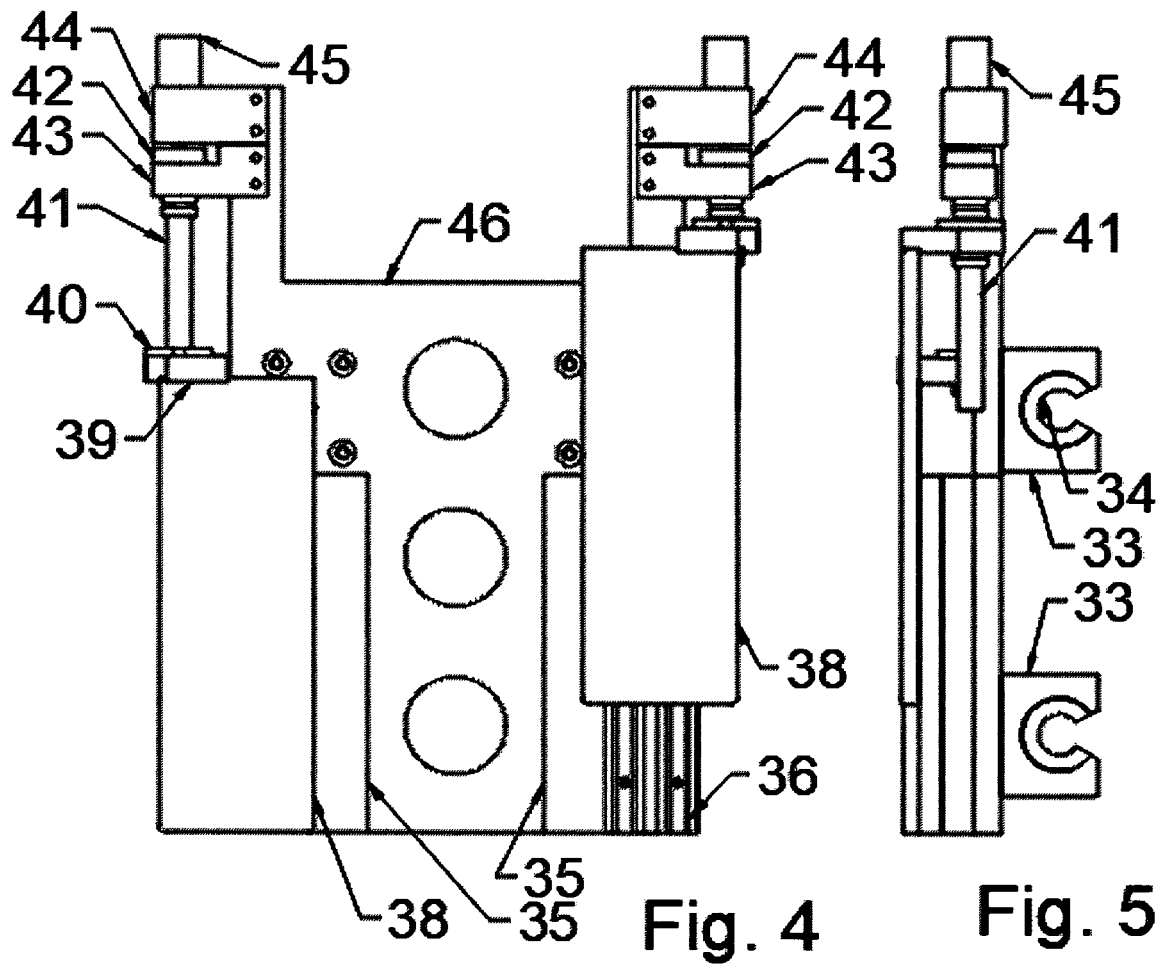
FIG. 4 shows a front view of a carriage assembly for a simplified embodiment of the invention.
FIG. 5 shows a side view of a carriage assembly for a simplified embodiment of the invention.
Figures 6, 7:
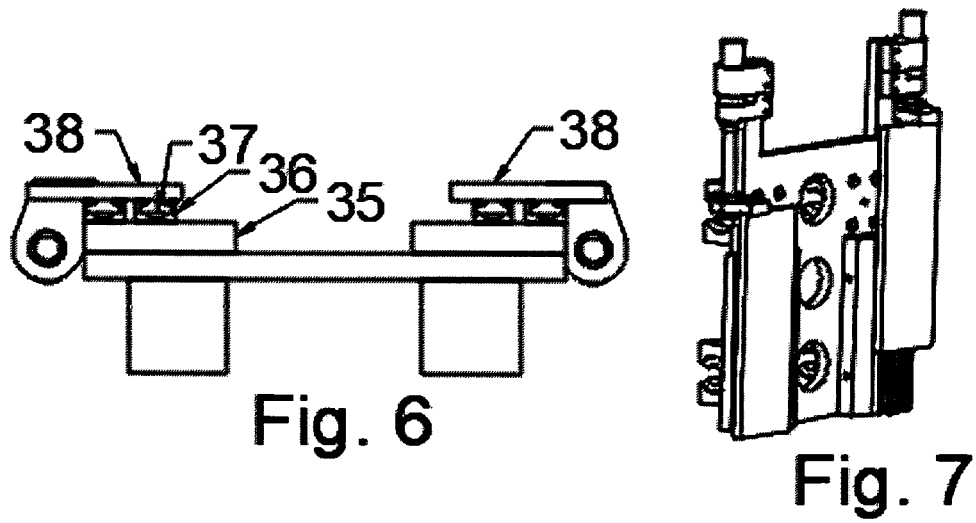
FIG. 6 shows a plan view of a carriage assembly for a simplified embodiment of the invention.
FIG. 7 shows an iso view of a carriage assembly for a simplified embodiment of the invention.

The X-axis rail assembly comprises (FIG. 3) a main plate (Item 11), to which are attached two parallel guide rails (Item 12), one mounted above the other; at the far end of the main plate, a flanged bearing block (Item 17) is fastened to it, centered between the two rails; this flanged bearing block, with its bearing (Item 32), supports one end of a lead screw (Item 13); the lead screw is capped with an end piece (Item 14), which presses a wave thrust washer (Item 15) against a flat washer (item 16) against the bearing and its bearing block; threaded farther up the lead screw is a drive nut (Item 18), which is captured by a mounting block (Item 19); with the turning of the lead screw, the mounting block traverses horizontally along the length of the rail assembly; at the near end of the lead screw is another end piece (Item 21), which connects to a second bearing (Item 32) and its flanged bearing block (Item 20), with the block fastening to the main plate (Item 11); the end piece connects to a flexible coupler (Item 22) which connects to the drive shaft of a motor (Item 24); the motor is fastened to a mounting plate (Item 23), which is secured to the main plate; at the bottom and two ends of the main plate are fastened a left bumper mounting block (Item 25) and a right bumper mounting block (Item 26); on the inside surface of both bumper mounting blocks are cylindrical holes in which is inserted a flanged bearing (Item 30) and a bumper shaft (Item 27), which supports a compression spring (Item 29), which is held in place by a bumper pad (Item 28) which threads onto the bumper shaft; the other end of the bumper shaft is held against an inner surface of a cut-out of the bumper mounting block by a retaining ring (Item 31); to the other inner surface of the cut-out within the bumper mounting block would be an electronic pad, that would sense when the bumper shaft was pushed outward and signal the control electronics of the tac.

Figure 31:
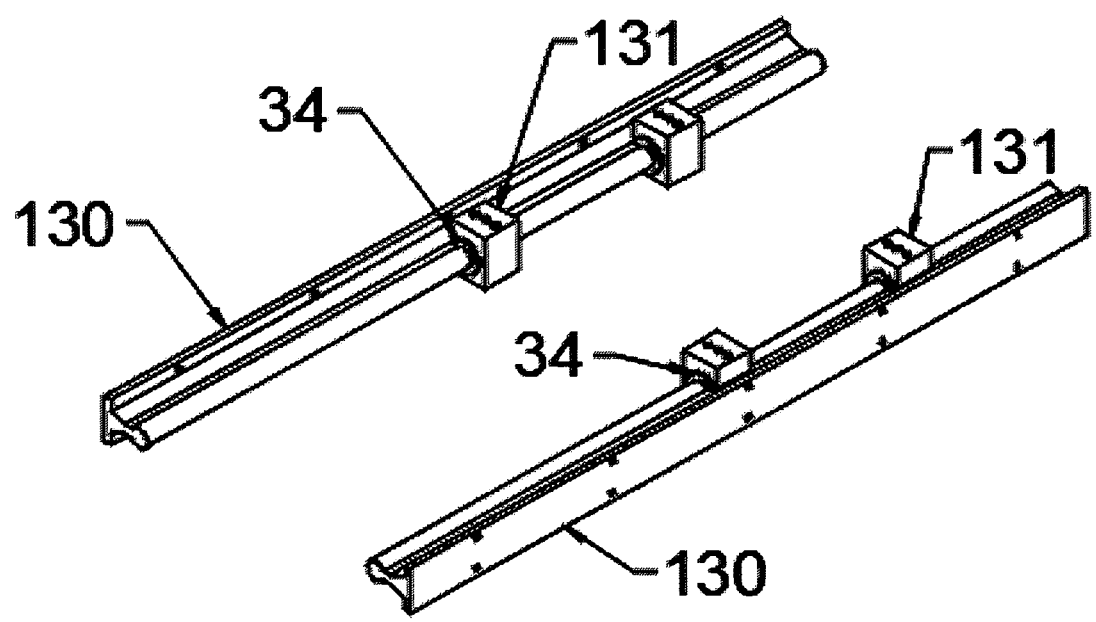
FIG. 31 shows a view of the Y-axis rail assembly of an advanced embodiment of the invention.

The Y-axis rail assembly (Item 57 of FIG. 10) is comprised (FIG. 31) of a pair of rails (Item 130), which bolt to side plates of the frame assembly (Items 73 of FIG. 13); to each rail is assembled a pair of bearing mounting blocks (Item 131), and to each block is assembled a linear slide bearing (Item 34).

Figure 28:
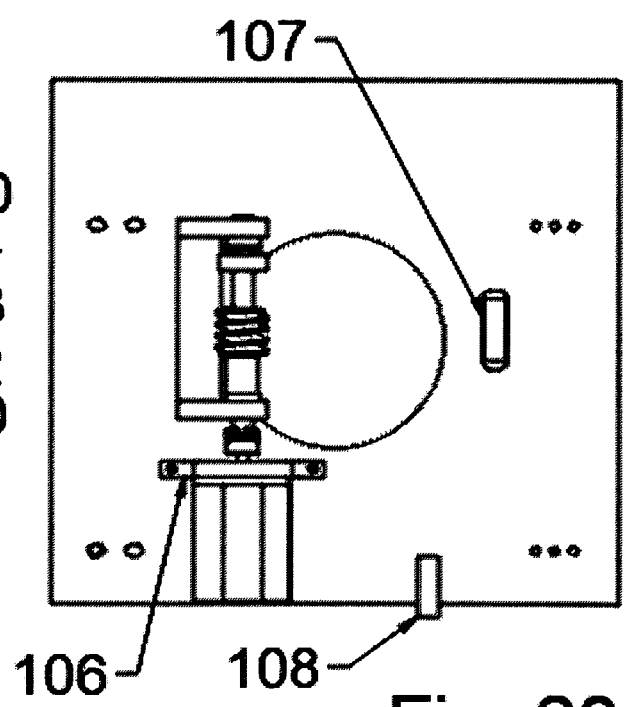
FIG. 28 shows a bottom view of the Y-axis traversing table assembly of an advanced embodiment of the invention.

The Y-axis drive assembly (Item 58 of FIG. 10) is comprised (FIG. 12) of a lead screw (Item 62) which is threaded through a drive nut (Item 63), which is contained by a mounting block (Item 64); the front end of the lead screw fits into a flanged end piece (14) which presses a wave thrust washer (Item 15) and a flat washer (Item 16) against a flanged bearing (Item 32); the end piece fits into the bearing, which is pressed into a through hole in the front mounting plate (Item 61); the front mounting plate bolts to the side plates of the frame (Items 73 of FIG. 13); the rear end of the lead screw is fitted with a second flanged end piece (21) which presses into another flanged bearing (Item 32), which is pressed into a front mounting plate (Item 65) which is mounted on the front ends of two side mounting plates (Items 66 and 67); a motor mounting plate (Item 68) is located behind the front mounting plate, and is fastened between the side mounting plates, which are fastened to the back plate of the frame assembly (Item 74 of FIG. 13); the end of the flanged end piece (Item 21) fits with one end of a flexible coupler (Item 22), which fits on the shaft of the motor (Item 24), which mounts to the rear of the motor mounting plate; on the left side of the drive assembly a support plate (Item 70) fastens to the bottom of the front mounting plate (Item 61) and to the back plate of the frame assembly (Item 74 of FIG. 13); secured to the top of the support plate is a length of rectangular tubing (Item 71) which connects at its front end, near the middle of the drive assembly, to a purchased commercial cable carrier; power and control wiring, leading from the electronics enclosure assembly (Item 3 of FIG. 10), passes thru holes in the back of the frame assembly (Item 74 of FIG. 13) thru the rectangular tubing, using it as a conduit, and then thru the cable carrier to connect up with the rotary table (Item 52 of FIG. 9); in a thru hole on the right back side of the front mounting plate (Item 61) is a flanged bearing (Item 30), which holds a bumper shaft (Item 27), which supports a compression spring (Item 29), which is held in place by a bumper pad (Item 28) which threads onto the bumper shaft; the other end of the bumper shaft is held against the front side of the front mounting plate by a retaining ring (Item 31); similarly, at the far end of the drive assembly, a bumper block is attached to right outer surface of the side mounting plate (Item 66), the block contains a thru hole which holds a bumper shaft (Item 27), which supports a compression spring (Item 29), which is held in place by a bumper pad (Item 28) which threads onto the bumper shaft; the other end of the bumper shaft is held against the back side of the bumper block by a retaining ring (Item 31); when either of the two bumper shafts contact one of the two spring blocks (Items 107 and 108 of FIG. 28) which are fastened to the bottom of the rotary table lower assembly, the spring is compressed, and the bumper shaft moves outwards towards one of the electronic pads mounted on the insides of the front and back plates of the frame (Items 75 and 74 of FIG. 13); when a bumper shaft is pushed outwards, the electronic pad senses it, and signals the control electronics of the tac.

Figure 11:
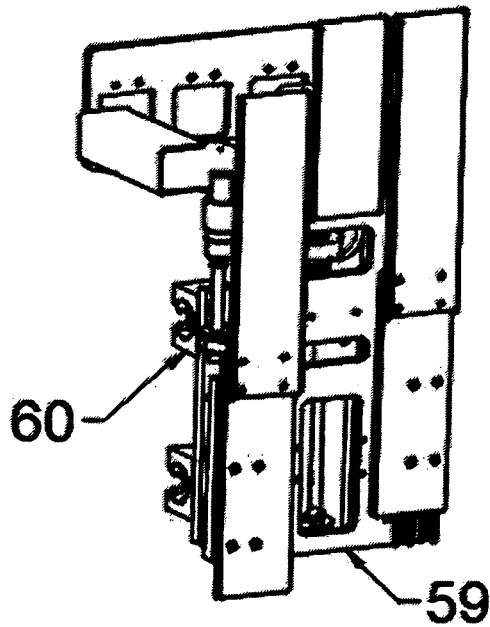
FIG. 11 shows a view of combined carriage assemblies of an advanced embodiment of the invention.

The combined carriage assembly (Item 48 of FIG. 9) comprises (FIG. 11) a vertical, or Z-axis carriage assembly (Item 59) which mounts to a horizontal, or X-axis carriage assembly (Item 60).

Figure 23:
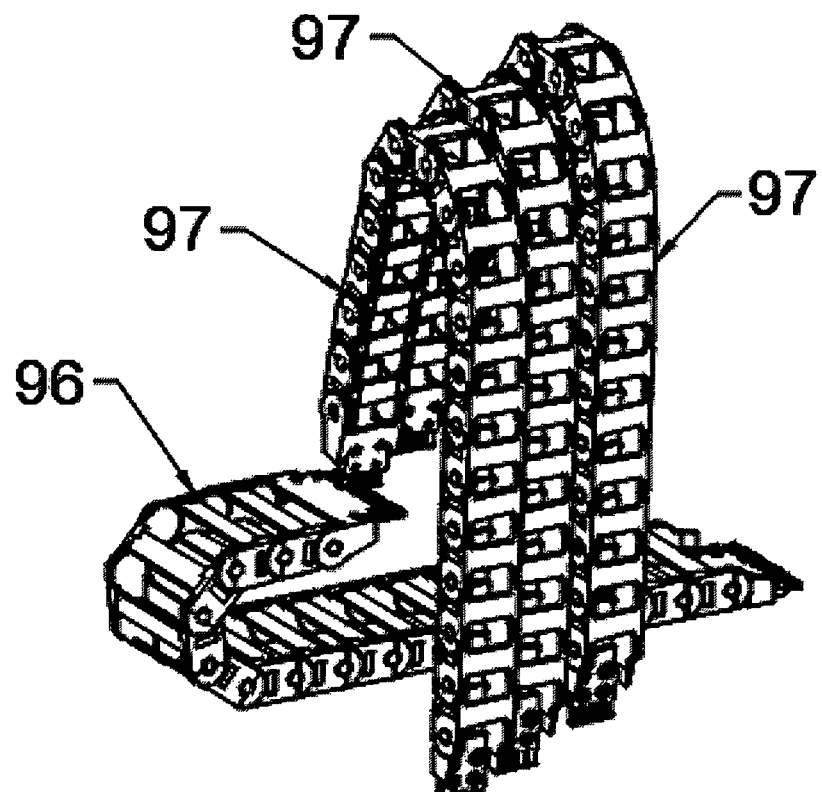
FIG. 23 shows a view of upper cable carriers of an advanced embodiment of the invention.

The vertical, or Z-axis carriage assembly (FIGS. 14, 15, 16, 17 and 18) comprises a rectangular main plate (Item 76), to the back and outside edges of which are attached a pair of vertically aligned rails (Item 77); to the outside surface of each rail is attached and held rigid a sliding track mounting block (Item 35); to each of the slide track mounting plates are attached a pair of vertical slide tracks (Item 36); pairs of slides (Item 37) move up and down within each slide track to guide and support the sliding application device plates (Item 38) to which they are fastened; each of the application device plates are attached to four slides; to the top of each application device plate, and projecting backwards, is attached a device plate bracket (Item 39) which holds immobile a drive nut (Item 40), thru which is threaded a drive screw (Item 41); the upper end of each of the drive screws is threaded into an adaptor (Item 42), which then connects to a small actuator motor (Item 45); two mounting brackets (Item 43), fastened to the main plate, support and position the adaptors (Item 43); the left-side motor, as facing the front of the main plate, is held in position and supported by a mounting bracket (Item 44), which connects to the top left back-side corner of the main plate (Item 76); the right-side motor, as facing the motor the front of the main plate, is held in position and supported by a combination mounting bracket and plunger stop (Item 82), which connects to the top right back-side corner of the main plate (Item 46); a lead screw mounting clevis (Item 83) is fastened to the upper central back of the main plate; on the upper outsides of the vertical carriage assembly, a wiring guide plate (Item 80) is fastened to the front top of each of the two sliding application device plates (Item 38) and a shorter wiring guide plate (Item 81) is attached to front top center of the main plate (Item 76); to these three wiring guide plates is attached the front end pieces of three side by side cable carriers (Items 97 of FIG. 23).

Figure 42:
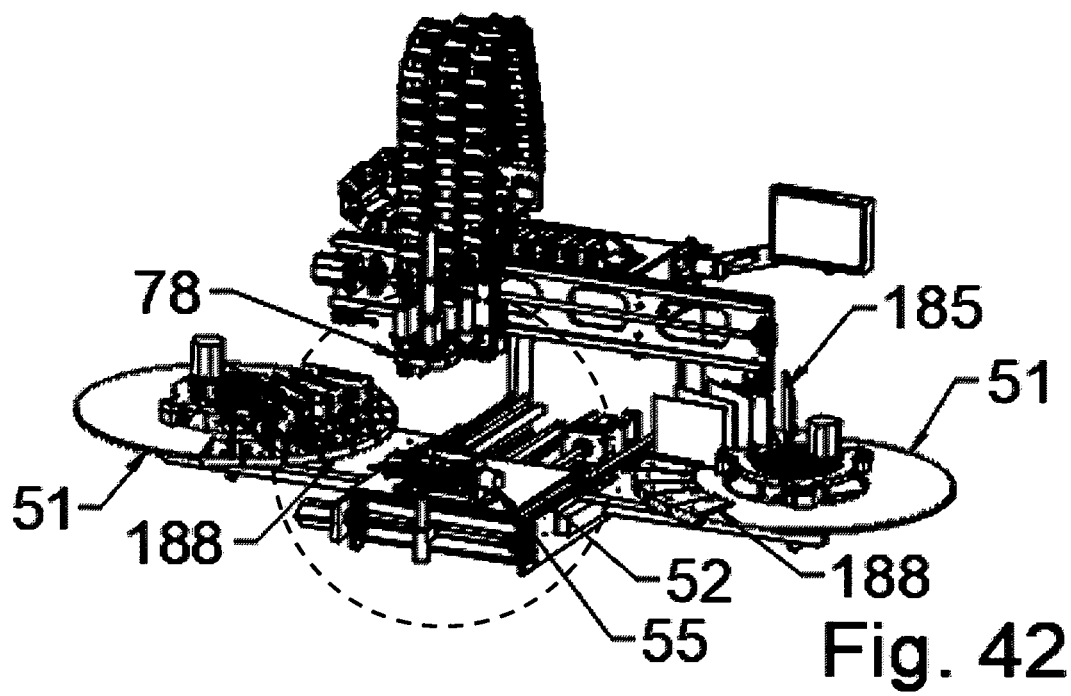
FIG. 42 shows a view of an advanced embodiment of the invention equipped with different application devices and customized nests on the rotary magazines.
Figure 43:
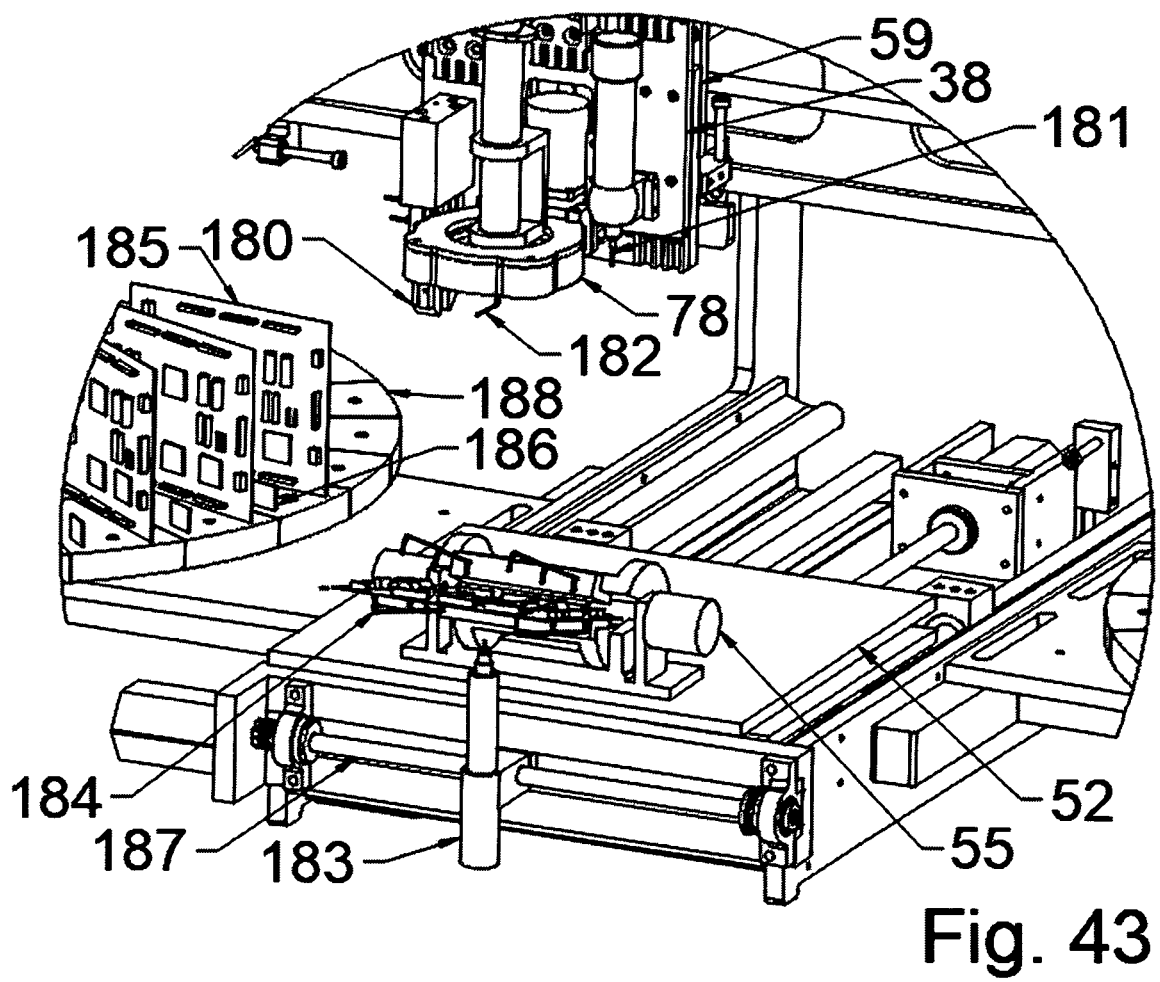
FIG. 43 shows a partial view of the same advanced embodiment of the invention equipped with different application devices and customized nests on the rotary magazines.
Figure 44:
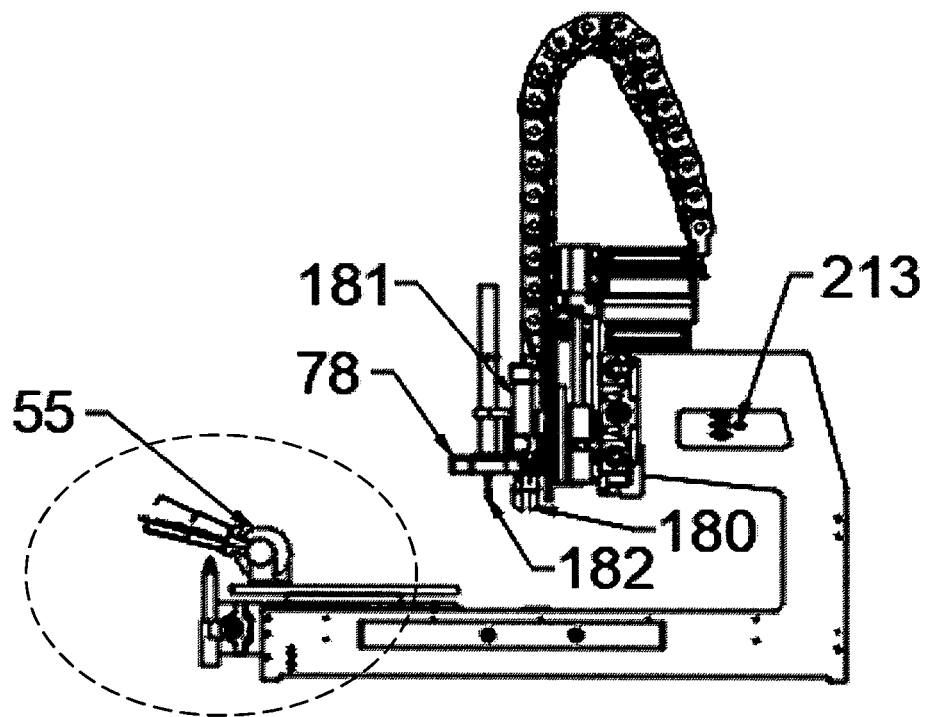
FIG. 44 shows a side view of the same advanced embodiment of the invention showing a stripped-down horizontal carriage assembly mounted to its front.
Figure 45:
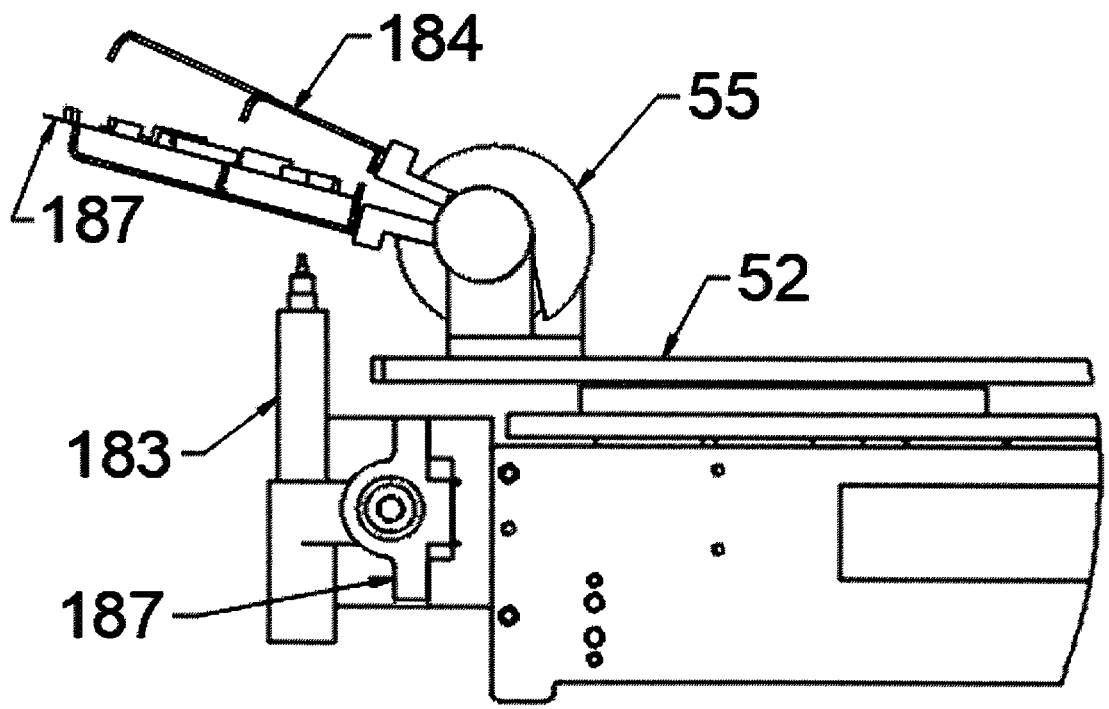
FIG. 45 shows a partial view of the same advanced embodiment of the invention showing a stripped-down horizontal carriage assembly mounted to its front.

The rotary head assembly (Item 78 of FIG. 50, note: the two gripping mechanisms, Item 180, are not a part of this invention, and are merely to illustrate one type of application device which could be mounted to rotary head assembly) is comprised of a lower rotary head assembly (Item 78) and the upper rotary head assembly (Item 79). The rotary head assembly would typically mount to the center of the front face of the main plate (Item 76, FIG. 14) of the vertical carriage assembly (FIGS. 42 and 43).

Figure 29:
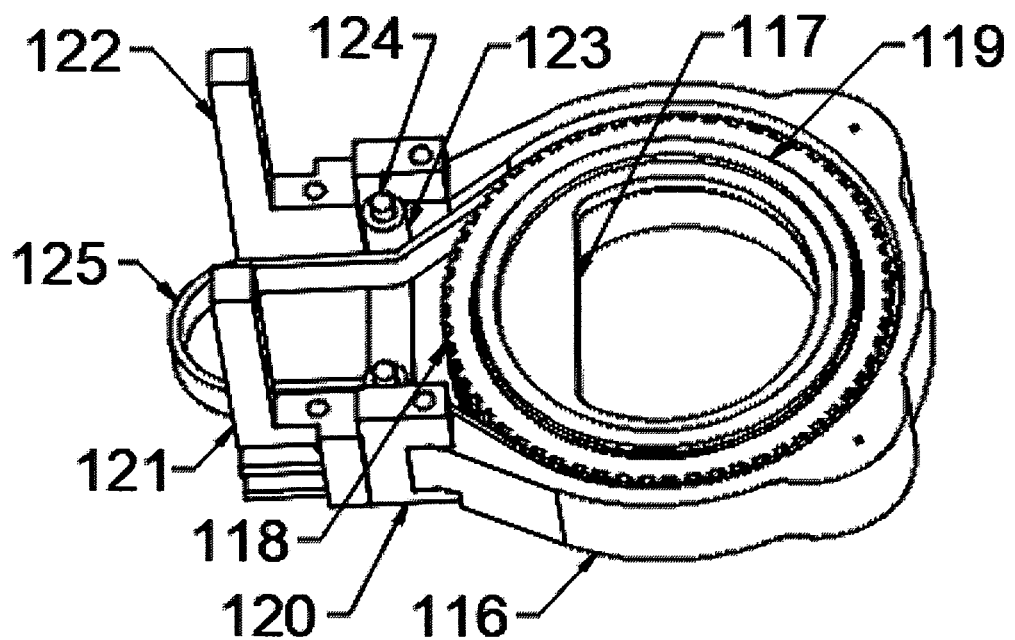
FIG. 29 shows a view of a lower rotary head of an advanced embodiment of the invention.

The lower rotary head (FIG. 29) is comprised of a housing base (Item 116) that is open at the top and features a center hub placed about vertical cylindrical hole; a ring-shaped turntable (Item 117) sits within the housing base, and is able to rotate freely about its hub; but the turntable also has at least one protruding upper lip or inner ring which extends over the top of the hub and into the vertical center hole; an external gear (Item 118) is fitted closely, and pinned, to the outer surface of the turntable; a thrust bearing (Item 119) is placed on top of the turntable; a tie bracket (Item 120) mates up and attaches at two locations to the back end of the housing base with fasteners coming down thru its top surface; two mirrored mounting brackets (Items 121 and 122) are fastened to the back of the tie bracket, two roller axles (Item 124) are inserted into blind holes in the top of the floor of the tie bracket; two rollers (Item 123) placed over the roller axles; a gear belt pulley (Item 125) is placed over the gear, and routed inside the two rollers.

Figure 30:
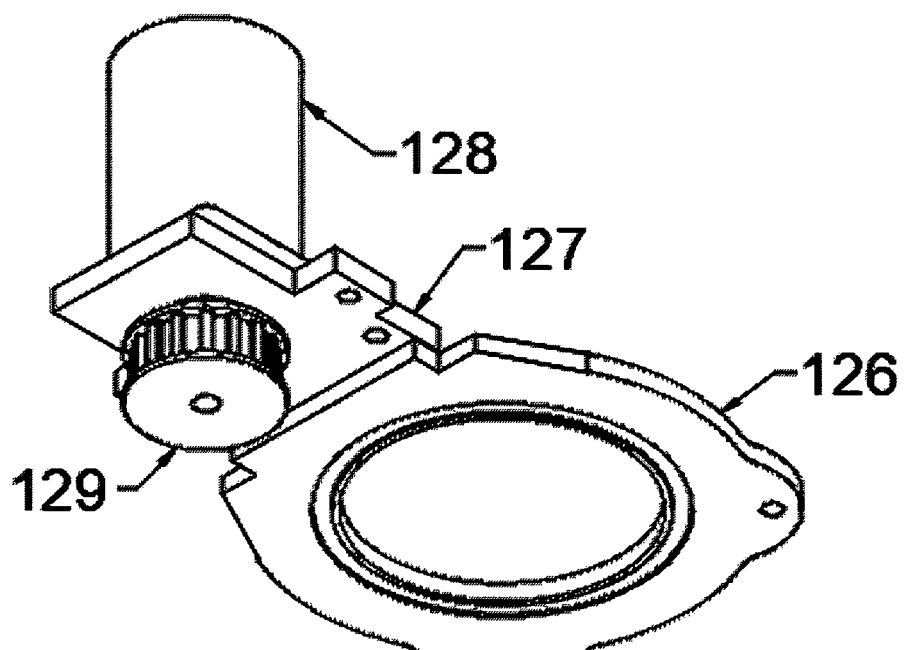
FIG. 30 shows a view of an upper rotary head of an advanced embodiment of the invention.

The upper rotary head assembly (FIG. 30) is comprised of a loose cover plate (Item 126), a motor mounting plate (Item 127), an attached motor (Item 128), and a drive gear (Item 129), which is attached to the shaft of the motor.

Figure 50:
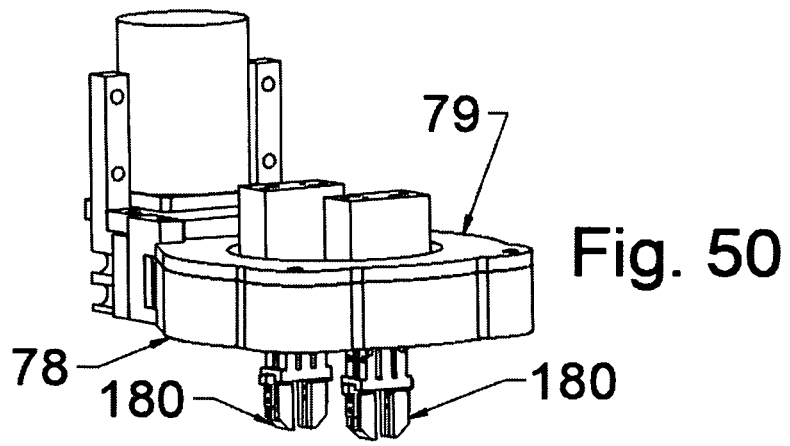
FIG. 50 shows a rotary head mechanism with two gripper application devices mounted to it.

The rotary head assembly is assembled by fastening the cover plate (Item 126), placed over the top of the thrust bearing (Item 1119), to the top of the housing base (Item 116); connecting the gear belt (Item 125) to the drive gear (Item 129); inserting the tops of the two roller axles (Item 124) into the blind holes of the bottom of the motor mounting plate (Item 127), and fastening the motor mounting plate to the tops of the two mounting brackets (Items 121 and 122). The holes of the motor mounting plate are slotted to enable the motor to be slid in and outwards to adjust the tension on the gear belt (Item 125). The one or more upper protruding lips of the turntable (Item 117) provide a rotating surface upon which to install application devices. The lip can extend entirely around the turntable as an inner ring to allow multiple applications devices to be mounted (FIG. 50).

Figure 57:
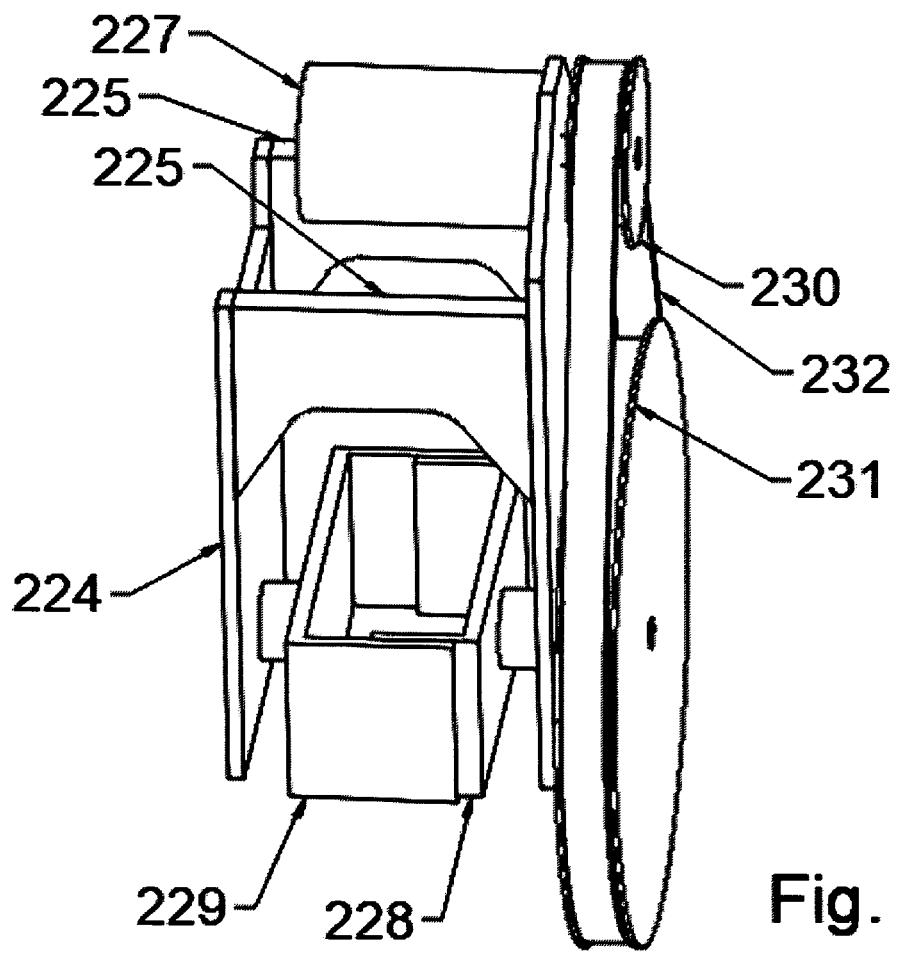
FIG. 57 show an iso view of a device tilt mechanism.

The device tilt assembly (FIG. 57), like the rotary head assembly, is a mechanism which can be utilized by a tac for working with various process application devices, is comprised of a device tilt base plate (Item 224) which attaches to one of the heads of the vertical carriage assembly (FIG. 14), two stand-off parts (Items 225) which connect to the front of the device tilt base plate, a tilt motor plate (Item 226), which fastens to the fronts of the two stand-off parts, a device tilt motor (227) which fastens to the rear of the tilt motor plate, a device tilt forward bracket (Item 228) which has, a plate with an arm projecting rearward from each of its left and right sides, and a center shaft protruding forward from the front face through and out of the front of the tilt motor plate, a device tilt rear bracket (Item 229) which has a plate with an arm projecting forwards from each of its left and right sides which connect to the arms of the device tilt forward bracket, and a rear projecting shaft stub which mounts rotatably within a hole in the device tilt base plate, a drive spur gear (Item 230) attaches to the drive shaft of the device tilt motor, a driven spur gear (Item 231) attaches to the protruding center shaft of the device tilt forward bracket, and a gear belt (Item 232) connects the drive and the driven spur gears. The forward and rear device tilt brackets are customized to hold desired application devices.

The horizontal, or X-axis carriage assembly (Item 60 of FIG. 11), comprises (FIGS. 19, 20, 21 and 22) a main plate (Item 84), on the back of which are attached four horizontal bearing blocks (Item 33), each of which hold a linear slide bearing (Item 34); on the front main plate are fastened two vertical bearing blocks (Item 93), each of which contain a pair of linear slide bearings (Item 34); a saddle bearing block (Item 89) is fastened to bottom front center of the main plate, into which fits, in succession, a flanged bearing (Item 32), a flanged lead screw end piece (Item 90) and the vertical lead screw (Item 91); threaded up the lead screw is a drive nut (item 18); at the upper end of the lead screw is, in succession, a second type of flanged lead screw end piece (Item 92), a wave thrust washer (Item 15), a matching flat washer (Item 16), and a second flanged bearing (Item 89), which is contained by a second saddle bearing block (Item 89); the lead screw end piece (Item 92) then fits into a flexible coupler (Item 22) which then fits onto the shaft of a motor (Item 24); the motor is mounted onto a horizontal plate (Item 85), which is fastened to, and slotted to fit onto the top of, the main plate (Item 84); the horizontal plate is attached at its far rear end to a vertical plate (Item 86), with a third strengthening plate (Item 87) fastening to the two of them from below; a folded sheet metal plate (Item 88) is attached to the on top of the horizontal plate (Item 85) to provide a surface to attach and support the top end piece of a horizontal cable carrier assembly (Item 96 of FIG. 23); the top of vertical plate (Item 86) provides a surface to attach the back end pieces of the three side by side cable carriers (Items 97 of FIG. 23); on the right side of the horizontal carriage assembly, as viewed from the front, two bumper shaft blocks are fastened; the lower block (Item 95) to the side of the right hand vertical bearing block (Item 93) and the upper block to front of the main plate (Item 84); each of the bumper shaft block contains a hole to hold a vertically aligned bumper shaft (Item 27), which supports a compression spring (Item 29), which is held in place by a bumper pad (Item 28) which threads onto the bumper shaft; the other end of the bumper shaft is held against the bumper shaft blocks by a retaining ring (Item 31); the orientation of the assembled parts is such that the retaining rings are located on the sides of the bumper shaft blocks which are closest to the top and the bottom of the mounting plate; when either of the two bumper shafts contact either the upper or lower end of the combination mounting bracket and plunger stop (Item 82 of FIG. 17), the spring is compressed, and the bumper shaft moves outwards towards one of the electronic pads mounted on the inner surfaces of two tabs which project from the right side of the main plate (Item 84); when a bumper shaft is pushed outwards, the electronic pad senses it, and signals the control electronics of the tac; a bumper stop block (Item 94) which works with the bumper shafts found on the bottom corners of the X-axis rail assembly (Items 27 of FIG. 3), fastens to the rear bottom center of the main plate.

Figure 19:
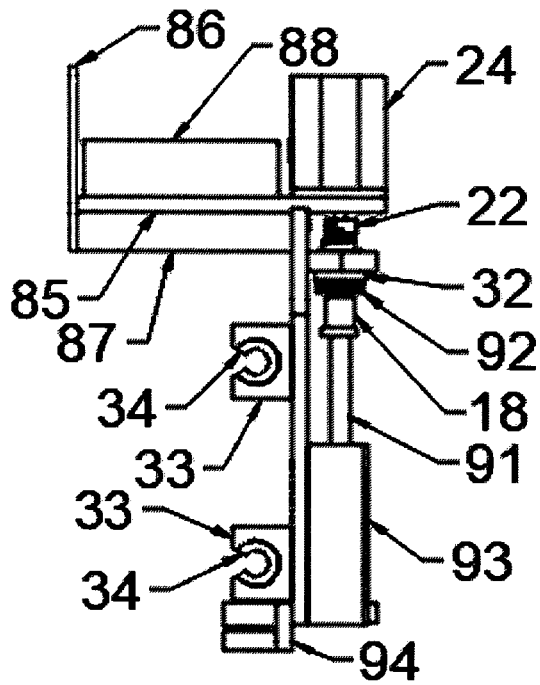
FIG. 19 shows a side view of the X-axis carriage assembly of an advanced embodiment of the invention.
Figure 20:
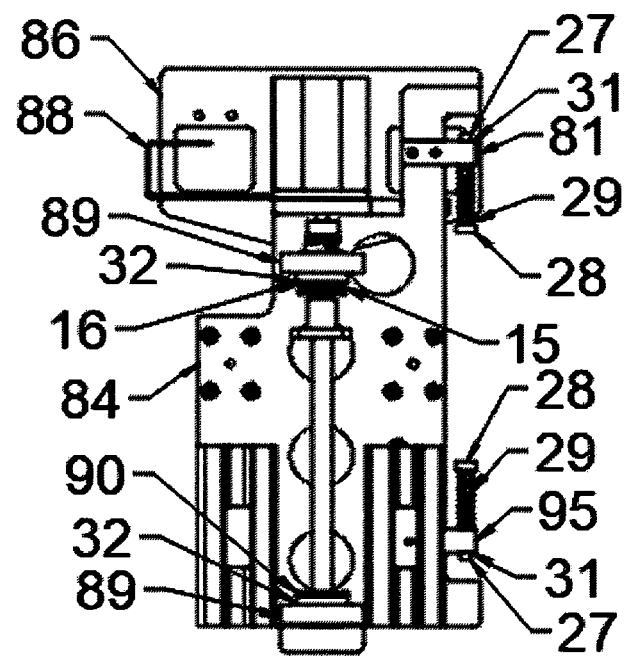
FIG. 20 shows a front view of the X-axis carriage assembly of an advanced embodiment of the invention.
Figure 22:
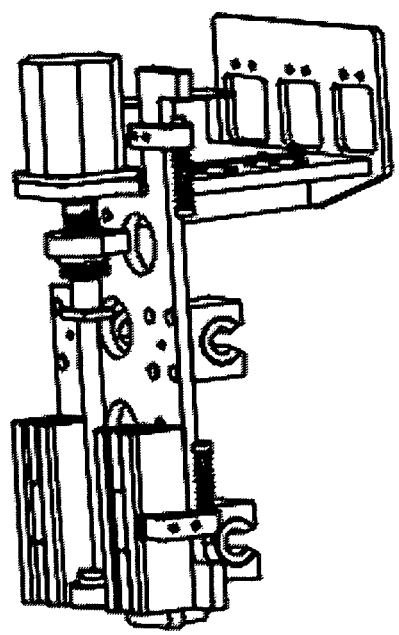
FIG. 22 shows an iso view of the X-axis carriage assembly of an advanced embodiment of the invention.
Figure 21:
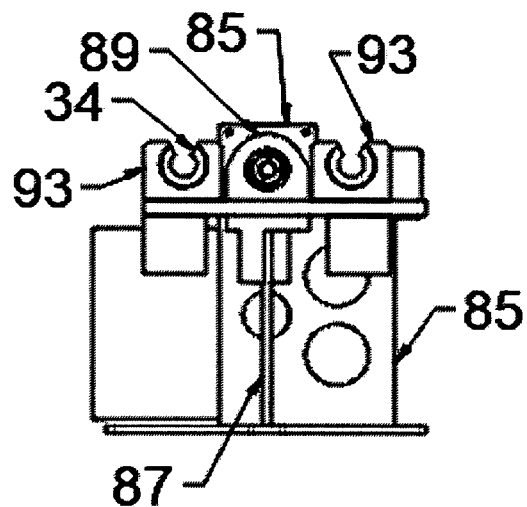
FIG. 21 shows a plan view of the X-axis carriage assembly of an advanced embodiment of the invention.

When the combined carriage assembly (FIG. 11) is assembled, the rails of the vertical carriage (Items 77 of FIG. 17) are positioned within the two vertical bearing blocks on the front side of the horizontal carriage (Item 93 of FIG. 21), and the lead screw mounting clevis of the vertical carriage (Item 83) is attached to the drive nut of the horizontal carriage (Item 18 of FIG. 19). The combined carriage assembly is then installed on the X-axis rail assembly (Item 6 of FIG. 9), with the four horizontal bearing blocks of the horizontal carriage (Items 33 of FIG. 19) being installed on the two rails of the X-axis rail assembly (Items 12 of FIG. 3), and the drive nut mounting block of the X-axis rail assembly (Item 19 of FIG. 3) is fastened to the rear of the main plate of the horizontal carriage (Item 84 of FIG. 20). Additionally motorized tilt mechanisms could be attached to the application device plates and rotary head to tilt or rotate the heads for work special applications.

Figure 24:
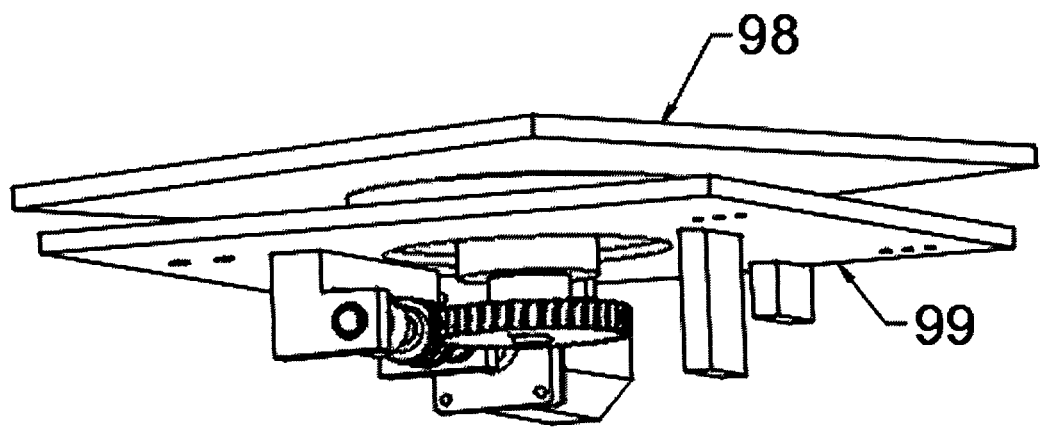
FIG. 24 shows a view of the rotary work table of an advanced embodiment of the invention.

The rotary table (Item 52 of FIG. 9) combines (FIG. 24) a rotating work plate assembly (Item 98) to a Y-axis traversing table assembly (Item 99) in the central work area of the tac.

Figure 25:
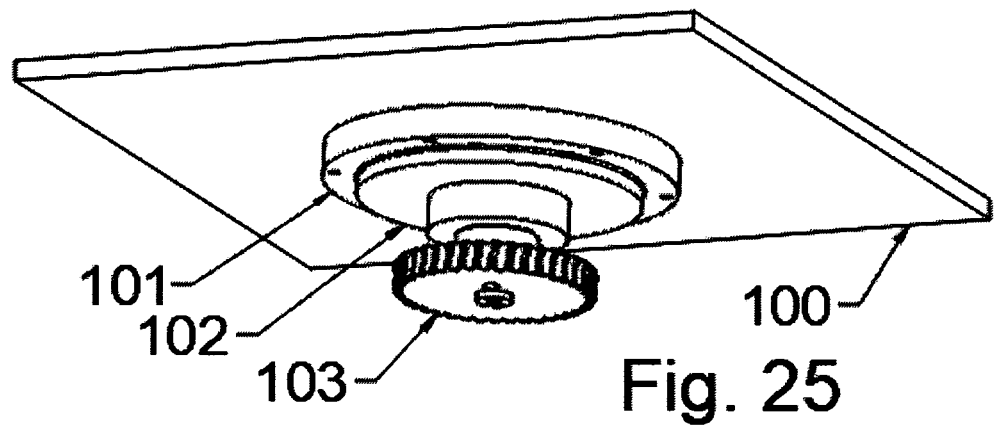
FIG. 25 shows a view of the rotating work plate assembly of an advanced embodiment of the invention.

The rotating work plate assembly (FIG. 25) comprises a rectangular work plate (Item 100), to which is fastened a cylindrical bearing block (Item 101); to the bearing block is attached a turntable arbor (Item 102) which, at its bottom, extends down as a shaft on which is mounted a worm gear (Item 103).

Figure 12:
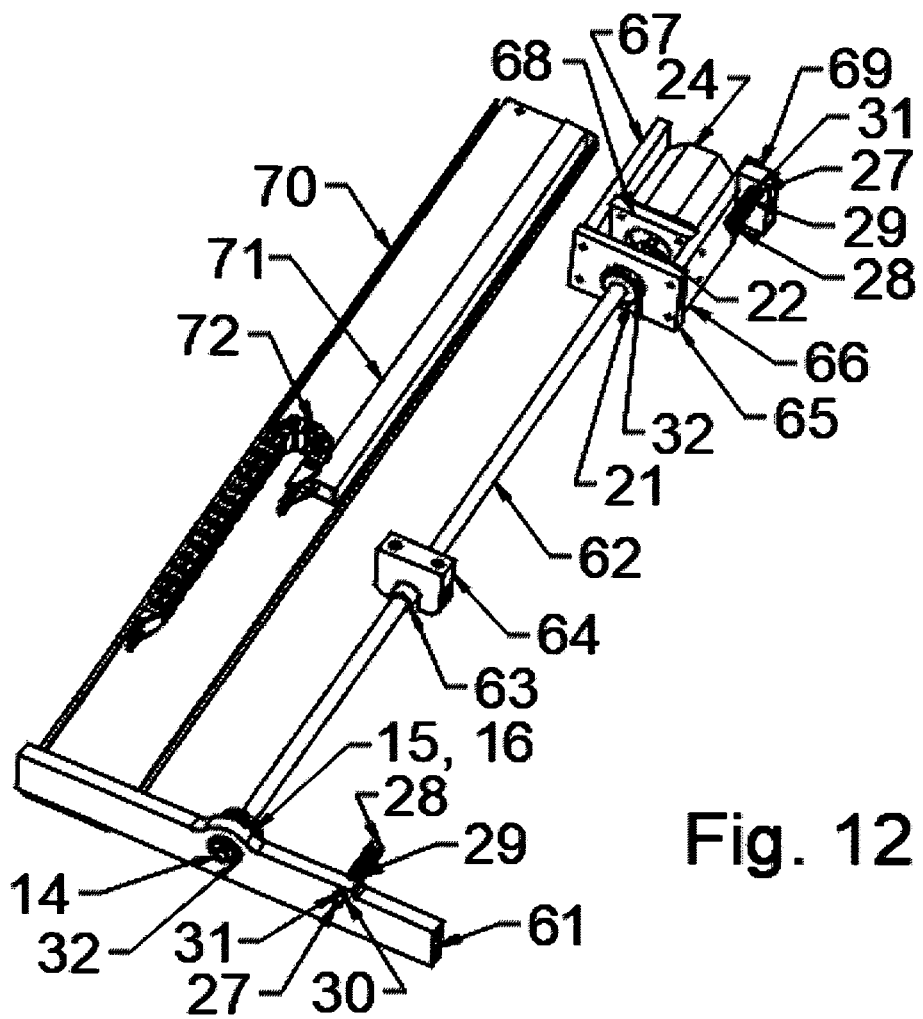
FIG. 12 shows a view of the Y-axis (also known as a Y-axis traversing or traversing) drive assembly of an advanced embodiment of the invention.
Figure 26:
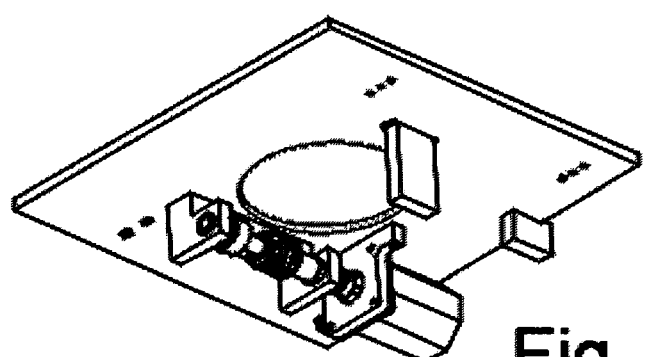
FIG. 26 shows an iso view of the Y-axis traversing table assembly of an advanced embodiment of the invention.
Figure 27:
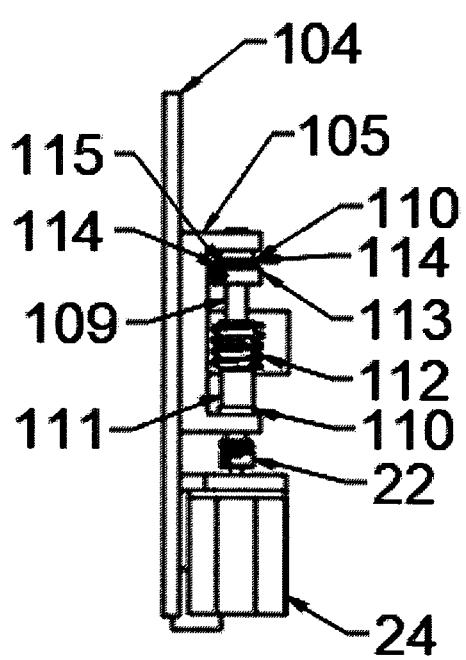
FIG. 27 shows a side view of the Y-axis traversing table assembly of an advanced embodiment of the invention.

The Y-axis traversing table assembly (Item 99 of FIG. 24) is comprised (FIGS. 26, 27 and 28) of a rectangular base plate (Item 104) featuring a large circular cut-out in its center, to the bottom of base plate is fastened a u-shaped mounting bracket (Item 105); the lower tabs of the bracket support a rotary shaft assembly, which in succession is comprised of a flange bearing (Item 110), a flat washer (Item 115), a matching thrust washer (Item 114), a clamp collar (Item 113), a drive shaft (Item 109), a cylindrical worm (Item 112), a cylindrical spacer (Item 111), a second flange bearing (Item 110), and ending in a flexible coupler (Item 22) connected to a motor (Item 24), which is attached to a mounting plate (Item 106) which is attached to the bottom of the base plate (Item 104); also attached to the base plate are two bumper shaft stop blocks (Items 107 and 108), which work with the bumpers shafts located at the front and rear of the Y-axis drive assembly (Items 27 of FIG. 12).

When the rotary table is assembled, the worm gear (Item 103 of FIG. 25) of the rotating work plate assembly is engaged with the cylindrical worm (Item 112 of FIG. 27), and the cylindrical bearing block (Item 101 of FIG. 25) rests on, and is able to turn within, a recessed cut-out of the base plate of the base plate of the Y-axis traversing table assembly (Item 104 of FIG. 104). The more central of the two bumper shaft stop blocks mounted on the base plate (Items 107 of FIG. 28) is positioned on the forward side, and the assembled rotary table is attached to the frame assembly (FIG. 10) with the bearing blocks of the Y-axis rail assembly (Items 131 of FIG. 31) fastened to the bottom of the base plate of the Y-axis traversing table assembly (Item 104 of FIG. 27), and the mounting block of the Y-axis drive assembly (Item 64) attached to the motor mounting plate of the Y-axis traversing table assembly (Item 106 of FIG. 28); in this way, the rotating work plate is turned and positioned by the worm gear, and the assembled rotary table moved back and forth within the frame of the tac by the motor of Y-axis drive assembly (Item 24 of FIG. 12). Additionally, a rotary clamp (Item 55 of FIGS. 42-45) could be mounted to the top of a rotary table to further manipulate the orientation of product items brought to the work table.

Figure 56:
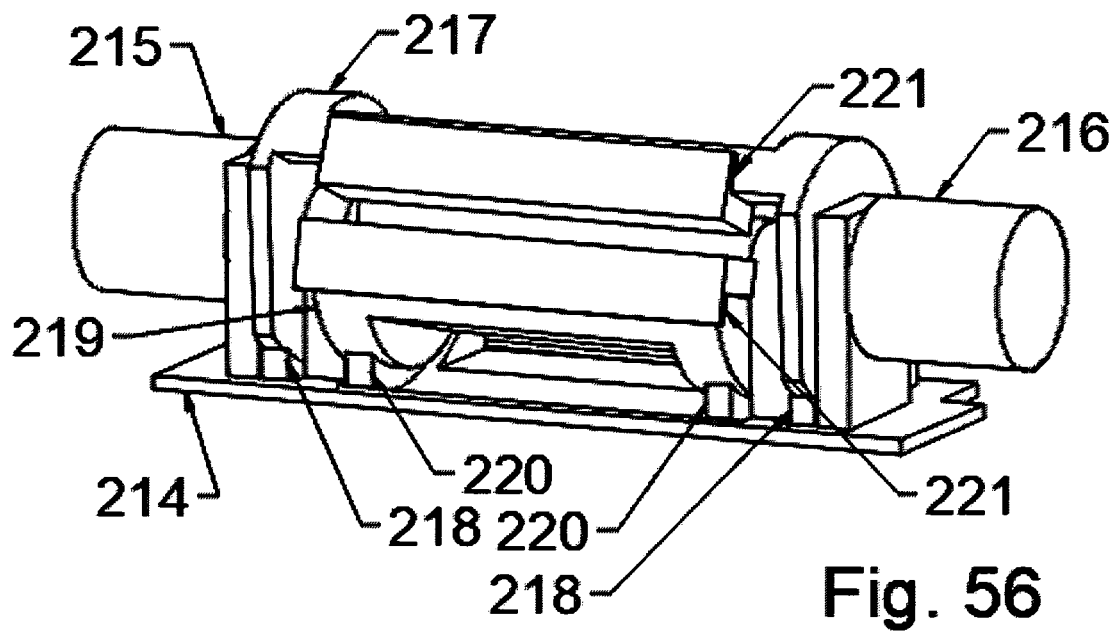
FIG. 56 shows an iso view of a rotary clamp mechanism.

A rotary clamp (FIG. 56) is comprised of a rotary clamp frame (Item 214) which has a base plate from which left and right sides project upwards an inner pair and an outer pair of mounting protrusions, an outer clamp motor (Item 215) and an inner clamp motor (Item 216) which mount in alignment opposite to each other, and to the two outside surfaces of the outer pair of protrusions of the rotary clamp frame, an outer clamp (Item 217) having a single rigid body comprised of two vertical side pieces and a connecting cross piece, where each vertical side piece fits between an inner and outer mounting protrusion of the rotary clamp frame, where one vertical side piece is connected to the outer clamp motor, and the cross piece has a mounting surface, which, when the outer clamp is rotated to face the mounting surface downwards and horizontal, the mounting surface is set back and above the horizontal plane of alignment of the inner and outer clamp motors, two outer clamp bearing pieces (Item 218) mount to the rotary clamp frame to center and support the two vertical side pieces of the outer clamp, an inner clamp (item 219) having single rigid body comprised of two vertical side pieces and a connecting cross piece, where each vertical side piece fits inside and next to an inner mounting protrusion of the rotary clamp frame, where one vertical side piece is connected to the inner clamp motor, and the cross piece has a mounting surface, which, when the inner clamp is rotated to face the mounting surface upwards and horizontal, the mounting surface is set back and below the horizontal plane of alignment of the inner and outer clamp motors, two inner clamp bearing pieces (Item 218) mount to the rotary clamp frame to center and support the two vertical side pieces of the inner clamp, two clamp extensions (Item 221) fasten to the two mounting surfaces of the cross pieces of the inner and outer clamps so that when two mounting surfaces of the cross pieces are turned horizontal and facing each other, the inner surfaces of the two clamp extensions meet together at the horizontal plane of alignment of the inner and outer clamp motors. The inner and front surfaces of the two clamp extensions can be custom machined and equipped with additional parts, such as the lower and upper wire forms (Items 222 and 223), to enable different types of work items to be clamped, unclamped, and rotated to position the work items vertically, horizontally, or at any angular position between horizontal and vertical.

Figure 46:
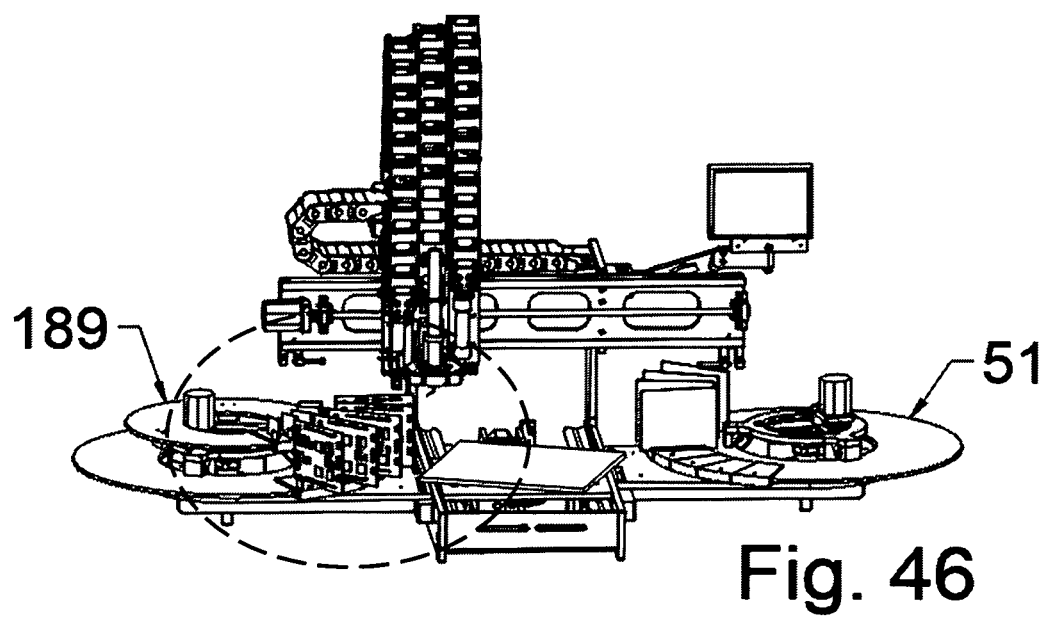
FIG. 46 shows a view of an advanced embodiment of the invention equipped with a bi-level single-motion input rotary magazine and a single level output magazine.
Figure 47:
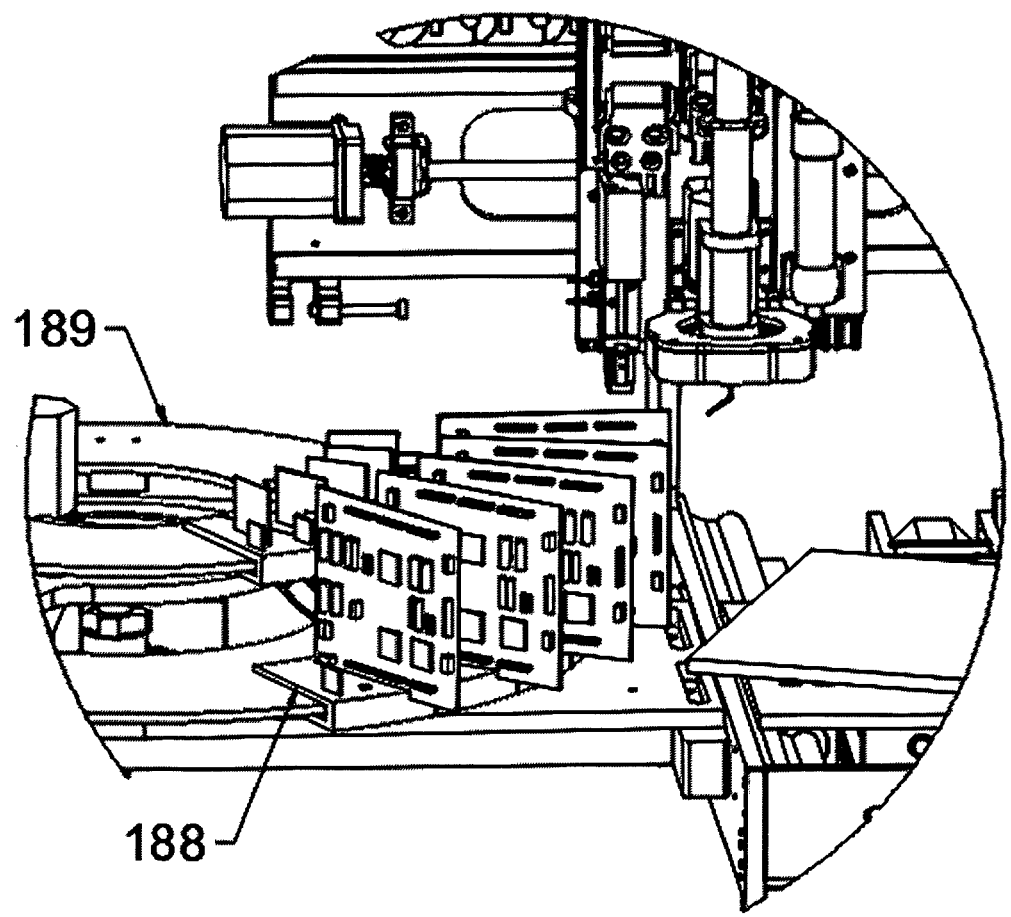
FIG. 47 shows a partial view of the bi-level single-motion input rotary magazine of the same advanced embodiment of the invention.
Figure 51:
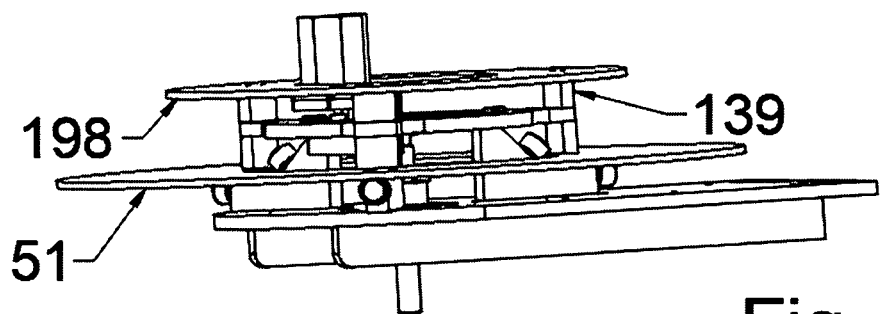
FIG. 51 shows an iso view of a bi-level single-motion rotary magazine.
Figure 52:
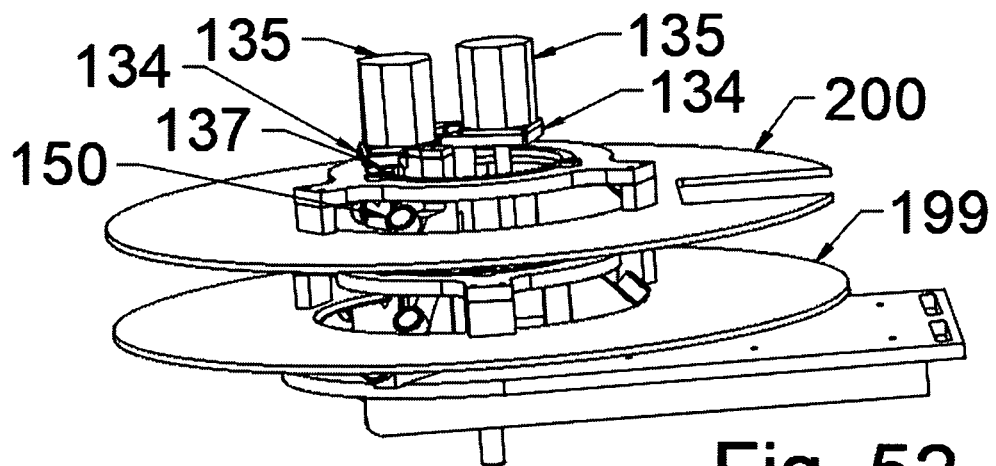
FIG. 52 shows an iso view of a bi-level dual-motion rotary magazine.
Figure 53:
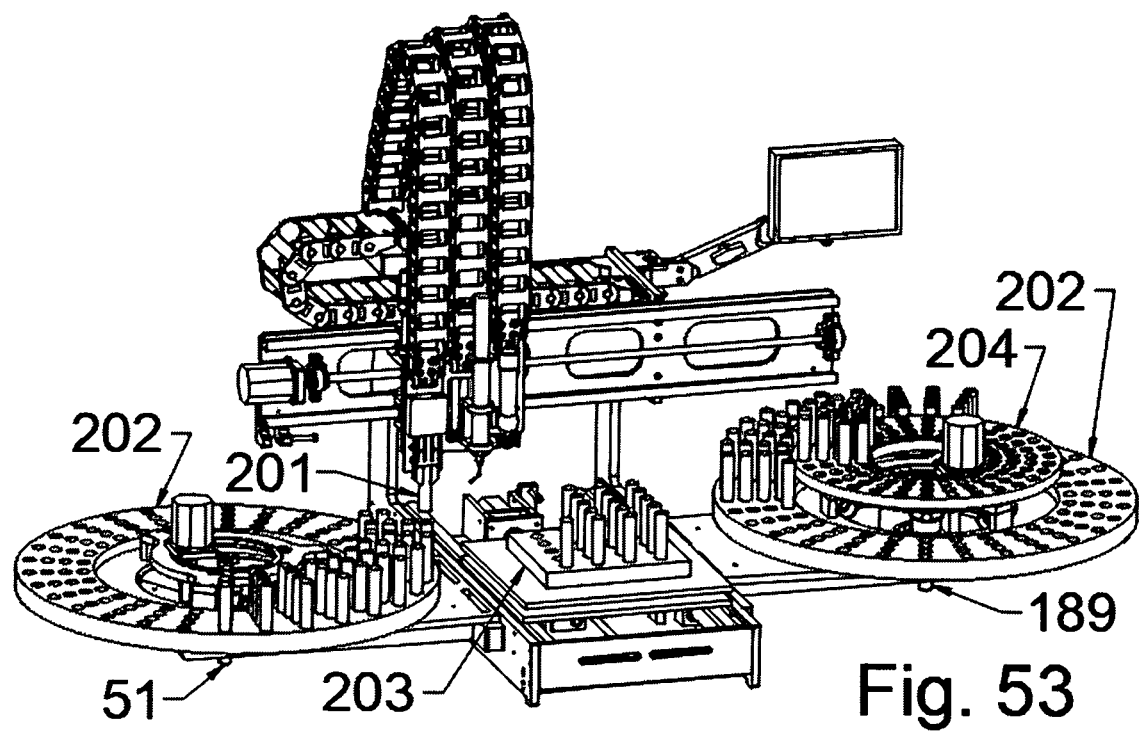
FIG. 53 shows an advanced embodiment of the invention utilizing different types of customized pallets and different types of rotary magazines.

An advanced embodiment of a tac would employ one or more single-level rotary magazines (Item 51 of FIG. 9) or one or more multi-level rotary magazines, such as a bi-level rotary magazine (FIGS. 51 and 52), or one of each kind, or no magazines at all. (FIGS. 42 and 43 show a tac employing two single-level rotary magazines (Item 51); FIGS. 46 and 47 show a tac utilizing a multi-level rotary magazine (Item 189) with a single-level magazine (Item 51); note, the product items and application devices are described merely for purposes of illustration, and are not a part of the invention.)

Figure 32:
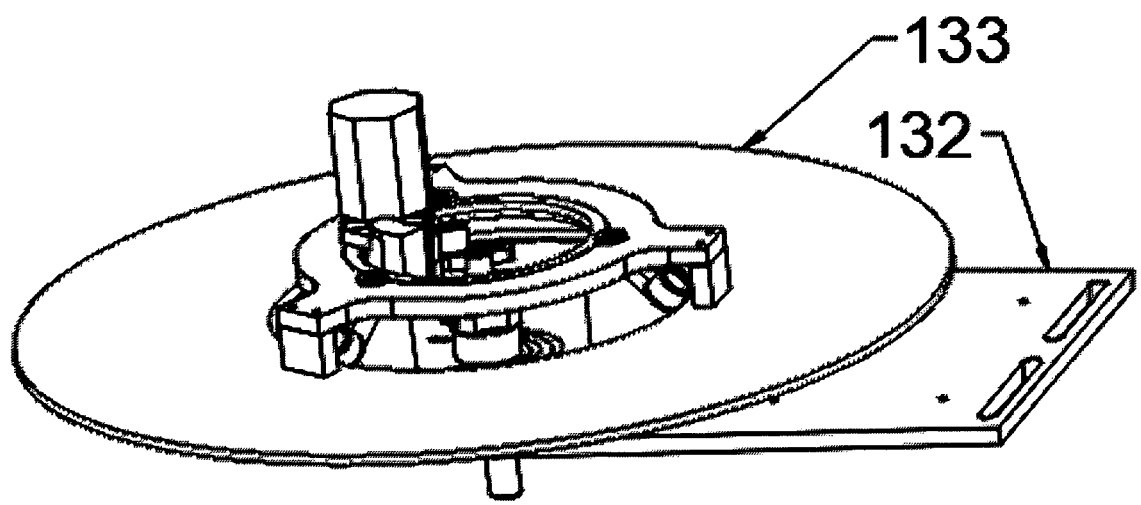
FIG. 32 shows a view of a single-level rotary magazine of an advanced embodiment of the invention.

A single-level rotary magazine is comprised (FIG. 32) of a lower magazine assembly (item 132), a standard disc assembly (Item 133), a pivot plate (Item 134), a motor (Item 135), a pivot block (Item 136), a spur gear (Item 137) (also known as a disc spur gear), a support yoke (Item 151), a pivot shaft (Item 191) and a compression spring (Item 197).

Figure 35:
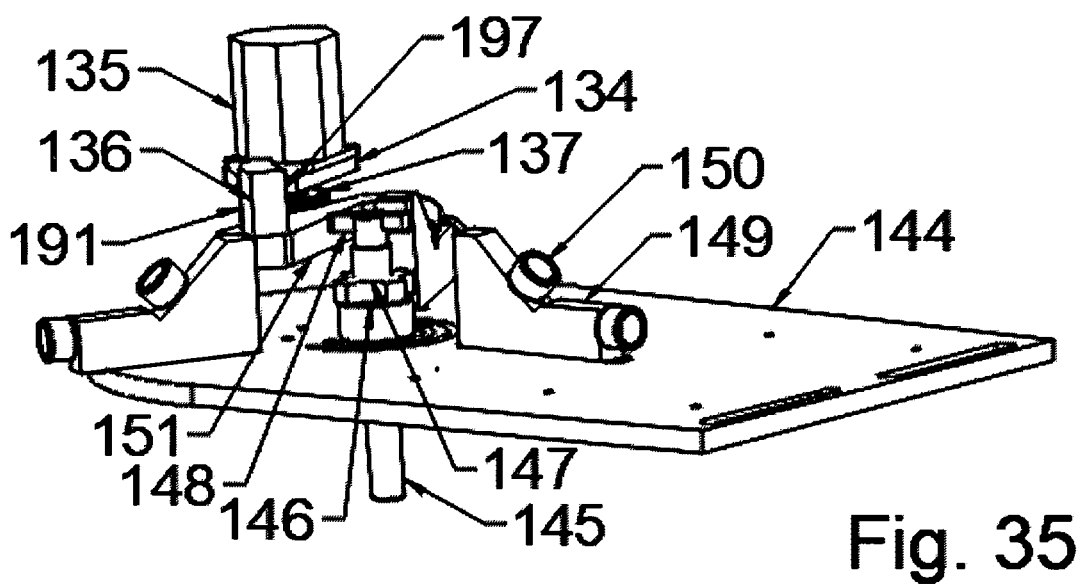
FIG. 35 shows a view of a lower assembly of a single level rotary magazine of an advanced embodiment of the invention.
Figure 36:
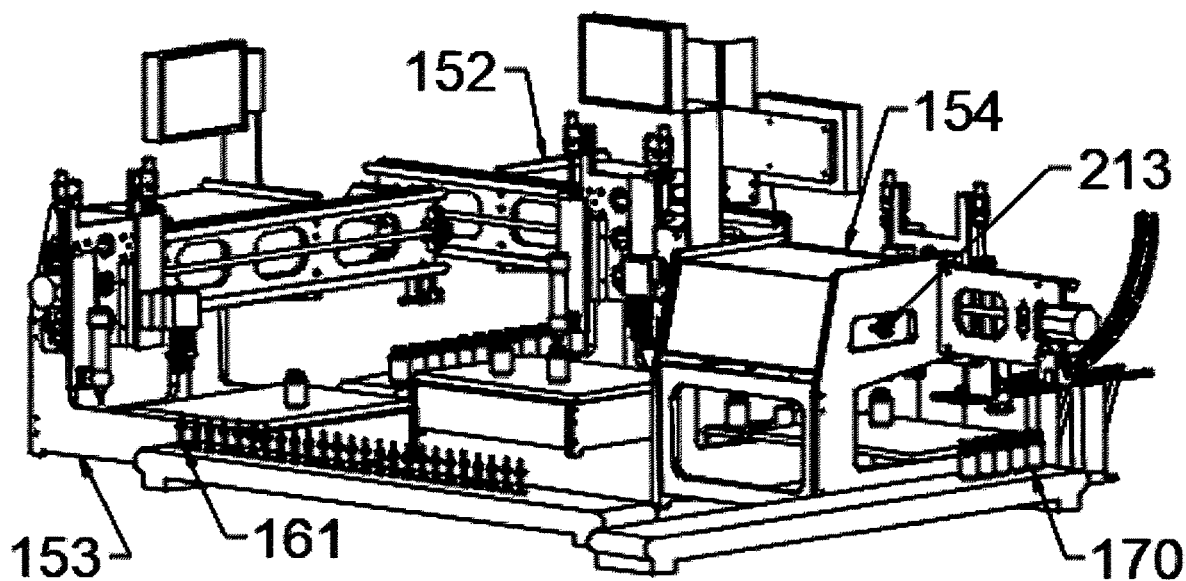
FIG. 36 shows an iso view of a multi-tac configuration utilizing a simplified embodiment of the invention.
Figure 37:
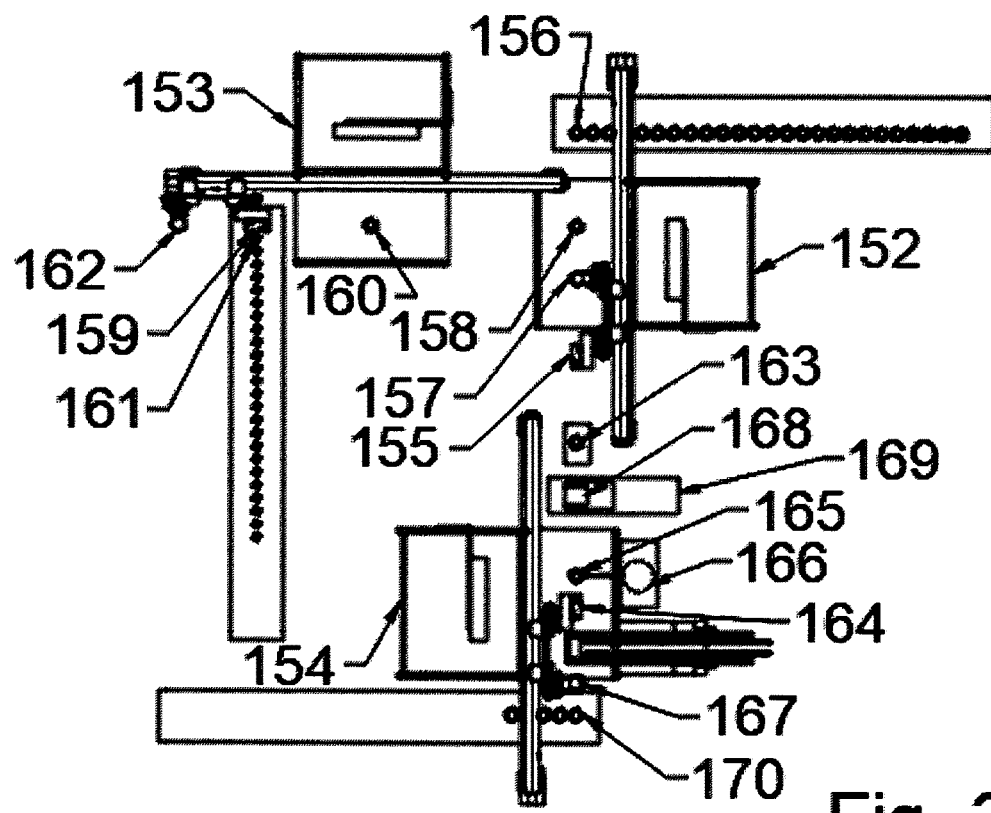
FIG. 37 shows a plan view of the same multi-tac configuration utilizing a simplified embodiment of the invention.

The lower magazine assembly is comprised (FIG. 35) of a base plate (Item 144), a support rod (item 145), a positioning block (Item 146), a positioning lock (Item 147), a t-handle (Item 148), three cam follower mounting blocks (Item 149) (also known as disc bearing blocks) and six cam followers (Item 150) (also known as bearings or disc bearings). The three cam follower mounting blocks (Item 146) are fastened to the base plate (Item 144) from underneath the base plate, and fitted into locating slots which are equally spaced angularly about the center hole of the base plate; into each mounting block are installed two cam followers, one extends horizontally forward and the other forward from the upper surface at a 45° angle; the positioning block (Item 146) has a lower section which sits within the center hole of the base plate; an internally threaded hole passes vertically thru the center of the cylindrical positioning block, thru which is screwed the externally threaded support rod (Item 145); the support rod is positioned, relative to the base plate, by screwing it up or down within the positioning block until the curved bottom surface of the support rod rests on whatever table top or surface which is supporting the tac; once the position of the support rod is established, the positioning lock (Item 147) is threaded onto the support rod from above to lock the positioning block (Item 146) in place; a t-handle (Item 148), which a simple block, is fastened to the top of the support rod (Item 145), having been fitted into a horizontal slot located at the top of the support rod.

Figure 33:
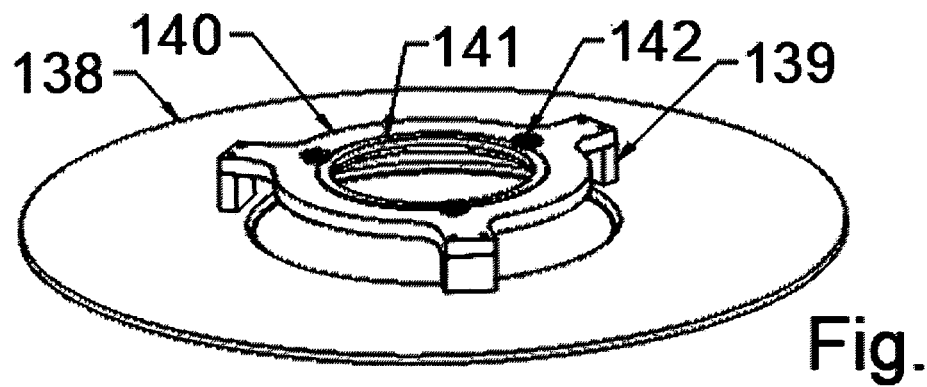
FIG. 33 shows a view of a standard disc assembly of an advanced embodiment of the invention.

The standard disc assembly is comprised (FIG. 33) of a disc (Item 138) (also known as a standard disc), three drive yoke spacer blocks (Item 139) (also known as spacer blocks), a drive yoke (Item 140) (also known as a gear mounting ring), an internal gear (Item 141), and three gear lock washers (Item 142). The three drive yoke spacer blocks (Item 139) are fastened to the top surface of the standard disc (Item 138) from underneath the disc; the drive yoke (Item 140) is fastened to the top of the spacer blocks, the internal gear (Item 141) fits into an inner ring counter bored into the upper surface of the drive yoke and is secured by the three gear lock washers (Item 138) which are fastened to the top of the drive yoke.

To assemble the single-level rotary magazine (FIG. 32), the support yoke (Item 151 of FIG. 35) is mounted between the tops of the two cam follower mounting blocks (item 149 of FIG. 35) which are farthest from the square end of the base plate (Item 144); a pivot block (Item 136) is attached to the top of the support yoke; the pivot block secures the top of the pivot plate (Item 134) (also known as a disc motor mount), which then pivots about the pivot shaft (Item 191) which fits into a centering hole in the top of support yoke (Item 151), a compression spring (Item 197) fits in a hole in the pivot block, forcing the pivot plate to swing outward away from the pivot block; the three upper cam followers (Item 150 of FIG. 35) of the lower magazine assembly (Item 133) are temporarily removed to place the standard disc assembly (Item 133) on top of the three lower cam followers (Item 150), and then the upper cam followers are reinstalled, placing them against the angled inner surface of the standard disc (Item 38 of FIG. 33); the motor (Item 135) (also known as a disc motor or drive motor) mounts to the pivot block (Item 134), and the spur gear (Item 137) (also known as a disc spur gear) is fastened to the shaft of the motor so it engages the internal gear (Item 141 of FIG. 33) of the standard disc assembly.

There are many design embodiments of a multi-level rotary magazine, but the number of their levels is limited by the ability of application devices mounted on the X-axis rail assembly to clear the top of a magazine, and by the height of the product items which the magazine will be carrying. Unless the height of frame of the tac, and/or the vertical range of a Z-axis carriage are increased, it is difficult to use more than three levels of discs.

One design of a bi-level rotary magazine involves two discs that rotate together as one; this single-motion magazine (FIG. 50) is comprised of a standard single level rotary magazine (Item 51 of FIG. 9) with addition of three additional drive yoke spacer blocks (Item 139), and a small diameter disc (Item 198).

To assemble the bi-level single-motion rotary magazine (FIG. 51), a standard single level magazine (FIG. 32) is assembled, as described above, and then three additional drive yoke spacer blocks (Item 139) are fastened to top of drive yoke the standard disc assembly (Item 140 of FIG. 33) in line with the lower spacer blocks (Item 139 of FIG. 33); and the small diameter disc (Item 197) is attached to the tops of the upper spacer blocks.

Another embodiment of a bi-level rotary magazine (FIG. 52) involves two discs with two drive motors which enable the discs to rotate relative to each other, giving it two motions. To allow the discs to be the same diameter, the upper disc has a slotted gap at one or more locations. The gap allows grippers mounted on the X-axis rail assembly of a tac room to access the lower disc without obstruction from the upper disc. In this way, a tac could take product items from, or deliver items to, the upper disc of a rotary magazine, filling or emptying it, and then, after rotating the disc to align the slot under the X-axis rail assembly, the tac could proceed to fill or empty the lower level. If the rotary magazine is working with two of more tacs grouped about it, the upper disc would feature, depending on the process, a second or more slots so different tacs are able to simultaneously access the lower disc without rotating the upper disc.

The bi-level dual-motion magazine (FIG. 52) is comprised of a modified lower magazine assembly (Item 199), a slotted disc assembly (Item 200), two motors (Item 135), and a spur gear (Item 137).

Figure 48:
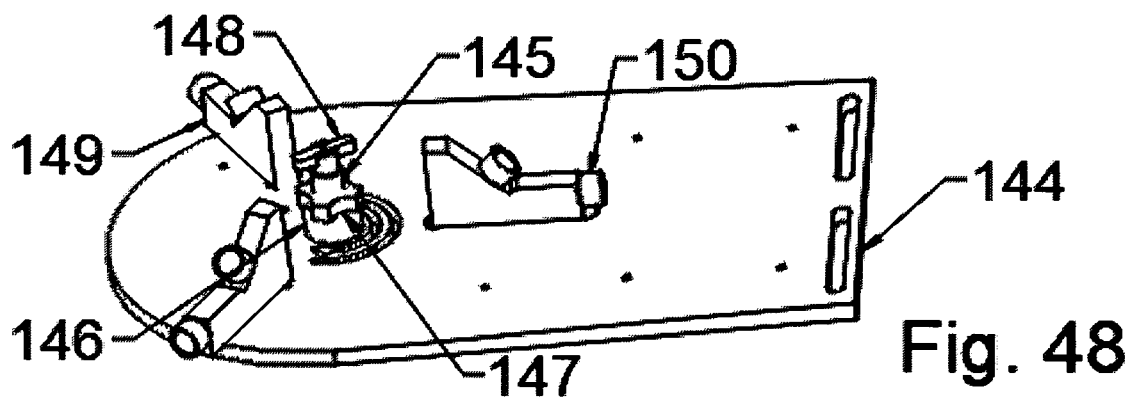
FIG. 48 shows a view of a lower assembly of a bi-level dual-motion rotary magazine of an advanced embodiment of the invention.

The modified lower magazine assembly (FIG. 48) is comprised of a lower magazine assembly (Item 132), a standard disc assembly (Item 133), three tall mounting blocks (Item 190), two pivot blocks (Item 192), six additional cam followers (Items 150), a support yoke (Item 193), a pivot shaft (Item 191), a long pivot shaft (Item 194), two pivot plates (Item 134), a gear shaft (Item 195), a spur gear (Item 137), a lower support tab (Item 196), and two compression springs (Item 197).

Figure 49:
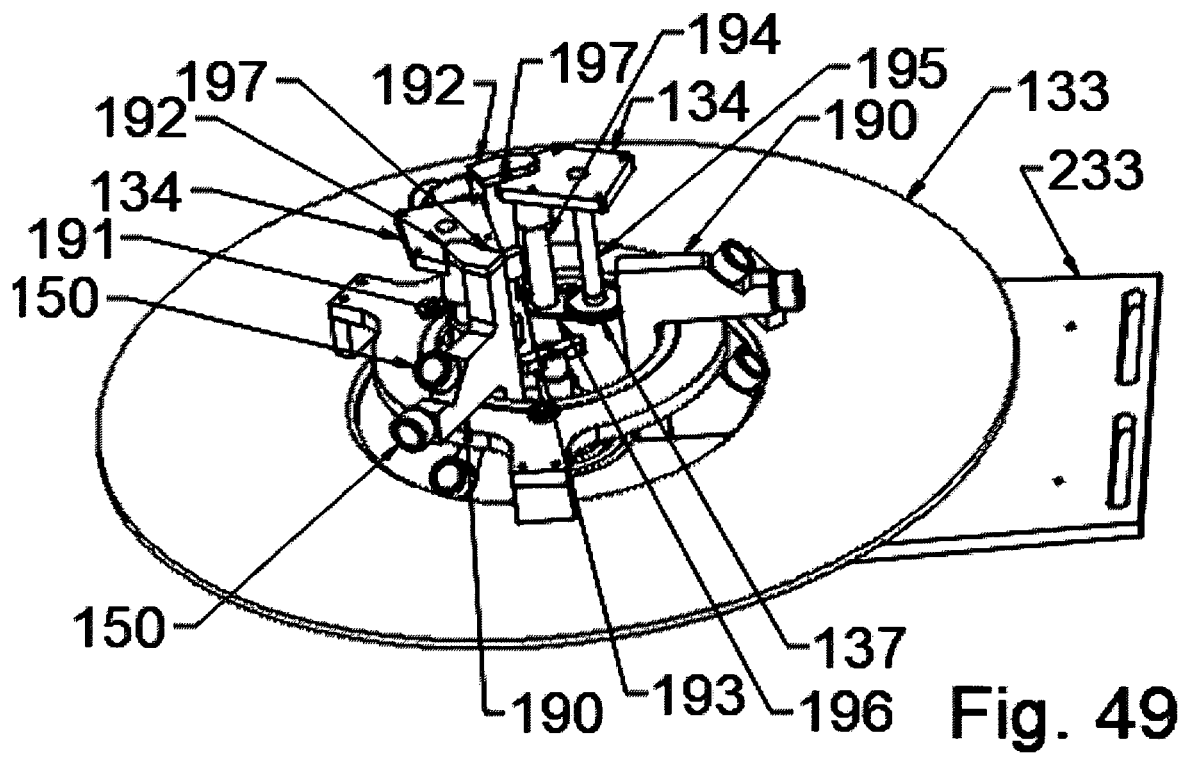
FIG. 49 shows a view of a middle assembly of a bi-level dual-motion rotary magazine of an advanced embodiment of the invention.

To assemble the modified lower magazine assembly (FIG. 49), the upper cam followers (Item 150 of FIG. 35) of the lower magazine assembly (Item 132) are temporarily removed to place the standard disc assembly (Item 133) on top of the three lower cam followers (Item 150), and then the upper cam followers are reinstalled, placing them against the angled inner surface of the standard disc (Item 138 of FIG. 33); the three tall mounting blocks (Item 190) are placed behind, aligned with, and fastened to the three cam follower mounting blocks (Item 149 of FIG. 35); the pivot blocks (Item 192) are attached to the tops of the two tall mounting blocks (Item 190) farthest from the square end of the base plate (Item 144 of FIG. 35); the support yoke (Item 193) is then attached to the middle section of these same two tall mounting blocks; the pivot blocks secures the tops of the two pivot plates (Item 134); the first pivot block, moving clockwise from the square end of the base plate, pivots about the pivot shaft (Item 191) which fits into a centering hole in the top of support yoke (Item 193), a compression spring (Item 197) fits in a hole in the pivot block, forcing it to swing outward away from the pivot block; the second pivot block, again, moving clockwise from the square end of the base plate, pivots about the long pivot shaft (Item 194) which fits into a centering hole in the lower support tab (Item 196); the lower support tab supports the spur gear (Item 137) and the gear shaft (Item 195), which, at its top end, connects to the second pivot block (Item 194); the spur gear connects to the internal gear (Item 141 of FIG. 33) of the standard disc assembly (Item 133); a compression spring (Item 197) fits in a hole in the second pivot block, forcing it to swing outward away from the pivot block; finally, the six additional cam followers (Items 150) are connected to the three tall mounting blocks (Item 190).

Figure 34:
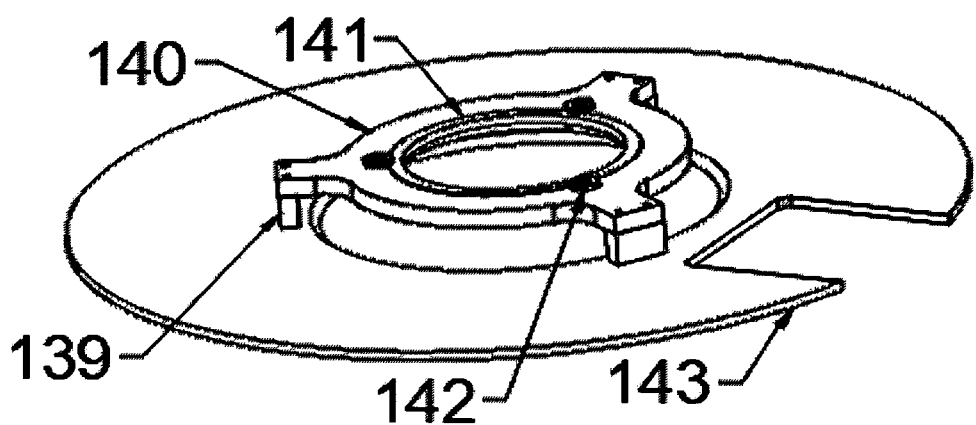
FIG. 34 shows a view of a slotted disc assembly of an advanced embodiment of the invention.

The slotted disc assembly (Item 199) is comprised (FIG. 34) of a disc (Item 143) which prominently features one or more slotted gaps, three drive yoke spacer blocks (Item 139), a drive yoke (Item 140), an internal gear (Item 141), and three gear lock washers (Item 142). The three drive yoke spacer blocks (Item 139) are fastened to the top surface of the slotted disc (Item 143) from underneath the disc; the drive yoke (Item 140) is fastened to the top of the spacer blocks, the internal gear (Item 141) fits into an inner ring counter bored into the upper surface of the drive yoke and is secured by the three gear lock washers (Item 138) which are fastened to the top of the drive yoke.

To assemble the bi-level dual-motion rotary magazine (FIG. 52), the uppermost cam followers (Items 150 of FIG. 49) of the modified lower magazine assembly (Item 199) are temporarily removed to place the slotted disc assembly (Item 200) on top of the next three cam followers (Item 150), and then the upper cam followers are reinstalled, placing them against the angled inner surface of the slotted disc (Item 143 of FIG. 34); the two motors (Items 135) are fastened to the two pivot plates (Items 134); and the spur gear (Item 137) is fastened to the shaft of the first motor, moving clockwise from the square end of the base plate, so it engages the internal gear (Item 141 of FIG. 33) of the slotted disc assembly.

With any of the configured rotary magazines, two gussets (Item 50 if FIG. 9) are fastened to the bottom base plate (Item 144 of FIG. 35), and the end of the base plate fastens to the top of a mounting bar (Item 49 of FIG. 9).

By controlling the motors connected to the rotary magazines, the drive screws of the X, Y, and Z axis assemblies and the drive gear (also known as a worm drive rod) of the rotary table, the electronics of the tac, as programmed by the monitor, would position devices attached to the application heads (Items 38 of FIGS. 15 and 16) mounted on the combined carriages, above any point of the central work table, and above product item areas of the rotary magazines, as well as above work tables and rotary magazines of other tacs. The electronics of the tac is programmed to then raise or lower the application devices separately or simultaneously, to perform different processes on the rotary work table (Item 52), or to load, reposition, reorient or unload product items to or from or on the rotary magazines, to or from or on the work table or to either side of the frame (Item 47), including to other tacs or machines.

As an example (FIGS. 42-43), a single-level rotary magazine (Item 51) could be set up with customized nests (Item 188), each carrying a circuit board (Item 185) and integrated chip (Item 186), positioned standing vertically on their side edges. A gripping device (Item 180) mounted on an application device plate (Item 38) on the combined carriages would be moved along the X-axis rail assembly to be positioned over a nested circuit board. The actuators of the vertical carriage (Item 59) could enable the gripper to pick up the circuit board and deliver it, upright, to a rotary clamp (Item 55) mounted on the rotary table (Item 52); the clamp, utilizing customized wire forms (Item 184), to hold the circuit board, could receive and secure the board, and then rotate to lay the board down horizontally level (note, in the figure, the clamp and its upper section are shown only partially rotated into position), while the traversing Y-axis table moved forwards to extend the bottom of the circuit board past the front of the frame (FIGS. 44-45); with the circuit board (Item 185) positioned over a soldering device (Item 183) horizontally positioned by a lead-screw driven actuator device (Item 187) mounted the front of the frame; the soldering device would perform a preparatory action on the bottom side of the board; the Y-axis table would then move to the rear while the rotary table turned 180°; while the clamp, the rotary table and Y-axis table went through these past movements, the combined carriage would have returned the gripper to the partially-emptied nest to pick up the integrated chip (item 186); the gripper could move further horizontally to place the chip on a different location of the nest, the surrounding geometry of which would cause the chip to fall forwards flat on the nest; the gripper could then pick up the horizontal chip and transport it to the repositioned and prepped circuit board; with the coordinated movements of the X, Y, and Z axis carriages, the gripper could place the chip (Item 186) on the board (Item 185); a soldering device (Item 181) mounted on the right application device plate of the vertical carriage (Item 59) could solder the chip to the board; the X, Y, and Z carriages could move again to allow an applicator (Item 182) mounted on the rotary head (Item 78) to dispense a thin conformal coating about the perimeter of the newly soldered chip; the carriages could move again while the rotary clamp mechanism (Item 55) rotating 180° to lay the circuit board face down; the carriages would move to allow the rotary head to place conformal coating at a few locations on the bottom side; the carriages could move again while the clamp swung the circuit board up 90° to position it vertical on its side edge; the grippers (Item 180) could then pick up the board from the clamp, and place it on a waiting open nest on the output rotary magazine (Item 51); meanwhile, the input rotary magazine would turn to place another nest of parts in position to be accessed.

A similar application example could (FIGS. 46-47) use a bi-level rotary magazine (Item 189) as the input magazine to increase the number of different integrated chips which could be placed on a circuit board.

An example of a different type of application (FIG. 52) would use a single-level rotary magazine (Item 51) as the input magazine, mounted with a customized pallet (Item 202) featuring numerous vertical holes to hold upright blood-work test tubes (Item 201). Gripping devices mounted on the X-axis rail assembly would pick up and deliver the test tubes to the rotary work table, upon which would be mounted a second customized pallet (Item 203), which likewise would feature multiple vertical holes. The tac would work to fill all the holes of this second pallet with test tubes, and then dispense different types of test solutions to each tube. The gripper would then pick up each test tube and move it to a location where the bar code of the test tube could be noted, and where an optical sensing device could take a reading of the contents of the test tube. Depending on the results of that reading, the gripper would then place the test tube on either the upper level or the lower level of bi-level rotary magazine (Item 189) which would serve as the output magazine. The two discs of the bi-level rotary magazines would carry different sized pallets (Items 202 and 204), which would also feature vertical holes with which to receive and support test tubes.

Figure 54:
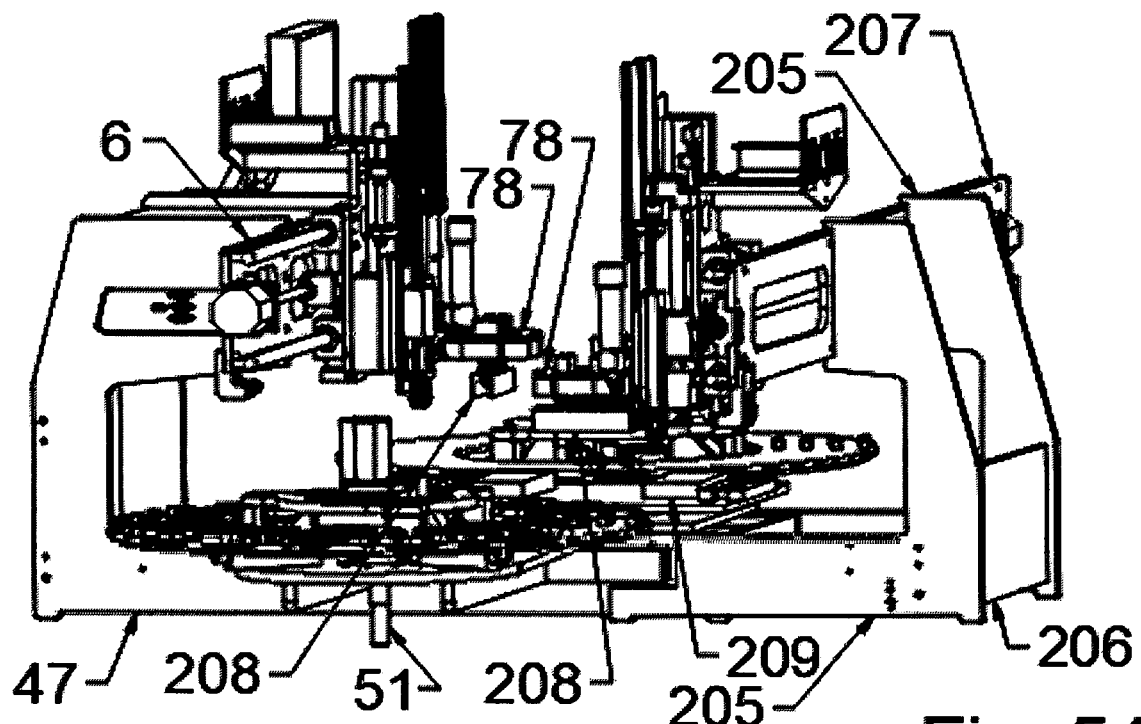
FIG. 54 shows an iso view of an advanced embodiment of the invention utilizing a double X-axis carriage set-up.
Figure 55:
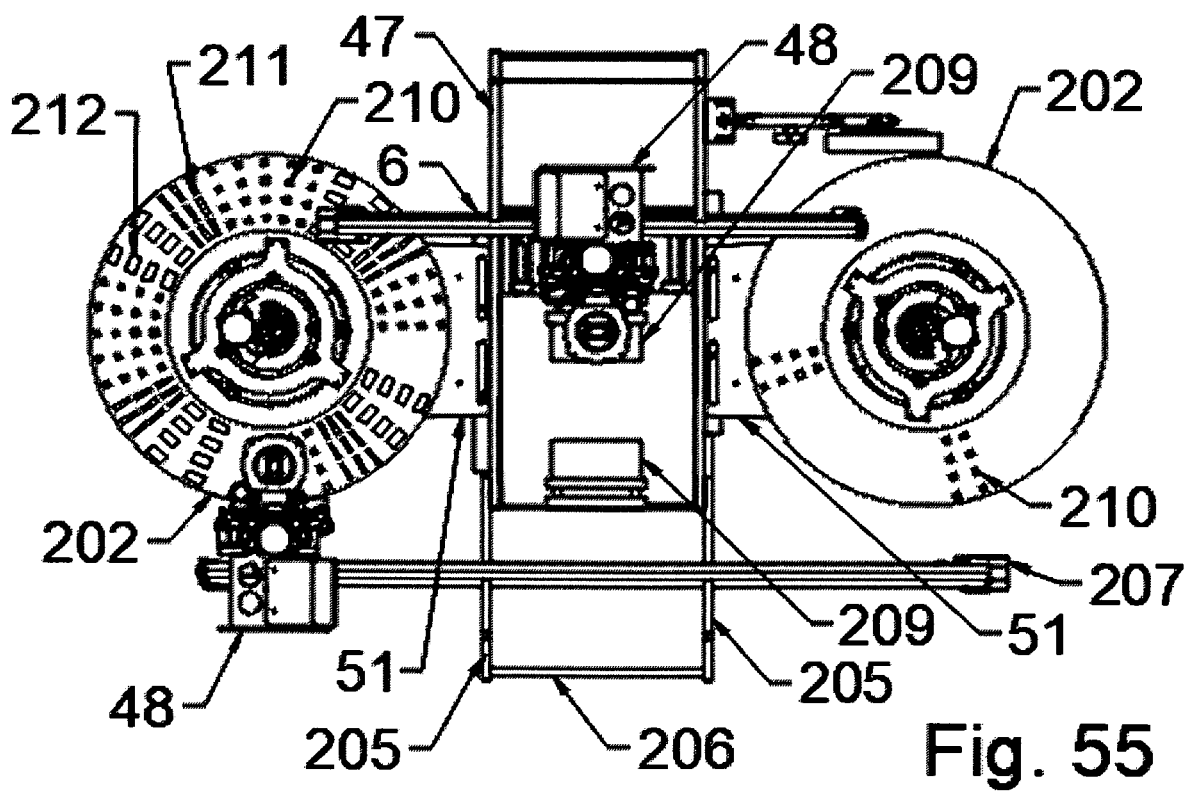
FIG. 55 shows a plan view of the same advanced embodiment of the invention utilizing a double X-axis carriage set-up.

Another variation of the most advanced embodiment of this invention (FIGS. 54 and 55) would include a second horizontal X-axis rail assembly (Item 6), with a combined carriage assembly (Item 48). This second carriage system would be installed parallel to and facing the first carriage system, at the front end of the invention. It would be attached to the front sides of the main frame assembly (Item 47) with two additional side plates (Items 205), which themselves would be strengthened by an additional front plate (Item 206). This forward carriage system could employ either a standard X-axis rail assembly (Item 6), which by itself, would double the number of heads available for mounting application devices, or it could employ an extra-wide X-axis rail assembly (Item 207), which would enable the tac to access a second point on adjacent rotary magazines, 90° to the first and standard access point, the point closest to the frame of the tac.

As an example of using a double carriage system (FIGS. 54 and 55), an input rotary magazine would support a customized pallet (Item 202) holding three different sized types of product items (Items 210, 211, and 212) arranged radially in columns. To shorten the time to pick up the items, each column would consist of a single type of item, and though the item rows could have different angular spacing between them and hold differing numbers of items, the same sequence and spacing of the product columns would be repeated four times about the pallet, that is, every 90°. The two carriage systems would be installed with identical application devices, including a pair of grippers mounted 180° apart from each other on the two rotary heads (Item 78, see FIG. 50). Each pair of grippers would be equipped with a pair of custom gripping plates (Item 208). The gripping plates on the standard carriage system would remain turned normal to the Y-axis of the tac, while the grippers and plates on the forward carriage system would be turned parallel to the Y-axis when the rotary head is moved out to pick up items. In this way, the two rotary heads could simultaneously pick up a radial column of product items, 90° apart from each other on the input magazine. The rotary heads would then transport the items to the center of the work table, but the rotary head of the forward carriage would be rotated 90° during its travel. In this way, both rotary heads, with associated and coordinated movements of the traversing Y-axis table, could place a column of items within a pair of linear clamping device (Items 209) mounted back to back on the rotary table. The product items could then be processed by other application devices mounted on the two carriage systems, and then transported to the output magazine, again with the forward rotary head rotating the items 90°. The processed product items would then be placed as two columns spaced 90° apart.

Alternatively, in this example, the product items could be picked up and moved by the forward carriage system without employing the rotary head device. One way this could be done would be to mount an L-shaped bracket on one or more of the application device plates of the forward carriage assembly. A parallel pair of grippers with clamping plates could be mounted to the extended part of the L-shaped bracket. Once having picked up a column of parts, the L-shaped bracket could transport them to the rotary table. The L-shaped bracket could either place the column of parts perpendicular to the other column, in a linear clamp turned 90° to the other one, or the traversing Y-axis table and the horizontal and vertical carriages could perform a series of coordinated movements to place the column of items on the rotary table parallel to the other column. Another option would be to mount gripping devices staggered outwards, along the Y-axis, on different application heads of the forward carriage system. Parts could then be picked up one at a time, going from the outermost row of the pallet towards the innermost, with each of the grippers being successively moved to the 90° radial line of access. Again, the parts, once brought to the work table, could be placed in any desired pattern of alignment.

Note, in these examples, the nests and pallets employed would be customized products designed for the particular applications, and neither the product items, the mounted application devices nor the auxiliary equipment are a part of the invention, and are described merely to illustrate how the invention might be employed.

As with the more basic embodiments of the invention, the more advanced embodiments of the tac are able to be operated either as a stand-alone automated unit (FIGS. 8-9), or in a modular fashion as a cell within a larger system using multiple tacs and/or other machines. Such system might involve any number of possible configurations of tacs and other machines.

Figure 38:
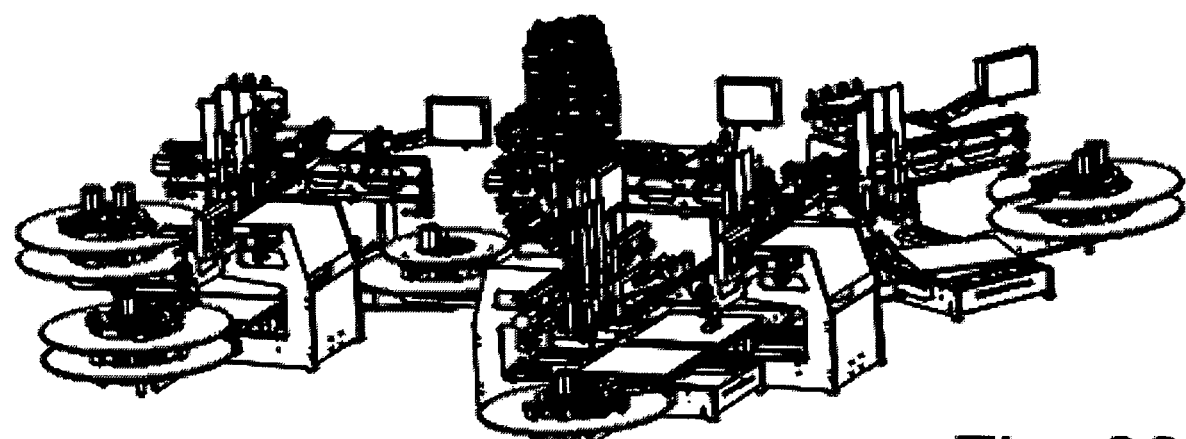
FIG. 38 shows an iso view of a multi-tac configuration utilizing advanced embodiments of the invention.
Figure 39:
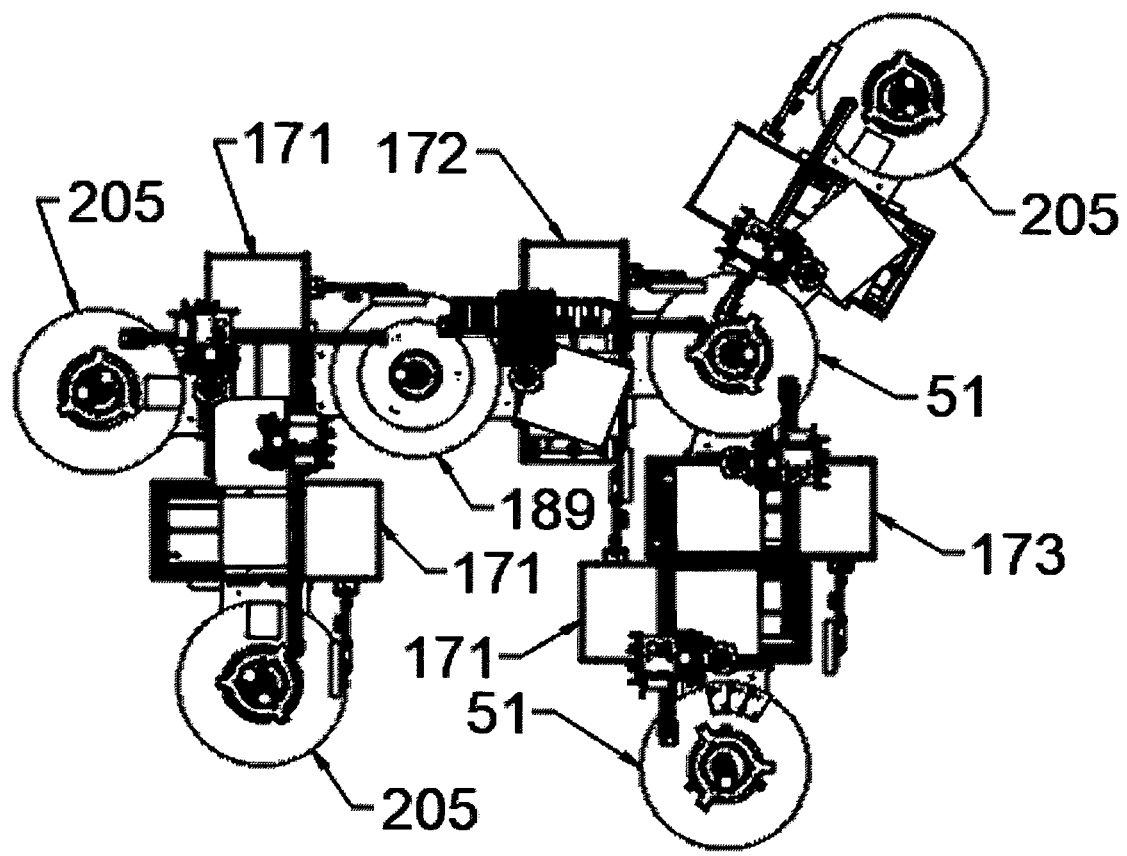
FIG. 39 shows a plan view of the same multi-tac configuration utilizing advanced embodiments of the invention.
Figure 40:
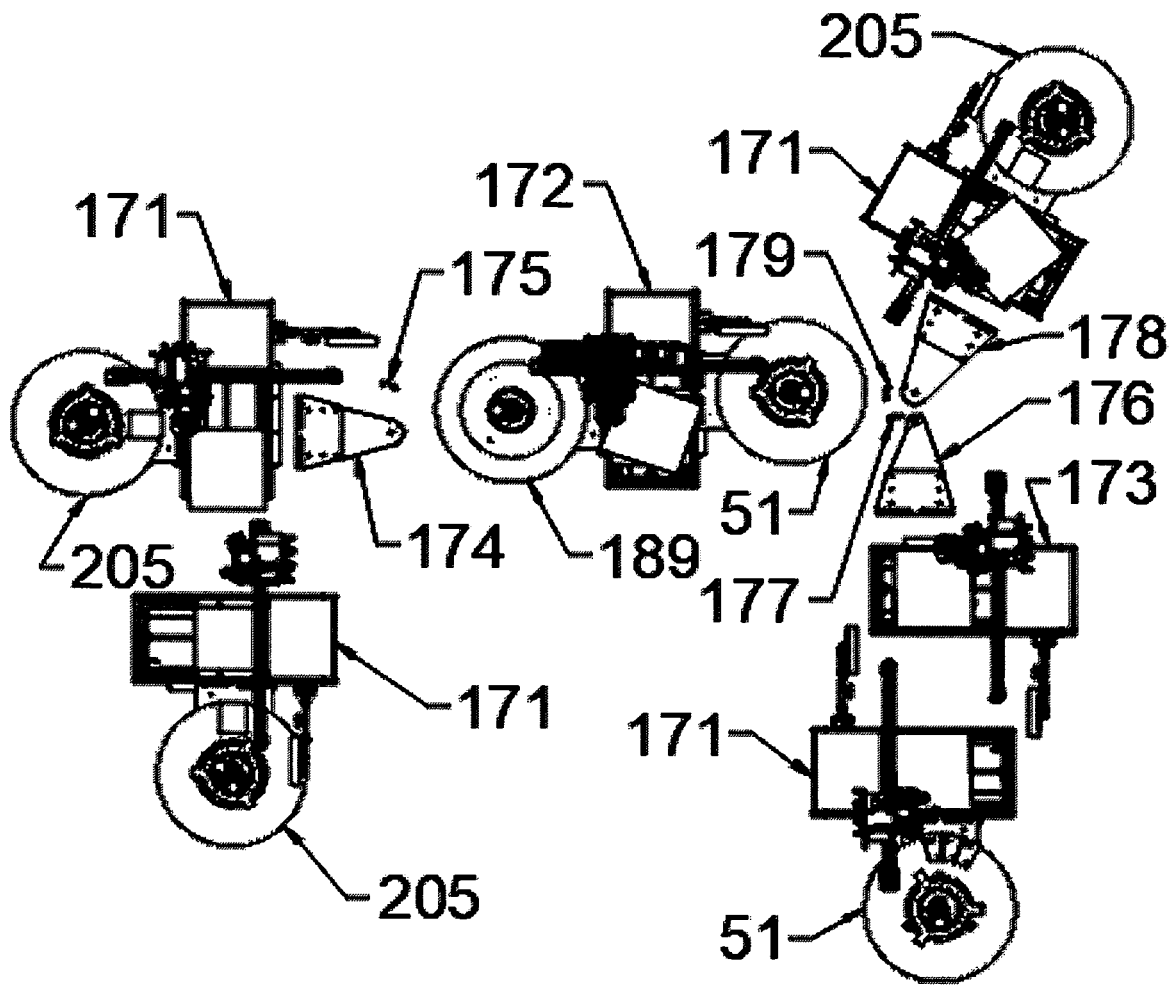
FIG. 40 shows an exploded plan view of the same multi-tac configuration utilizing advanced embodiments of the invention.
Figure 41:
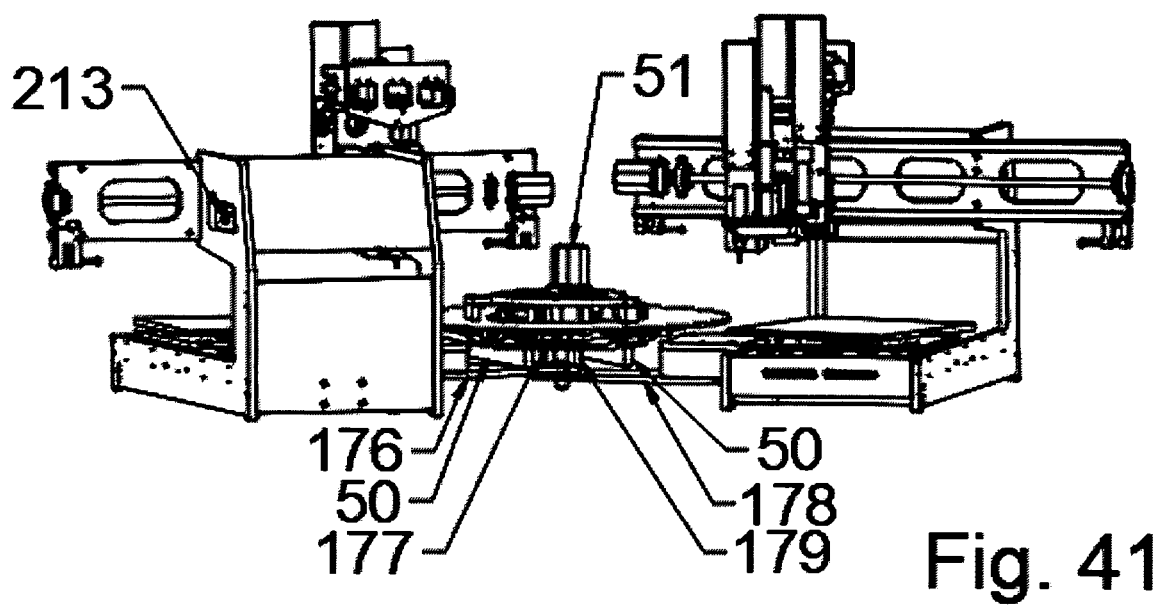
FIG. 41 shows a rear view of two advanced embodiments of the invention connected to a common rotary magazine.

For example, one could describe a more complex configuration (FIGS. 38-41) comprised of six tacs, with three different individual types of set-up, utilizing six rotary magazines, of three different types, and with the adjacent tacs aligned in five different ways. (FIGS. 38 and 39 show the same system from different perspectives, FIG. 40 shows the same arrangement, but with the tacs exploded apart, along with their link components; FIG. 41 shows assembled link parts in a partial view of the fourth and sixth tacs.)

In this example, the first tac (top left, FIG. 40), operating with one magazine (Item 171), has the second tac (bottom left), also operating one magazine (Item 171, turned perpendicular to the first, with its X-axis rail assembly extending over the rotary table of the first tac; the third tac (top center), operating two magazines (Item 172), is side-by-side with the first, paired about a magazine, with the tacs facing the same direction; the fourth tac (center right) operates no magazines (Item 173), and is turned perpendicular to first, but in line with output magazine of the third tac; the fifth tac (bottom right) operates one magazine (Item 171), and is side-by-side with the fourth tac, but facing it, with no magazine between them, and with each of their X-axis rail assemblies extended over the work area of the other; the sixth tac (top right), operating one magazine (Item 171), is also connected about the second magazine of the third tac, but at a 120° angle about the magazine from both the third and fourth tacs.

In this example (FIGS. 39 and 40), product items are processed in different stages, the first tac (top left), would perform the first two processes, dispensing liquids into a product item, an uncapped bottle, taken from its input rotary magazine, a bi-level dual-motion rotary magazine (Item 205, see FIG. 52); the second tac (bottom left), could deliver to the work table of the first tac a fourth-stage processed bottle to exchange for a second-stage bottle; the second tac would then transport the second-stage bottle to its own work table for the third and fourth stage processing; after completing the fourth-stage process, the second tac would park the bottle on a second bi-level dual-motion rotary magazine (Item 205) to give it a required amount of time to cure; after rotating each product twice about the magazine (one full cycle), the second tac would then take each bottle off the magazine in the order that they were put on, returning them to the work table of the first tac, again for swapping them for a second-stage bottle; the first tac would take the fourth-stage bottle and place it on a bi-level single-motion rotary magazine (Item 189, see FIG. 51) attached to the third tac (top center); the first tac would connect to the bottom of the third magazine with a linkage plate (Item 174) and a spacing block (Item 175); by utilizing a second bi-level type of magazine (Item 189), the fourth-stage bottle would be given additional curing time, as it rotates one and a half times about the third magazine; the third tac would then perform a fifth and sixth stage processing of the product, and then place it to the right of the tac on the fourth magazine, a single level magazine (Item 51, FIG. 32); the fourth magazine operates as part of the third tac, but would be additionally attached to the fourth tac, by a link plate and spacing block (Items 176 and 50, FIG. 41), and to the sixth tac, by a taller pair of link plate and spacing block (Items 178 and 179); the fourth magazine would rotate counter-clockwise to eventually bring the sixth-stage bottle, to the fourth tac (center right), which would pick it, and which may or may not replace it with an eighth-stage processed bottle; the fourth tac would dispense a test fluid to it, the seventh-stage, and then test it, recording the result with the optically-read bar code of the bottle; the fourth tac would then transfer the eighth stage bottle either back to the fourth magazine, if the tested bottle was found acceptable, or, if it failed the test, the bottle would be placed to one side of the fourth tac's work table; the fifth tac (bottom right) would reach over to take each of the failed test bottles off the fourth tac, transferring them to its own work table; the failed bottles would be capped at the fifth tac by a mounted capping device, and placed on a fifth magazine, a single-level magazine (Item 51, or FIG. 32); the acceptable bottle would again move counter-clockwise on the fourth magazine to the sixth tac (top right), which would remove the tested bottle, dispense a final liquid to it, and then cap the bottle, record again its bar code, and then place it on a sixth magazine, a bi-level dual-motion magazine (Item 205, or FIG. 52); the accepted capped bottles would be picked up and boxed from the sixth magazine (top right); the rejected capped bottles would be picked up and boxed from the fifth magazine (bottom right).

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A table-top automation apparatus comprising:
    a) a frame having two side plates, a front plate and a back plate, wherein said two side plates form one or two pairs of upper vertical mounting supports, wherein said second pair of upper vertical mounting supports face the first pair, from front to rear of said frame;
    b) at least one horizontal carriage rail plate, each having a left side, a right side, a top and a base and a rear and a front face, at least two horizontal carriage guide rails on said front face, a horizontal carriage motor mount on said left side of said front face, a left side horizontal carriage bearing block mount and a right side horizontal carriage bearing block mount positioned in horizontal alignment to each other and attached to said front face of said horizontal rail plate, wherein said rear face of each said horizontal carriage rail plate is affixed to one pair of said one or two pairs of upper vertical mounting supports, wherein each said horizontal rail plate extends beyond said two side plates of said frame;
    c) one horizontal carriage lead screw rotatably mounted on each said left side horizontal carriage bearing block mount and each said right side horizontal carriage bearing block mount;
    d) one horizontal carriage drive nut mounted to each said horizontal carriage lead screw;
    e) a horizontal carriage motor affixed to each said horizontal carriage motor mount and connected to each said horizontal carriage lead screw;
    f) a horizontal carriage plate having a back side and a front side, wherein said backside of said horizontal carriage plate having a left back side and a right back side, wherein said left back side and said right back side each having at least two linear slide horizontal carriage bearing blocks which engage said at least two horizontal carriage guide rails on each said horizontal carriage rail plate;
    g) one or more pairs of vertical device plate slide tracks attached to said front side of said horizontal carriage plate;
    h) a device plate lead screw mounting bracket attached to said horizontal carriage plate above each said pair of vertical device plate slide tracks;
    i) a device plate lead screw mounted on each said device plate lead screw mounting bracket;
    j) a device plate drive nut mounted on each said device plate lead screw;
    k) a device plate motor affixed to each said device plate lead screw mounting bracket and connected to each said device plate lead screw;
    l) a device plate mounted to each said device plate drive nut, wherein each device plate having a forward side and a rear side wherein said rear side having two or more device plate slide bearings, wherein said device plate slide bearings are affixed to each said pair of vertical device plate slide tracks of said horizontal carriage plate, and wherein said forward side of said device plate having a space to mount at least one device or apparatus;
    m) an electronic circuitry and power supply system contained within one or more housing, each said housing having a top side, a left and right side, and being mounted within said frame, wherein said electronic circuitry and power supply system connects to each said each horizontal carriage motor and to each said device plate motor; and
    n) one or more attachment interfaces mounted on one or more sides of said one or more said housings of said electronic circuitry and power supply system, wherein said attachment interfaces are connected to said electronic circuitry and power supply system to provide hookups to power, control or track said devices or apparatus operating in conjunction with said table-top automation apparatus, including with other units of said table automation apparatus.

2. A table-top automation apparatus according to claim 1, wherein said two side plates further comprise:
    a) two horizontal mounting supports on a lower portion of said frame; and
    b) a horizontal work plate supported by said two horizontal mounting supports of said two side plates.

3. A table-top automation apparatus according to claim 1, wherein said two side plates of said frame further comprise:
    c) two horizontal mounting supports on a lower portion of said frame;
    d) two table base guide rails mounted within said frame between said front plate and said back plate on said frame, one mounted on each said side plate, wherein said two table base guide rails are oriented horizontally and aligned to each other;
    e) two table base drive bearing mounts, each affixed to and within said frame and positioned about the center between said two side plates, one table base drive bearing mount affixed about the front of said frame, and one affixed about the rear of said frame;
    f) a table base drive lead screw rotatably mounted on said two table base drive bearing mounts;
    g) a table base drive nut mounted to said table base drive lead screw;
    h) a table base drive motor affixed to said frame on said back plate positioned about the center between said two side plates, and connected to said table base drive lead screw, wherein said table base drive motor is connected to said electronic circuitry and power supply system;
    i) a left side pair of table base slide bearing blocks affixed to said two table base guide rails and a right side pair of table base slide bearing blocks positioned in alignment to each other and affixed to said two table base guide rails; and
    j) a table base having an upper surface and a bottom surface, wherein said bottom surface attached to said table base drive nut and to said left side pair of table base slide bearing blocks and said right side pair of table base slide bearing blocks.

4. A table-top automation apparatus according to claim 3, further comprising:

a) two worm drive bearing mounts attached to said bottom surface of said table base;
b) a worm drive rod attached to said two worm drive bearing mounts;
c) a worm drive motor attached to said bottom surface of said table base, and connected to said worm drive rod, wherein said worm drive motor is connected to said electronic circuitry and power supply system;
d) a rotary work table having an upper surface and a lower surface, having a bearing ring attached to said lower surface of said rotary work table, wherein said bearing ring positioned upon said upper surface of said table base and said bearing ring centered on a cylindrical feature of said table base;
e) a gear mount having a upper side and a lower side, wherein said upper side attached on said lower surface of said rotary work table and centered within said bearing ring, wherein said bottom side of said gear mount extends below said lower side of said table base; and
f) a worm gear affixed on said gear mount wherein said worm gear is engaged to said worm drive rod.

5. A table-top automation apparatus according to claim 4, further comprising:
a) a rotary device bracket having a front side and rear side, wherein said rear side of said rotary device bracket is mounted to said front side of said vertical carriage plate;
b) a rotary housing base having a modified toroidal shape having an inner, outer and bottom wall, a center core through opening, an open top exposing a circular inner cavity contained between said inner, outer and bottom walls, and a rear opening in said outer wall, wherein said outer wall is attached to said front side of said rotary device bracket; wherein said inner and outer wall each have a top surface, wherein said top surface of said outer wall extends above said top surface of said inner wall;
c) a gear ring having external teeth, wherein said gear ring is seated on said bottom wall within said circular inner cavity of said rotary housing base;
d) a gear belt having inner teeth, wherein said inner teeth engage said external teeth of said gear ring within said circular inner cavity of said rotary housing base, wherein a portion of said gear belt is extended out said rear opening in said outer wall of said rotary housing base;
e) a turntable having a ring shape and a top, bottom and inner side, wherein said bottom side of said turntable is seated upon said top surface of said inner wall of said rotary housing base, wherein said bottom side of said turntable is attached to said gear ring, wherein when said gear ring is turned by said gear belt, said turntable is turned as well, wherein said turntable having one or more mounting protrusions which extend inward from said inner side of said turntable over and above said center core through opening of said rotary housing base;
f) a cover plate having a top and bottom surface and a circular opening to expose said center core through opening of said rotary housing base; wherein said bottom surface of said cover plate attaches to said top surface of said outer wall of said rotary housing base, wherein said bottom surface of said cover plate serves to center and captivate said top side of said turntable, wherein said circular opening of said cover plate enables devices mounted to said mounting protrusions of said turntable to rotate within said center core through opening of said rotary housing base without obstruction from said cover plate;
g) a rotary device motor attaches to said top surface of said cover plate, wherein said rotary device motor is connected to said electronic circuitry and power supply system; and
h) a rotary device gear spur attaches to drive shaft of said rotary device motor attached to said cover plate, wherein said rotary device gear spur engages said inner teeth of said gear belt.

6. A table-top automation apparatus according to claim 4, further comprising:
a) a cable carrier support plate having an upper, base and rear surfaces, wherein said cable carrier support is affixed to said upper surface of said horizontal carriage plate, wherein said cable carrier support plate extends perpendicular out from said back side of said horizontal carriage main plate, wherein said cable carrier support plate can be an extended portion of said rear side of said vertical carriage motor mount;
b) a cable carrier back plate having a front side, wherein said front side of cable carrier back plate is attached to said rear surface of said cable carrier support plate;
c) a horizontal cable carrier, wherein said horizontal cable carrier being a single, continuous, flexible, segmented, commercially available product for purchase having two ends and an inner channel running the length of said horizontal cable carrier, through which said inner channel is routed electrical power and control lines connecting said vertical carriage motor, said device plate motors, and said devices attached to said device plates to said electronic circuitry and power supply system or to said one or more attachment interfaces mounted on one or more said sides of said one or more said housings of said electronic circuitry and power supply system, wherein one end of said horizontal cable carrier is attached to said top left or right side of said one of more housing of said electronic circuitry and power supply system, wherein said one end of said horizontal cable carrier laying horizontally across said top side of said one of more housing of said electronic circuitry and power supply system, forming a lower portion, wherein said horizontal cable carrier is bended upwards and horizontally back over said lower portion of said cable carrier, and is attached at its upper end to said upper surface of said cable carrier support plate, wherein said horizontal cable carrier flexes back and forth in serpentine fashion as said horizontal carriage plate travels left and right on said horizontal carriage guide rails; and
d) two or more vertical cable carriers, each being a single, continuous, flexible, segmented, commercially available product for purchase having two ends and an inner channel running the length of said vertical cable carrier, through which said inner channel is routed electrical power and control lines connecting said vertical carriage motor, said device plate motors, and said devices attached to said device plates to said electronic circuitry and power supply system or to said one or more attachment interfaces mounted on one or more said sides of said one or more said housings of said electronic circuitry and power supply system, wherein one end of each said vertical cable carrier is attached to said front side of said cable carrier back plate, forming a rearward portion of each said vertical cable carrier, wherein said rearward portion of each said vertical cable carrier is extended upwards and is bended forward and downwards in front of said rearward portion of said vertical cable carrier, and is attached at its lower end to the upper portion of said forward side of one said device plate, or to said top of said front side of said vertical carriage assembly above said space provided to mount a device, wherein each said vertical cable carrier separately flexes up and down in serpentine fashion as said device plates or said vertical carriage assembly move up and down.

7. A table-top automation apparatus according to claim 4, further comprising:
   a) one or more pallets, wherein said pallets are attached to said upper surface of said rotary work table, wherein said one or more pallets would be fabricated to custom shapes and sizes to hold, position and orient one or more work items for pick-up, receiving, or processing by devices operating in conjunction with said table-top automation apparatus, wherein said one or more pallets can be easily removed or replaced by different said one or more pallets, wherein said one or more pallets can simultaneously hold, position and orient similar work items in different ways.

8. A table-top automation apparatus according to claim 4, further comprising:
   a) a rotary clamp frame having a single rigid body having a left and right side, an inside and an outside, a front and rear side, a base plate, two outer mounting projections, two inner mounting projections, wherein said base plate of said rotary clamp frame is attached to said top surface of said rotary table, wherein said two outer mounting protrusions project upwards from said base plate, one on said outside of said left side and one on said outside of said right side, wherein said two inner mounting projections project upwards from said base plate, one on said inside of said left side and one said inside of said right side;
   b) an outer clamp motor mounted to said rotary clamp frame on said outside of said left side of said two outer mounting projections, wherein said outer clamp motor is connected to said electronic circuitry and power supply system;
   c) an inner clamp motor mounted to said rotary clamp frame on said outside outer said right side of said two outer mounting projections, wherein said inner clamp motor is aligned with said outer clamp motor, wherein said inner clamp motor is connected to said electronic circuitry and power supply system;
   d) an outer clamp, a rotatably single rigid body having a left and right side, an inside and an outside, two vertical side pieces and a cross piece, wherein said left vertical side piece is positioned between said left outer and inner mounting projections of said rotary clamp frame, wherein said left vertical side piece attaches to drive shaft of said outer clamp motor, wherein said right vertical side piece is positioned between said right outer and inner mounting projections of said rotary clamp frame, wherein said cross piece of said outer clamp connects said inner sides of said two vertical side pieces, wherein said cross piece having a mounting surface on one side which, when said outer clamp is rotated to face said mounting surface downwards and horizontal, said mounting surface stands set back and above said horizontal plane of alignment of said inner and outer clamp motors;
   e) two or more clamp bearings of a first type mount to said rotary clamp frame to center and support said vertical side pieces of said outer clamp about the shared axis of rotation of said outer clamp motor and said inner clamp motor;
   f) an inner clamp, a rotatably single rigid body having a left and right side, an inside and an outside, two vertical side pieces and a cross piece, wherein said left vertical side piece is positioned inside of said left inner mounting projection of said rotary clamp frame, wherein said right vertical side piece is positioned inside of said right inner mounting projection of said rotary clamp frame, wherein said right vertical side piece attaches to drive shaft of said inner clamp motor, wherein said cross piece connects said inner sides of said two vertical side pieces, wherein said cross piece having a mounting surface on one side which, when said inner clamp is rotated to face said mounting surface upwards and horizontal, said mounting surface stands set back and below said horizontal plane of alignment of said inner and outer clamp motors;
   g) two or more clamp bearings of a second type mount to said rotary clamp frame to center and support said vertical side pieces of said inner clamp about the shared axis of rotation of said outer clamp motor and said inner clamp motor;
   h) two clamp extensions, being identical, each having an inner, outer, and front surface, wherein said inner and outer surfaces are parallel to each other, and said front surface is perpendicular to said inner and outer surfaces, wherein said outer surface of one clamp extension attaches to said mounting surface of said outer clamp, and said outer surface of said other clamp extension attaches to said mounting surface of said inner clamp, wherein, when said outer and inner clamps are separately rotated to place said mounting surfaces of said outer and inner clamps horizontal and parallel to each other, said inner surfaces of two said clamp extensions meet together at said horizontal plane of alignment of said inner and outer clamp motors, and said front surfaces of said clamp extensions are placed into alignment and extend out beyond said front side of said rotary clamp frame, wherein said inner and front surfaces of said two clamp extensions can be custom machined or equipped with additional parts to clamp and unclamp different types of work items, and to rotate and position said work items vertically or horizontally or at any angular position between vertical and horizontal.

9. A table-top automation apparatus according to claim 3, further comprising:
   a) one or more pallets, wherein said pallets are attached to said upper surface of said table base, wherein said one or more pallets would be fabricated to custom shapes and sizes to hold, position and orient one or more work items for pick-up, receiving, or processing by devices operating in conjunction with said table-top automation apparatus, wherein said one or more pallets can be easily removed or replaced by different said one or more pallets, wherein said one or more pallets can simultaneously hold, position and orient similar work items in different ways.

10. A table-top automation apparatus according to claim 1, further comprising:
    a) a horizontal carriage plate having a back side and a front side, wherein said back side of each said horizontal carriage plate is attached to said horizontal carriage drive nut, wherein said back side having a left back side and a right back side, wherein said left back side and said right back side each having two linear slide horizontal carriage bearing blocks which engage said at least two horizontal guide rails on each said horizontal carriage rail plate, wherein said front side of said horizontal carriage plate having a right side, a left side, a vertical carriage motor mount, two or more pairs of vertical carriage slide bearing blocks, and two vertical carriage drive bearing mounts, wherein said one or more pairs of vertical carriage slide bearing blocks are vertically aligned on said left side of said horizontal carriage plate, and said one or more pairs of vertical carriage slide bearing blocks are vertically aligned on said right side of said horizontal carriage plate, wherein said vertical carriage motor mount is attached perpendicular to, and horizontally positioned about the center on said front side of said horizontal carriage plate, wherein two vertical carriage drive bearing mounts are horizontally positioned about the center on said front side of said horizontal carriage plate, one above the other, one on an upper portion of said front side, and one on a lower portion;
b) a vertical carriage lead screw rotatably mounted on said two vertical carriage drive bearing mounts;
c) a vertical carriage drive nut mounted to said vertical carriage lead screw;
d) a vertical carriage motor affixed to said upper side of said vertical carriage motor mount and connected to said vertical carriage lead screw, wherein said vertical carriage motor is connected to said electronic circuitry and power supply system;
e) a vertical carriage plate having a front side and back side, wherein said back side of said vertical carriage plate is attached to said vertical carriage drive nut, wherein said back side having a left back side and a right back side, wherein said left back side and said right back side each having two vertical guide rails, wherein said left back side vertical guide rail is engaged to said pair of vertical carriage slide bearing blocks attached to said right front side of said horizontal carriage plate and said right back side vertical guide rail is engaged to said pair of vertically aligned linear slide vertical carriage slide bearing blocks attached to said left front side of said horizontal carriage plate, wherein said front side of said vertical carriage plate having at least one pair of vertical device plate slide tracks and a device plate lead screw mounting bracket above each said pair of vertical slide tracks, wherein said front side of said vertical carriage plate having at least one space to mount a device or apparatus, wherein said space can be on the left or right of said at least one pair of vertical device plate slide tracks, or located between a pair of said vertical device plate slide tracks;
f) a device plate lead screw mounted on each said device plate lead screw mounting bracket;
g) a device plate drive nut mounted on each said device plate lead screw;
h) a device plate motor affixed to each said device plate lead screw mounting bracket and connected to each said device plate lead screw, wherein each said drive plate motor is connected to said electronic circuitry and power supply system; and
i) a device plate mounted to each said device plate drive nut, wherein each device plate having a forward side and a rear side, wherein said rear side having a pair of device plate slide bearings, wherein said pair of device plate slide bearings affix to said pair of vertical device plate slide tracks of said horizontal carriage plate, and wherein said forward side having a space to mount at least one device or apparatus.

11. A table-top automation apparatus according to claim 10, further comprising:
a) a set of three or more spacer blocks, each said spacer block having a top and bottom surface, wherein each said bottom surface of said spacer blocks is attached to, and equally placed radially about said top surface of topmost said gear mounting ring; and
b) a disc of a second type, having a smaller diameter than said discs of said first type, wherein said disc of said second type having a top and bottom surface, wherein said bottom surface attaches to said top surfaces of said set of three or more spacer blocks, wherein the turning of upper-most said disc of a first type will simultaneously turn said gear mounting ring affixed to said disc of a first type, said set of three or more spacer blocks and said attached disc of a second type.

12. A table-top automation apparatus according to claim 11, further comprising:
a) one or more nests having wedge shapes, wherein said nests are attached to said top surfaces of said discs of said second type, wherein said nests are fabricated to custom shapes and sizes to hold, position and orient one or more work items for pick-up, receiving, or processing by devices operating in conjunction with said table-top automation apparatus, wherein said nests are easily removed or replaced, wherein said nests, whether identical or of different sizes, can be fitted together in angular arrays on said top surfaces of said one or more discs of said second type; and
b) one or more ring-shaped pallets, wherein said ring-shaped pallets can be attached to said top surfaces of said one or more discs of said second type, wherein said one or more pallets are fabricated to custom shapes and sizes to hold, position and orient one or more work items for pick-up, receiving, or processing by devices operating in conjunction with said table-top automation apparatus, wherein said one or more pallets can be easily removed or replaced.

13. A table-top automation apparatus according to claim 10, further comprising:
a) a device tilt base plate, wherein said device tilt base plate having a front and rear surface, wherein said rear surface of said tilt base plate can attach to said forward side of one said device plate or to said front side of said vertical carriage plate in said space available to mount a device or apparatus;
b) two or more stand-off parts, wherein said stand-off part having a forward and rear surface, wherein said rear surfaces of said stand-off parts attach to said front surface of said tilt base plate;
c) a tilt motor plate having a forward and rear side, wherein said rear side attaches to said front surfaces of said two or more stand-off parts;
d) a device tilt motor, having a drive shaft, attaches perpendicularly to said rear surface of said tilt motor plate, wherein said drive shaft extends through to said forward side of said tilt motor plate, wherein said device tilt motor is connected to said electronic circuitry and power supply system;
e) a device tilt forward bracket having a front and rear side, left and right side, an arm projecting rearward from each of the left and right sides, and a shaft positioned about the center of said front side and protruding forward, wherein said front side is facing said rear side of said tilt motor plate, wherein said shaft extends rotatably through said tilt motor plate to said forward side of said tilt motor plate, wherein said rear side of said device tilt forward bracket can be adapted to attach to different devices;

f) a device tilt rear bracket having a front and rear side, a left and right side, an arm projecting forward from each of the left and right sides and a shaft stub positioned about the center of said rear side and projecting rearwards, wherein said front side faces said rear side of said device tilt forward bracket, wherein said arms projecting from said left and right sides of said device tilt forward and rear brackets attach to each other, wherein said shaft stub of said device tilt rear bracket is aligned with said shaft of said device tilt forward bracket, wherein said shaft stub of said device tilt rear bracket rotatably mounts to said tilt base plate, wherein said device tilt inner bracket can be adapted to enable it and said device tilt forward bracket to secure and support different devices between them;

g) a tilt device drive spur gear attaches to said drive shaft of said device tilt motor on said forward side of said tilt motor plate;

h) a tilt device driven spur gear attaches to said shaft of said device tilt forward bracket on said forward side of said tilt motor plate; and i) a tilt device gear belt connects said tilt device drive spur gear and said tilt device driven spur gear.

14. A table-top automation apparatus according to claim 1, further comprising:

a) one or two rotary magazine base plates, wherein each said rotary magazine base plate having a top surface and a side surface, wherein said rotary magazine base plate is horizontally oriented and symmetrical about a centerline located along said top surface and perpendicular to said side surface, wherein said side surface is mounted to an outer surface of one said side plate of said frame, wherein said rotary magazine base plate extends perpendicular outward from said frame, wherein if said table-top automation apparatus comprises two said rotary magazine base plates, one said rotary magazine base plate would be mounted to an outer surface of each said side plate of said frame, wherein said rotary magazine base plates are positioned so any devices supported from the horizontal carriage rail plate can be moved to be located above said rotary magazine base plates;

b) a support rod connected to said rotary magazine base plate, wherein said support rod is vertically perpendicular to said top surface of said rotary magazine base plate, wherein said support rod having a bottom surface, wherein said bottom surface can rest upon same supporting surface as upon which rests said frame of said table-top automation apparatus;

c) one or more sets of three or more disc bearing blocks, wherein each said set of three or more disc bearing blocks attach to said top surface of said rotary magazine base plate, wherein said three or more disc bearing blocks of each said set are radially aligned and equally spaced about said support rod, wherein each said set of disc bearing blocks, if there are more than one said set, establish different bearing support heights above said rotary magazine base plate;

d) one or more sets of disc bearings, wherein one set of disc bearings mount on each said one or more sets of three or more disc bearing blocks, wherein each said set of disc bearings can support a vertical load from above, and bear a radial load centered about said support rod;

e) one or more discs of a first type, each said disc of a first type having a top and bottom surface, wherein each said disc of a first type is orientated horizontally, wherein each said disc of a first type is supported and centered by one said set of disc bearings, wherein said discs of a first type, if there are more than one, are positioned concentrically one above another, and each said disc of a first type which is located above another has one or more cut out slots projected inwards from its outer perimeter;

f) one or more gear mounting rings, wherein each said gear mounting rings having a top, a bottom and an inner surface, wherein said bottom surface of each said gear mounting ring affixes to said top surface of each said disc;

g) one or more internal gears, wherein each said internal gear attaches to said inner surface of one said gear mounting ring;

h) one or more disc motor mounts, each said disc motor mount having a top surface, wherein each said disc motor mount attaches to either said top surface of said rotary magazine base plate or to one or more said disc bearing blocks, wherein said top surface of each said disc motor mount is located above said top surface of every said gear mounting ring;

i) one or more disc motors, each said disc motor having a drive shaft, wherein each said motor attaches to said top surface of each said or more disc motor mounts, wherein each said disc motor is connected to said electronic circuitry and power supply system;

j) one or more disc spur gears, each said disc spur gear attached, either directly or by a connecting shaft, to said drive shaft of each said one or more disc motors; and k) one or more link pieces, each link piece having a horizontal orientation and two ends, wherein one said end of each said link piece connects to one said support rod, and said other end of each said link piece mounts to a said side plate of a said table-top automation apparatus which is not the same said table-top automation apparatus which comprises one said support rod, wherein one or more link pieces connect an equal number of said table-top automation apparatuses to one said support rod in addition to said table-top automation apparatus which comprises said support rod, wherein each said link plate extends perpendicular outward from each said frame of each said table-top automation apparatus.

15. A table-top automation apparatus according to claim 14, further comprising:

a) one or more nests having wedge shapes, wherein said nests are attached to said top surfaces of said one or more discs of said first type, wherein said nests are fabricated to custom shapes and sizes to hold, position and orient one or more work items for pick-up, receiving, or processing by devices operating in conjunction with said table-top automation apparatus, wherein said nests are easily removed or replaced, wherein said nests, whether identical or of different sizes, can be fitted together in angular arrays on said top surfaces of said one or more discs of said first type; and b) one or more ring-shaped pallets, wherein said ring-shaped pallets can be attached to said top surfaces of said one or more discs of said first type, wherein said one or more pallets are fabricated to custom shapes and sizes to hold, position and orient one or more work items for pick-up, receiving, or processing by devices operating in conjunction with said table-top automation apparatus, wherein said one or more pallets can be easily removed or replaced.

16. A table-top automation apparatus according to claim 1, further comprising:
   a) a support arm with two ends, one end being a bracket which attaches to an outer, upper surface of one said side plate, and said other end being a device mounting plate, wherein said support arm assembly can be a commercially available product for purchase, wherein said support arm assembly can pivot on said bracket forwards and rearward relative to said frame; and
   b) a monitor attaches to said mounting plate of said support arm, wherein said monitor being an electronic graphical user interface, a commercially available product for purchase, wherein said monitor is connected by power and control lines to said electronic circuitry and power supply system.

\* \* \* \* \*